US010595226B2

(12) United States Patent
Tsuda

(10) Patent No.: US 10,595,226 B2
(45) Date of Patent: Mar. 17, 2020

(54) INFORMATION PROCESSING APPARATUS, COMMUNICATION SYSTEM, AND INFORMATION PROCESSING METHOD

(71) Applicant: Sony Corporation, Tokyo (JP)

(72) Inventor: Shinichiro Tsuda, Kanagawa (JP)

(73) Assignee: Sony Corporation, Tokyo (JP)

( * ) Notice: Subject to any disclaimer, the term of this patent is extended or adjusted under 35 U.S.C. 154(b) by 313 days.

(21) Appl. No.: 14/045,865

(22) Filed: Oct. 4, 2013

(65) Prior Publication Data

US 2014/0105016 A1    Apr. 17, 2014

(30) Foreign Application Priority Data

Oct. 11, 2012  (JP) .................................. 2012-225583

(51) Int. Cl.
H04W 28/06 (2009.01)
H04W 4/00 (2018.01)
H04W 52/02 (2009.01)
H04W 4/90 (2018.01)
H04W 4/02 (2018.01)
H04W 4/12 (2009.01)

(52) U.S. Cl.
CPC ............. *H04W 28/06* (2013.01); *H04W 4/00* (2013.01); *H04W 52/0245* (2013.01); *H04W 4/027* (2013.01); *H04W 4/12* (2013.01); *H04W 4/90* (2018.02); *Y02D 70/1244* (2018.01); *Y02D 70/1262* (2018.01); *Y02D 70/1264* (2018.01); *Y02D 70/164* (2018.01)

(58) Field of Classification Search
None
See application file for complete search history.

(56) References Cited

U.S. PATENT DOCUMENTS 8,897,152 B1 * 11/2014 Caceres ................ H04W 36/30
370/252
2004/0044887 A1 * 3/2004 Park ...................... H04W 36/30
713/1
2004/0053573 A1 * 3/2004 Karusawa ........... H04M 1/7253
455/41.2

(Continued)

FOREIGN PATENT DOCUMENTS

JP    2006-287445 A    10/2006

OTHER PUBLICATIONS

CareAce.com Tip: Samsung Galaxy S II Advanced WiFi Settings Sleep Mode Policy. http://careace.net/2011/10/06/tip-samsung-galaxy-s-ii-advanced-wifi-settings-sleep-mode-policy/. Oct. 6, 2011.*

(Continued)

*Primary Examiner* — Jeffrey M Rutkowski
*Assistant Examiner* — Andre Tacdiran
(74) *Attorney, Agent, or Firm* — Chip Law Group

(57) ABSTRACT

There is provided an information processing apparatus including an acquiring unit that acquires communication quality of wireless communication at a location where a wireless communication apparatus exists, and a control unit that controls ON/OFF of another data communication function other than a data communication function to which a high priority is set, among data communication functions included by the wireless communication apparatus, based on the acquired communication quality.

17 Claims, 28 Drawing Sheets

(56) References Cited

U.S. PATENT DOCUMENTS

| | | | |
|---|---|---|---|
| 2004/0095903 A1* | 5/2004 | Ryan | H04W 72/0453 370/329 |
| 2005/0002407 A1* | 1/2005 | Shaheen et al. | 370/401 |
| 2006/0033746 A1* | 2/2006 | Ogura | 345/570 |
| 2006/0072532 A1* | 4/2006 | Dorenbosch et al. | 370/342 |
| 2006/0223519 A1* | 10/2006 | Yahagi | 455/421 |
| 2007/0133502 A1* | 6/2007 | Osswald | H04L 41/06 370/351 |
| 2007/0238489 A1* | 10/2007 | Scott | G06F 3/03549 455/566 |
| 2008/0002670 A1* | 1/2008 | Bugenhagen | H04L 12/66 370/352 |
| 2008/0045200 A1* | 2/2008 | Skinner et al. | 455/418 |
| 2008/0102853 A1* | 5/2008 | Kagimoto | H04W 28/02 455/453 |
| 2008/0113683 A1* | 5/2008 | Paas | H04M 1/72519 455/552.1 |
| 2008/0214194 A1* | 9/2008 | Noma | H04W 36/10 455/436 |
| 2008/0247344 A1* | 10/2008 | Bahl | H04W 52/0274 370/310 |
| 2010/0208707 A1* | 8/2010 | Hamabe | H04W 24/10 370/332 |
| 2010/0248719 A1* | 9/2010 | Scholaert | H04M 1/725 455/434 |
| 2010/0248787 A1* | 9/2010 | Smuga | G06F 3/0482 455/566 |
| 2011/0191568 A1* | 8/2011 | Yamamoto | G06F 1/3203 712/30 |
| 2013/0125004 A1* | 5/2013 | Zheng | G06F 3/048 715/736 |
| 2013/0157574 A1* | 6/2013 | Craine | H04M 1/72577 455/41.2 |
| 2013/0194943 A1* | 8/2013 | Davydov | H04W 72/0493 370/252 |
| 2014/0043979 A1* | 2/2014 | Etemad | H04B 7/2656 370/237 |
| 2014/0050086 A1* | 2/2014 | Himayat et al. | 370/230 |
| 2014/0153543 A1* | 6/2014 | Shipley | H04W 36/0022 370/331 |
| 2015/0119098 A1* | 4/2015 | Hsu | H04W 52/243 455/522 |
| 2015/0173000 A1* | 6/2015 | Basilier | H04W 48/18 370/329 |

OTHER PUBLICATIONS androidcentral.com. Jerry Hildenbrand. Android 101: Save battery by keeping Wifi alive https://www.androidcentral.com/android-101-save-battery-keeping-wifi-alive. Sep. 2, 2011*

SGS2UserGuide. Samsung Galaxy S II User Manual. Copyright 2011.* staistica.com. Samsung Galaxy S II sales in the United States from 3rd quarter 2011 to 2nd quarter 2012, by edition (in 1,000 units). https://www.statista.com/statistics/244151/samsung-galaxy-s-ii-sales-in-the-usa/.*

* cited by examiner

FIG. 2
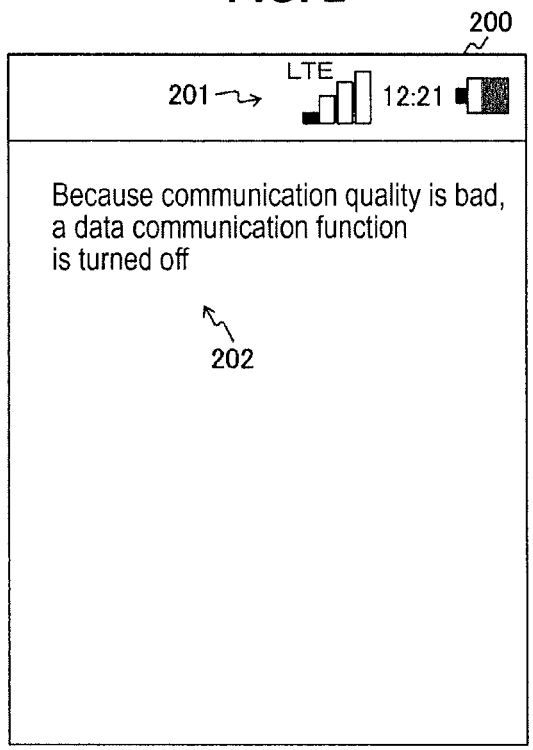
a
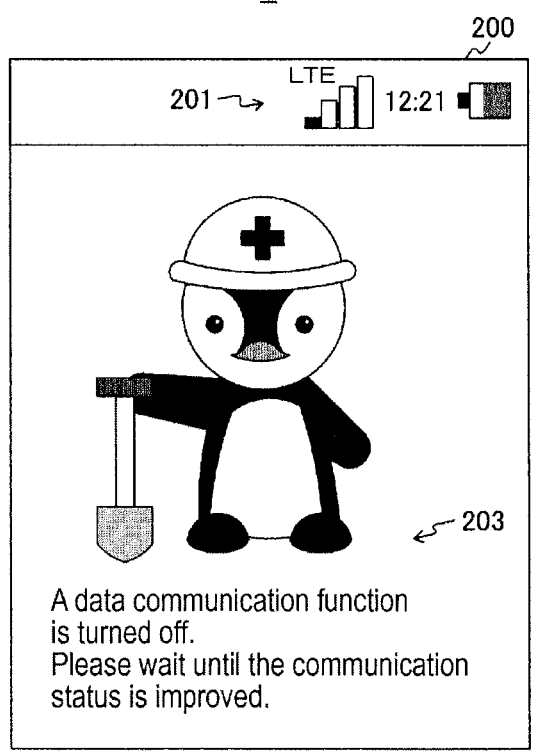
b

FIG. 13

RESTRICTION PROTOCOL LIST
STORAGE UNIT
310

| PROTOCOL TYPE | THRESHOLD VALUE (SNR) |
|---|---|
| Peer to Peer | 12.5dB |
| RTSP(Real Time Streaming Protocol) | 10.0dB |
| MMS(Microsoft Media Server Protocol) | 10.0dB |
| ⋮ | ⋮ |
| PPTP(Point to Point Tunneling Protocol) | 8.0dB |
| L2F(Layer 2 Forwarding) | 8.0dB |
| L2TP(Layer 2 Tunneling Protocol) | 8.0dB |
| FTP(File Transfer Protocol) | 8.0dB |
| ⋮ | ⋮ |
| HTTP(Hyper Text Transfer Protocol) | 3.0dB |
| HTTPS(Hyper Text Transfer Protocol over Secure Socket Layer) | 3.0dB |
| ⋮ | ⋮ |
| POP3(Post Office Protocol Version3) | 0dB |

FIG. 16

APPLICATION INFORMATION STORAGE UNIT
360

| APPLICATION IDENTIFICATION INFORMATION 361 | DATA COMMUNICATION PRESENCE OR ABSENCE 362 | AUTOMATICALLY "ON" 363 |
|---|---|---|
| BROWSER | PRESENCE | No |
| VIDEO TRANSMISSION | PRESENCE | No |
| ENGLISH-JAPANESE DICTIONARY | ABSENCE | — |
| SNS | PRESENCE | No |
| ⋮ | ⋮ | ⋮ | a

APPLICATION INFORMATION STORAGE UNIT
360

| APPLICATION IDENTIFICATION INFORMATION 361 | DATA COMMUNICATION PRESENCE OR ABSENCE 362 | AUTOMATICALLY "ON" 363 |
|---|---|---|
| BROWSER | PRESENCE | Yes |
| VIDEO TRANSMISSION | PRESENCE | No |
| ENGLISH-JAPANESE DICTIONARY | ABSENCE | — |
| SNS | PRESENCE | Yes |
| ⋮ | ⋮ | ⋮ | b

FIG. 17
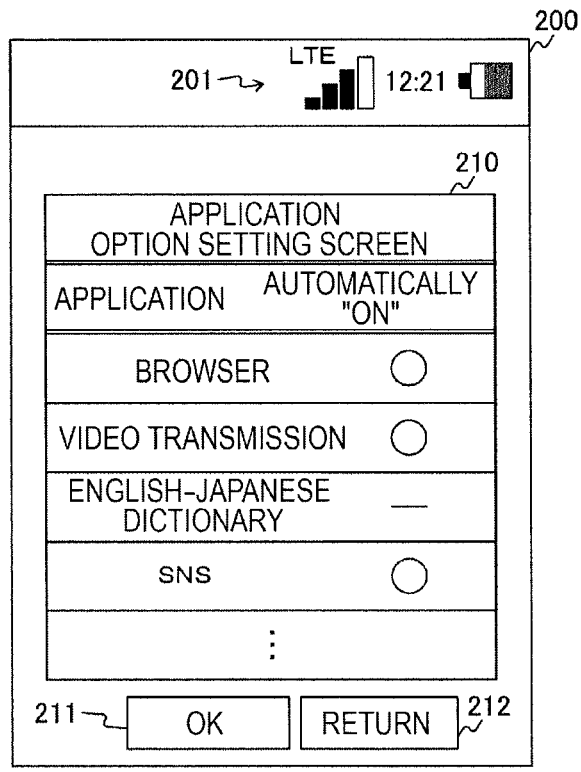
a
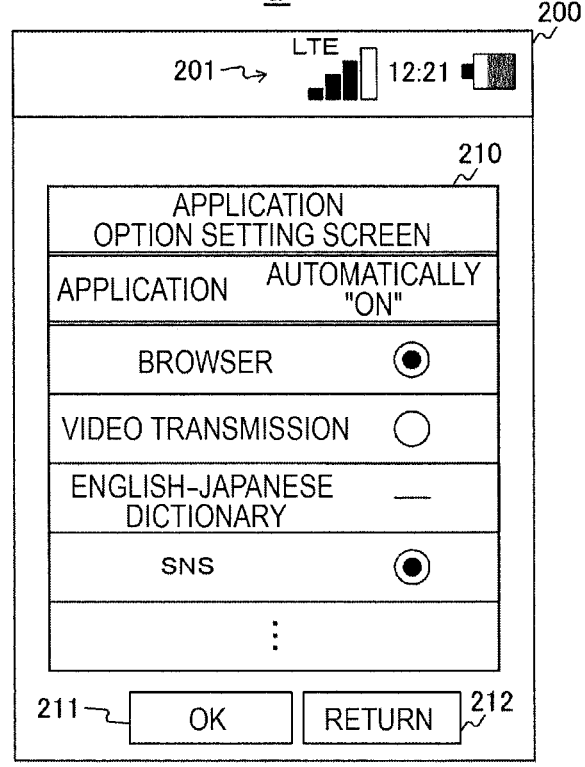
b

FIG. 18
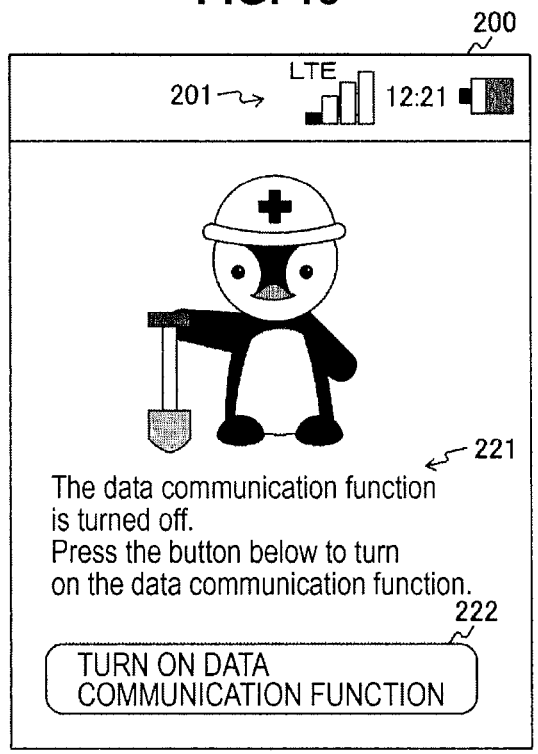
a
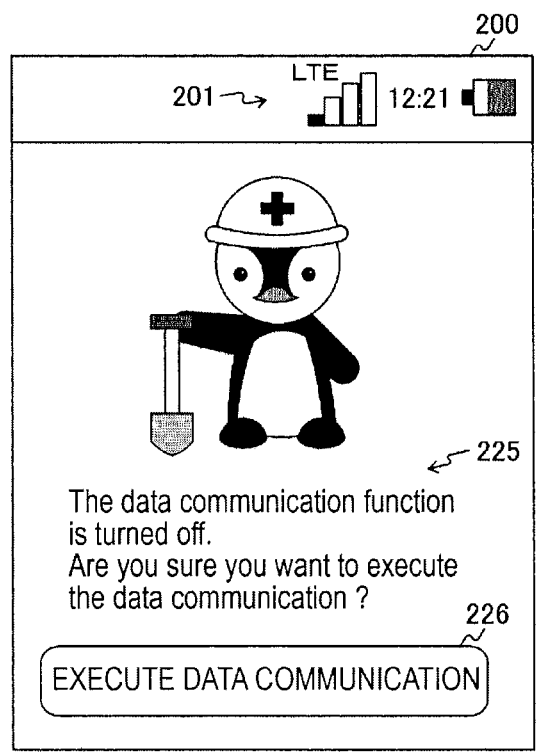
b

FIG. 21

COMMUNICATION AMOUNT STORAGE UNIT
420

| APPLICATION IDENTIFICATION INFORMATION (421) | AVERAGE COMMUNICATION AMOUNT (MB/CONNECTION) (422) |
|---|---|
| BROWSER | 10. 500 |
| VIDEO TRANSMISSION | 2. 540 |
| SNS | 0. 538 |
| ⋮ | ⋮ | a

COMMUNICATION AMOUNT STORAGE UNIT
420

| URL, IP adress (426) | AVERAGE COMMUNICATION AMOUNT (MB/CONNECTION) (427) |
|---|---|
| http://www.AAA.BBB.CCC | 2. 555 |
| http://www.CCC.BBB.AAA | 5. 540 |
| 192. 0. 2. 1 | 1. 538 |
| ⋮ | ⋮ | b

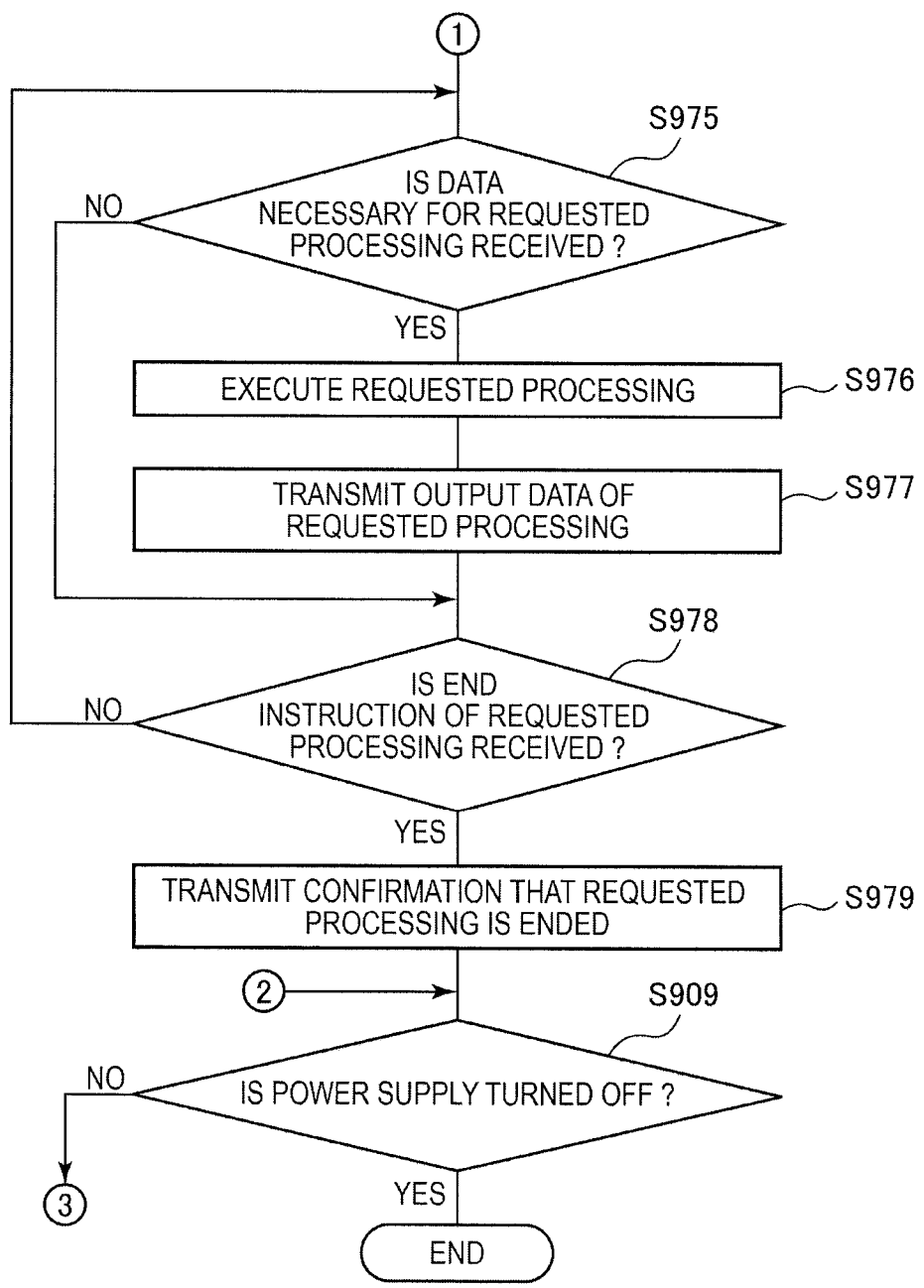

INFORMATION PROCESSING APPARATUS, COMMUNICATION SYSTEM, AND INFORMATION PROCESSING METHOD

BACKGROUND

The present disclosure relates to an information processing apparatus and more particularly, to an information processing apparatus, a communication system, and an information processing method that perform wireless communication and a program for causing a computer to execute the information processing method.

In the related art, a wireless communication apparatus that is connected to a network such as a public wireless network has spread widely. A mobile phone service of a 3G (3rd Generation) method (in Japan, referred to as the third-generation mobile phone service) has started in 2002. As the mobile phone service, initially, applications using packets having a small capacity size such as a sound and an e-mail are mainly used. However, use aspects of users change to downloading of packets having a relatively large capacity size such as download of a music file or viewing of a moving image, by introducing HSDPA (High Speed Downlink Packet Access) or the like.

For example, the case in which users are concentrated in a specific area and download packets having a large capacity size is assumed. In this case, because traffic is locally concentrated, a sufficient rate may not be obtained.

Therefore, a communication regulation system in which communication regulation is performed by designating an executable communication method according to a place where a mobile terminal is located has been suggested (for example, Japanese Patent Application Laid-Open (JP-A) No. 2006-287445).

SUMMARY

In the related art, a core network side determines a usable communication method with respect to a connection request from a wireless communication apparatus and performs communication regulation on the basis of the usable communication method.

However, in a place where the users are concentrated locally and congestion is generated in a specific base station, communication quality may be greatly deteriorated. For this reason, in such a place, even though the communication method is determined with respect to each wireless communication apparatus and the communication regulation is performed, the users may not receive a service with expected quality. Therefore, in such a place, it becomes important to decrease radio resources with the concern to be wasted and efficiently use wireless communication resources.

It is desirable to enable wireless communication resources to be efficiently used.

According to a first embodiment of the present technology, there is provided an information processing apparatus, an information processing method and a program for causing a computer to execute the method, the information processing apparatus including an acquiring unit that acquires communication quality of wireless communication at a location where a wireless communication apparatus exists, and a control unit that controls ON/OFF of another data communication function other than a data communication function to which a high priority is set, among data communication functions included by the wireless communication apparatus, based on the acquired communication quality. Therefore, ON/OFF of the data communication functions other than the data communication function to which the high priority is set can be controlled on the basis of the acquired communication quality.

Further, the data communication function to which the high priority is set may be a voice call function or a data communication function regarding a voice call service to which the high priority is set, and when the acquired communication quality is low based on a threshold value, the control unit performs control to turn off the other data communication functions in a state in which the data communication function to which the high priority is set may be turned on. Therefore, when the acquired communication quality is bad on the basis of the threshold value, the other data communication functions can be turned off in a state in which the data communication function to which the high priority is set is turned on.

Further, when the acquired communication quality is high based on a threshold value, the control unit may perform control to turn on the other data communication functions, and when the acquired communication quality is low based on the threshold value, the control unit may perform control to turn off the other data communication functions. Therefore, when the acquired communication quality is good on the basis of the threshold value, the other data communication functions are turned on and when the acquired communication quality is bad on the basis of the threshold value, the other data communication functions can be turned off.

Further, when a call using a voice call function is performed even though the acquired communication quality is low based on the threshold value, the control unit may perform control to turn on the other data communication functions. Therefore, when the call using the voice call function is performed even though the acquired communication quality is bad on the basis of the threshold value, the other data communication functions can be turned on.

Further, the control unit may control ON/OFF of the other data communication function, based on a display unit included in the wireless communication apparatus and the acquired communication quality. Therefore, ON/OFF of the other data communication functions can be controlled on the basis of the display unit included in the wireless communication apparatus and the acquired communication quality.

Further, when the display unit is not in a display state even though the acquired communication quality is high based on a threshold value, the control unit may perform control to turn off the other data communication function, and when the display unit is in the display state even though the acquired communication quality is low based on the threshold value, the control unit may perform control to turn on the other data communication function. Therefore, when the display unit is not in the display state even though the acquired communication quality is good on the basis of the threshold value, the other data communication functions can be turned off and when the display unit is in the display state even though the acquired communication quality is bad on the basis of the threshold value, the other data communication functions can be turned on.

Further, the information processing apparatus may further include a movement information acquiring unit that acquires movement information regarding a movement of the wireless communication apparatus. The control unit may control ON/OFF of the other data communication function, based on the acquired movement information and the acquired communication quality. Therefore, ON/OFF of the other data communication functions can be controlled on the basis of the acquired movement information and the acquired communication quality.

Further, when the acquired communication quality is high based on a threshold value or when the acquired communication quality is low based on the threshold value and the acquired movement information satisfies a predetermined condition, the control unit may perform control to turn on the other data communication function, and when the acquired communication quality is low based on the threshold value and the acquired movement information does not satisfy the predetermined condition, the control unit may perform control to turn off the other data communication functions. Therefore, when the acquired communication quality is good on the basis of the threshold value or the acquired communication quality is bad on the basis of the threshold value and the acquired movement information satisfies the predetermined condition, the other data communication functions can be turned on and when the acquired communication quality is bad on the basis of the threshold value and the acquired movement information does not satisfy the predetermined condition, the other data communication functions can be turned off.

Further, the data communication functions that are included by the wireless communication apparatus may include a data communication function regarding packet communication and a data communication function regarding SMS communication, and the data communication function to which the high priority is set may be the data communication function regarding the SMS communication. Therefore, the data communication function to which the high priority is set can be set as the data communication function regarding the SMS communication and ON/OFF of the other data communication functions can be controlled.

Further, the data communication functions that are included by the wireless communication apparatus may include data communication functions regarding a plurality of protocols, and the other data communication function may be a data communication function regarding a specific protocol. Therefore, ON/OFF of the data communication functions regarding the specific protocol can be controlled.

Further, a threshold value to turn off the data communication functions regarding the specific protocol may be associated with the specific protocol, and when the acquired communication quality is high based on the threshold value associated with the specific protocol, the control unit may perform control to turn on the other data communication function, and when the acquired communication quality is low based on the threshold value associated with the specific protocol, the control unit may perform control to turn off the other data communication function. Therefore, when the acquired communication quality is good on the basis of the threshold value associated with the specific protocol, the other data communication functions can be turned on and when the acquired communication quality is bad on the basis of the threshold value associated with the specific protocol, the other data communication functions can be turned off.

Further, the information processing apparatus may further include an application start detecting unit that detects a start of an application performing data communication. The control unit may notify a user of information showing that the other data communication function is turned off, at timing when the start of the application is detected. Therefore, the information showing that the other data communication functions are turned off can be notified to the user, at the timing when the start of the application is detected.

Further, information showing whether the data communication regarding the application is automatically executed may be associated with the application performing the data communication, and in a case in which the start of the application performing the data communication is detected, when the acquired communication quality is high based on a threshold value or when the acquired communication quality is low based on the threshold value and information showing that the data communication is automatically executed is associated with the application, the control unit may perform control to turn on the other data communication function and when the acquired communication quality is low based on the threshold value and information showing that the data communication is not automatically executed may be associated with the application, the control unit may perform control to turn off the other data communication functions. Therefore, in the case in which the start of the application performing the data communication is detected, when the acquired communication quality is good on the basis of the threshold value or the acquired communication quality is bad on the basis of the threshold value and the information showing that the data communication is automatically executed is associated with the application, the other data communication functions can be turned on and when the acquired communication quality is bad on the basis of the threshold value and the information showing that the data communication is not automatically executed is associated with the application, the other data communication functions can be turned off.

Further, the information processing apparatus may further include a storage unit that stores, as statistical information, a communication amount when data communication using the data communication functions is performed. The control unit may control ON/OFF of the other data communication function, based on the statistical information and the acquired communication quality. Therefore, ON/OFF of the other data communication functions can be controlled on the basis of the statistical information and the acquired communication quality.

Further, in the case in which execution of the data communication is instructed, when the acquired communication quality is high based on the threshold value or when the acquired communication quality is low based on the threshold value and the statistical information regarding the data communication satisfies a predetermined condition, the control unit may perform control to turn on the other data communication functions and when the acquired communication quality is low based on the threshold value and the statistical information regarding the data communication does not satisfy the predetermined condition, the control unit may perform control to turn off the other data communication function. Therefore, in the case in which the execution of the data communication is instructed, when the acquired communication quality is good on the basis of the threshold value or the acquired communication quality is bad on the basis of the threshold value and the statistical information regarding the data communication satisfies the predetermined condition, the other data communication functions can be turned on and when the acquired communication quality is bad on the basis of the threshold value and the statistical information regarding the data communication does not satisfy the predetermined condition, the other data communication functions can be turned off.

Further, a protocol hierarchy of data communication regarding the data communication functions included by the wireless communication apparatus may include at least a Control plane and a User plane, the other data communication function may be a data communication function regarding the data communication of the protocol hierarchy other than the Control plane, and the control unit may control ON/OFF of the data communication of the protocol hierarchy other than the Control plane, based on control data received through the Control plane and the acquired communication quality.

Therefore, ON/OFF of the data communication of the protocol hierarchy other than the Control plane can be controlled on the basis of the control data received through the Control plane and the acquired communication quality.

Further, when the other data communication function is turned off, the control unit may notify a user of information showing that the other data communication function is turned off. Therefore, when the other data communication functions are turned off, the information showing that the other data communication functions are turned off can be notified to the user.

Further, according to a second embodiment of the present technology, there is provided a communication system, an information processing method of the same and a program for causing a computer to execute the method, the communication system including an information processing apparatus that transmits a control signal, which shows that data communication using a User plane in data communication of a protocol hierarchy including at least a Control plane and the User plane is necessary, to a wireless communication apparatus through the Control plane, and a wireless communication apparatus that includes an acquiring unit to acquire communication quality of wireless communication at a location where the wireless communication apparatus exists and a control unit to control ON/OFF of the data communication of a protocol hierarchy other than the Control plane, based on control data received through the Control plane and the acquired communication quality. Therefore, the information processing apparatus can transmit the control signal showing that the data communication using the User plane is necessary to the wireless communication apparatus through the Control plane and the wireless communication apparatus can acquire the communication quality of the wireless communication at the current location and control ON/OFF of the data communication of the protocol hierarchy other than the Control plane, on the basis of the control data received through the Control plane and the acquired communication quality.

According to embodiments of the present disclosure, wireless communication resources can be efficiently used.

BRIEF DESCRIPTION OF THE DRAWINGS

FIG. 2 is a diagram illustrating an example of a display screen that is displayed on a display unit 200 according to the first embodiment of the present disclosure;

FIG. 13 is a diagram illustrating an example of a restriction protocol list that is stored in a restriction protocol list storage unit 310 according to the fourth embodiment of the present disclosure;

FIG. 16 is a diagram illustrating an example of storage content of an application information storage unit 360 according to the fifth embodiment of the present disclosure;

FIG. 17 is a diagram illustrating a display example of a setting screen (an application option setting screen 210) that is displayed on a display unit 200 according to the fifth embodiment of the present disclosure;

FIG. 18 is a diagram illustrating an example of a display screen that is displayed on the display unit 200 according to the fifth embodiment of the present disclosure;

FIG. 21 is a diagram illustrating an example of storage content of a communication amount storage unit 420 according to the sixth embodiment of the present disclosure;

FIG. 28 is a flowchart illustrating an example of a processing sequence of data communication control processing of the wireless communication apparatus 510 according to the seventh embodiment of the present disclosure;

DETAILED DESCRIPTION OF THE EMBODIMENT(S)

Figure 1:
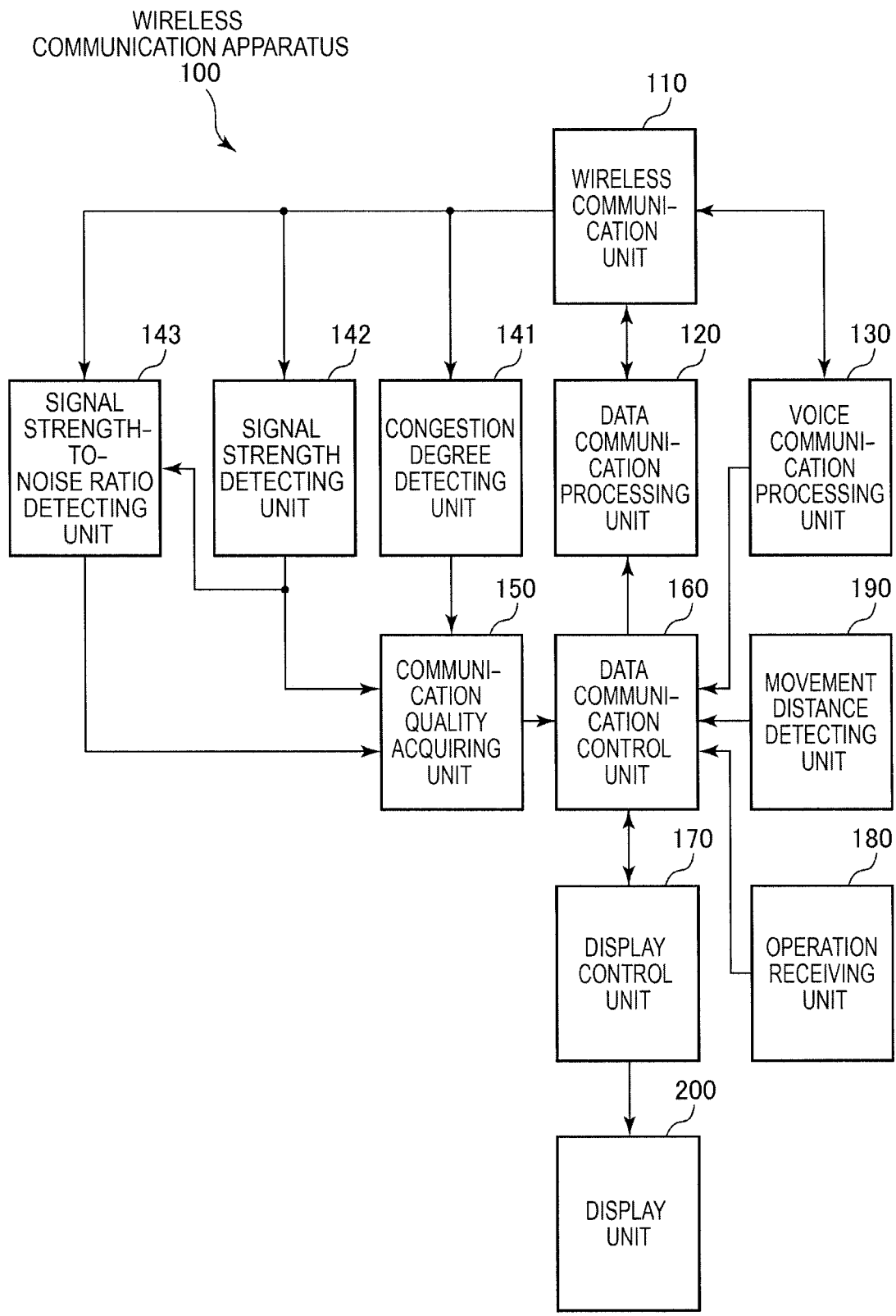
FIG. 1 is a block diagram illustrating a functional configuration example of a wireless communication apparatus 100 according to a first embodiment of the present disclosure.

Hereinafter, preferred embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

The following description will be made in the order described below.
1. First Embodiment (Data Communication Function ON/OFF Control: Example of Controlling ON/OFF of Data Communication Function on the basis of Communication Quality, Display State, Call State, and Movement Distance)
2. Second Embodiment (Data Communication Function ON/OFF Control: Example of Controlling ON/OFF of Data Communication Function other than SMS)
3. Third Embodiment (Data Communication Function ON/OFF Control: Example of Controlling ON/OFF of Data Communication Function to Realize Data Communication with Low QoS (Quality of Service)
4. Fourth Embodiment (Data Communication Function ON/OFF Control: Example of Controlling ON/OFF of Data Communication Function Communicated with Specific Protocol)
5. Fifth Embodiment (Data Communication Function ON/OFF Control: Example of Controlling ON/OFF of Data Communication Function at the time of Application Start or User Operation)
6. Sixth Embodiment (Data Communication Function ON/OFF Control: Example of Controlling ON/OFF of Data Communication Function on the basis of Past Data Communication Amount)
7. Seventh Embodiment (Data Communication Function ON/OFF Control: Example of Controlling ON/OFF of Data Communication Function in U-plane)

<1. First Embodiment>
[Configuration Example of Wireless Communication Apparatus]

FIG. 1 is a block diagram illustrating a functional configuration example of a wireless communication apparatus 100 according to a first embodiment of the present disclosure.

The wireless communication apparatus 100 includes a wireless communication unit 110, a data communication processing unit 120, a voice communication processing unit 130, a congestion degree detecting unit 141, a signal strength detecting unit 142, a signal strength-to-noise ratio detecting unit 143, and a communication quality acquiring unit 150. The wireless communication apparatus 100 further includes a data communication control unit 160, a display control unit 170, an operation receiving unit 180, a movement distance detecting unit 190, and a display unit 200. The wireless communication apparatus 100 is, for example, a portable information processing apparatus including a wireless communication function (for example, a mobile phone or a smart phone including a call function and a data communication function). The wireless communication apparatus 100 is an example of an information processing apparatus and a wireless communication apparatus according to an embodiment of the present disclosure.

The wireless communication unit 110 exchanges each information (for example, sound data or image data) with a base station (base station run by a carrier) providing a communication service and supplies received information to each unit. For example, the wireless communication unit 110 performs wireless communication using a 3G network, on the basis of contract authentication information (for example, a USIM (Universal Subscriber Identity Module)) stored in the wireless communication apparatus 100.

The data communication processing unit 120 executes processing regarding data communication such as packet communication, through the wireless communication unit 110. ON/OFF of the data communication processing unit 120 is controlled by the data communication control unit 160. That is, ON/OFF of a data communication function is controlled by the data communication control unit 160. Here, the data communication means communication of various data other than voice communication. The voice communication can be defined as a "voice call service supporting an emergency call function" and a "voice call service in which QoS is secured" to be distinguished from a general IP (Internet Protocol) phone. The data communication function means a function of communicating various data other than the voice communication.

For example, when the data communication function is turned on by the data communication control unit 160 (the data communication processing unit 120 is turned on), the data communication is enabled in the wireless communication apparatus 100. Meanwhile, when the data communication function is turned off by the data communication control unit 160 (the data communication processing unit 120 is turned off), the data communication is disabled in the wireless communication apparatus 100.

The voice communication processing unit 130 executes processing regarding the voice communication such as a phone (for example, voice call processing in a mobile phone or a smart phone), through the wireless communication unit 110. Here, the voice communication that is provided by the voice communication processing unit 130 is voice communication that enables an emergency call. The voice communication processing unit 130 outputs information regarding a call state (call state information (information showing a call state or a non-call state)) to the data communication control unit 160. The voice communication processing unit 130 is turned on at all times. That is, even in a state in which the data communication processing unit 120 is turned off by the data communication control unit 160, the voice communication processing unit 130 is turned on at all times.

The congestion degree detecting unit 141 detects a congestion degree of a base station, on the basis of a reception signal included in information supplied from the wireless communication unit 110, and outputs a detection result to the communication quality acquiring unit 150. That is, the congestion degree of the base station is detected from the signal received by the wireless communication unit 110. Here, the congestion degree of the base station can be defined as a ratio of radio resources actually allocated to the wireless communication apparatus, to all radio resources of the base station. The radio resources may be the number of codes, power allocated to the codes, or the number of bits transmitted per frame, in the case of code division multiple access. The radio resources may be the number of subcarriers, the number of resource blocks, or the number of bits transmitted per frame, in the case of orthogonal frequency division multiple access.

For example, the case of a code division multiple access method that is represented by W-CDMA (Wideband Code Division Multiple Access) is assumed. In this case, the congestion degree can be defined as a ratio (or a value proportional to the ratio) of the number of codes allocated to a user, to the total number of codes of an HS-DSCH (High-Speed Downlink Shared Channel). The congestion degree can be considered as a ratio (or a value proportional to the ratio) of power of the HS-DSCH allocated to the user, to total power allocated to the HS-DSCH. As the congestion degree, a value per frame or an average value over several frames may be used.

When the congestion degree is detected at the side of the wireless communication apparatus 100, the congestion degree may be calculated using various correlation detection results obtained by cell search processing (for example, Japanese Patent Application Laid-Open (JP-A) No. 2011-10267). In addition, Ec/No (Energy per Chip-to-Noise power spectral density) may be used as the congestion degree of the base station. In addition, Ec/Io (Energy per Chip-to-Interference power spectral density) may be used as the congestion degree of the base station. In addition, a value that is obtained by dividing the Ec/No or the Ec/Io by a spreading factor of a pilot signal may be used as the congestion degree of the base station.

The case of orthogonal frequency division multiple access that is represented by LTE (Long Term Evolution) is assumed. In this case, the congestion degree can be defined as a ratio (or a value proportional to the ratio) of the number of resource blocks allocated to the user, to the total number of resource blocks per frame. When the congestion degree is detected at the side of the wireless communication apparatus 100, the congestion degree can be calculated using RSRQ (Reference Signal Received Quality). For example, if a minimum value of the RSRQ is defined as a, the congestion degree kcong can be calculated by the following expression 1.

$$k\text{cong}=a/\text{RSRQ} \quad (1)$$

Here, the RSRQ is mapped by 34 ways of RSRQ_00 to RSRQ_33 at an interval of 0.5 dB, as described in Table9.1.7-1 of 3GPP TS36.133. The RSRQ in a state in which the base station or the traffic is congested most is RSRQ_00. Therefore, the minimum value a of the RSRQ in the expression 1 can be set to −19.5 dB. However, a is preferably handled with antilogarithm. As described in Table9.1.7-1 of 3GPP TS36.133, when the congestion degree kcong is calculated using index values of RSRQ_00 to RSRQ_33, the expression 1 can be transformed into the following expression 2.

$$K\text{cong}=10^{(RSRQ\_00-RSRQ\_XX)/(2\times10)} \quad (2)$$

Here, XX represents an index value of 00, 01, . . . , and 33. When the RSRQ is handled with a dimension of a voltage without handling the RSRQ with a dimension of power like the expression 2, the expression 1 may be transformed into the following expression 3.

$$k\text{cong}=\sqrt{(a/\text{RSRQ})} \quad (3)$$

Here, the RSRQ is defined by the following expression 4, using RSRP (Reference Signal Received Power) and RSSI (Received Signal Strength Indicator).

$$\text{RSRQ}=N(\text{RSRP}/\text{RSSI}) \quad (4)$$

Here, N represents the number of resource blocks in an RSSI measurement band.

The method of calculating the congestion degree kcong is not limited to the methods described above and various modifications can be made without departing from the spirit of the present disclosure.

The signal strength detecting unit 142 detects the strength of the reception signal included in the information supplied from the wireless communication unit 110 and outputs the detected strength of the reception signal to the signal strength-to-noise ratio detecting unit 143 and the communication quality acquiring unit 150. For example, the signal strength detecting unit 142 detects the strength of the reception signal (reception signal transmitted in the carrier frequency band from the base station) in a carrier frequency band (carrier band) used by the provided communication service. The strength of the reception signal is generally used for antenna bar display (for example, antenna bar display in an upper display region 201 illustrated in FIG. 2).

The signal strength-to-noise ratio detecting unit 143 detects a ratio of the strength of the signal output from the signal strength detecting unit 142 and a noise component (for example, noise power). For example, an SNR (Signal to Noise Ratio) or an SIR (Signal to Interference power Ratio) is detected. For example, an SINR (Signal to Interference and Noise power Ratio) is detected. The signal strength-to-noise ratio detecting unit 143 outputs a value of the detected ratio (signal strength-to-noise ratio) to the communication quality acquiring unit 150.

For example, the signal strength-to-noise ratio detecting unit 143 can detect noise components that are generated in a circuit (the signal strength detecting unit 142) to detect the strength of the reception signal from the base station. The signal strength-to-noise ratio detecting unit 143 can detect noise components in which thermal noise is amplified or interference components from adjacent base stations (adjacent cells) as the noise components. As such, the noise components include interference components received from peripheral base stations as well as the thermal noise and internal noise generated in a transmission/reception circuit.

The communication quality acquiring unit 150 acquires communication quality regarding a signal received by the wireless communication unit 110 and outputs the acquired communication quality to the data communication control unit 160. For example, the communication quality acquiring unit 150 acquires the congestion degree of the base station detected by the congestion degree detecting unit 141, the signal strength detected by the signal strength detecting unit 142, and the signal strength-to-noise ratio detected by the signal strength-to-noise ratio detecting unit 143 as the communication quality. That is, the communication quality acquiring unit 150 acquires the communication quality of the wireless communication at a location where the wireless communication apparatus 100 exists. The communication quality acquiring unit 150 acquires a value calculated on the basis of at least one of the congestion degree of the base station, the reception signal strength, and the reception signal strength-to-noise ratio or the congestion degree of the base station, the reception signal strength, and the reception signal strength-to-noise ratio as the communication quality. The communication quality acquiring unit 150 is an example of an acquiring unit according to an embodiment of the present disclosure.

The data communication control unit 160 performs ON/OFF control (ON/OFF control of the data communication function) of the data communication processing unit 120, on the basis of the communication quality acquired by the communication quality acquiring unit 150. For example, the data communication control unit 160 performs control to turn off the data communication processing unit 120, when the wireless communication apparatus 100 is in an environment where the communication quality is not good, and performs control to turn on the data communication processing unit 120, only when the wireless communication apparatus 100 is in an environment where the communication quality is good.

For example, because it becomes very difficult to connect the wireless communication apparatus to the congested base station, it is important to prevent wasted radio resources from being generated. Here, the wasted radio resources are resources that become wasted in the case in which downloading is not completed due to slowness and the user gives up the downloading on the way. Therefore, when the wireless communication apparatus 100 is connected to the congested base station, the data communication control unit 160 turns off the data communication processing unit 120 (turns off the data communication function). That is, control of the data communication function is performed using the communication quality having considered the congestion degree of the base station detected by the congestion degree detecting unit 141.

In addition, even in an environment where the signal strength is weak, it is important to prevent the wasted radio resources from being generated. Therefore, when the wireless communication apparatus 100 exists in the environment where the signal strength is weak, the data communication control unit 160 turns off the data communication processing unit 120 (turns off the data communication function). That is, control of the data communication function is performed using the communication quality having considered the signal strength detected by the signal strength detecting unit 142.

In addition, not only the signal strength but also other interference sources (for example, the strength and the weakness of interference from peripheral cells) can be acquired. For this reason, the signal strength-to-noise ratio detecting unit 143 can detect the deterioration of the communication quality due to the low signal strength and the deterioration of the communication quality due to the interferences from other interference sources. Even in an environment where the communication quality is deteriorated due to the interferences from other interference sources, it is important to prevent the wasted radio resources from being generated. Therefore, when the wireless communication apparatus 100 exists in the environment where the communication quality is deteriorated due to the interferences from other interference sources, the data communication control unit 160 turns off the data communication processing unit 120 (turns off the data communication function). That is, control of the data communication function is performed using the communication quality having considered the signal strength-to-noise ratio detected by the signal strength-to-noise radio detecting unit 143.

As such, ON/OFF of the data communication function can be controlled using the deteriorations of the communication qualities due to the different factors (the deterioration of the communication quality due to the congestion degree of the base station, the deterioration of the communication quality due to the signal strength, and the deterioration of the communication quality due to the interferences from other interference sources). Thereby, generation of the wasted radio resources can be decreased and the capacity can be efficiently improved. The wasted power consumption that is generated by the data communication processing unit 120 can be decreased.

The display control unit 170 displays individual display screens (for example, display screens illustrated in a and b of FIG. 2) on the display unit 200, on the basis of the control of the data communication control unit 160. In addition, the display control unit 170 outputs information regarding a display state (display state information (information showing a turned-on state or a turned-off state)) in the display unit 200 to the data communication control unit 160.

The operation receiving unit 180 receives an operation input from the user and outputs a control signal according to the received operation input to the data communication control unit 160. The operation receiving unit 180 and the display unit 200 may be integrated and may be configured by a touch panel. As the touch panel, a touch panel of an electrostatic type (capacitance type), a pressure-sensitive type (a resistance film pressure-sensitive type), or an optical type can be used.

The display unit 200 displays each display screen, on the basis of the control of the display control unit 170. As the display unit 200, a display panel such as an organic EL (Electro Luminescence) panel or an LCD (Liquid Crystal Display) can be used. For example, outputs of various applications that are mounted to the wireless communication apparatus 100 are displayed on the display unit 200. In addition, outputs of various services using the Internet through a web browser are displayed on the display unit 200.

In addition, according to the ON/OFF control of the data communication processing unit 120 by the data communication control unit 160, a display screen to notify the user of the ON/OFF control is displayed on the display unit 200. A display example is illustrated in FIGS. 2 and 18.

When the user does not use the wireless communication apparatus 100, the display control unit 170 performs control to turn off a display function (or a backlight) of the display unit 200 with a fixed or variable cycle to decrease power consumed by the display unit 200. The display control unit 170 performs control to turn off the display function (or the backlight) of the display unit 200 after a preset time passes. For example, when the display unit 200 is configured using a touch panel, the display control unit 170 monitors a touch operation with respect to the touch panel and acquires a finally touched time. The display control unit 170 may turn off the display function (or the backlight) of the display unit 200 with the fixed or variable cycle from the acquired time.

The data communication control unit 160 may perform ON/OFF control of the data communication processing unit 120, on the basis of the communication quality acquired by the communication quality acquiring unit 150 and the information of the control of the display unit 200 by the display control unit 170.

For example, the data communication control unit 160 can perform control to turn off the data communication function, when the wireless communication apparatus 100 is in an environment where the communication quality is not good, and can perform control to turn on the data communication function, only when the wireless communication apparatus 100 is an environment where the communication quality is good. In this case, the data communication control unit 160 may perform control to turn off the data communication function, under a condition where the user is not using the wireless communication apparatus 100 and the display unit 200 is turned off. The data communication control unit 160 may perform control to turn on the data communication function, under a condition where the user is using the wireless communication apparatus 100 and the display unit 200 is turned on. This control example will be described in detail with reference to FIGS. 5 and 6.

As such, ON/OFF control of the data communication function can be performed by considering the communication quality and the display state of the display unit 200. Thereby, generation of the wasted radio resources can be decreased and the capacity can be efficiently improved. The wasted power consumption that is generated by the data communication processing unit 120 can be decreased.

The movement distance detecting unit 190 detects a movement distance of the wireless communication apparatus 100 (movement distance of the user possessing the wireless communication apparatus 100) and outputs a detection result to the data communication control unit 160. For example, the movement distance detecting unit 190 can calculate a movement distance per unit time, using position information (for example, the latitude and the longitude) detected by a GPS (Global Positioning System) receiver. Also, the movement distance detecting unit 190 may calculate the movement distance using acceleration information detected by an acceleration sensor. The movement distance detecting unit 190 is an example of a movement information acquiring unit according to an embodiment of the present disclosure.

The data communication control unit 160 may perform ON/OFF control of the data communication processing unit 120, on the basis of the communication quality acquired by the communication quality acquiring unit 150 and the movement distance detected by the movement distance detecting unit 190. For example, when the user possessing the wireless communication apparatus 100 moves by an electric train and the wireless communication apparatus 100 temporarily passes through an area where the communication quality is not good, the data communication control unit 160 does not turn off the data communication processing unit 120. Meanwhile, when a station where the electric train is parked is in an area where the communication quality is not good, the electric train stops in the area where the communication quality is not good, for a relatively long time. For this reason, the data communication control unit 160 can turn off the data communication processing unit 120. This control example will be described in detail with reference to FIG. 8.

[Notification Example of Information Showing that Data Communication Function is Turned Off]

Figure 6:
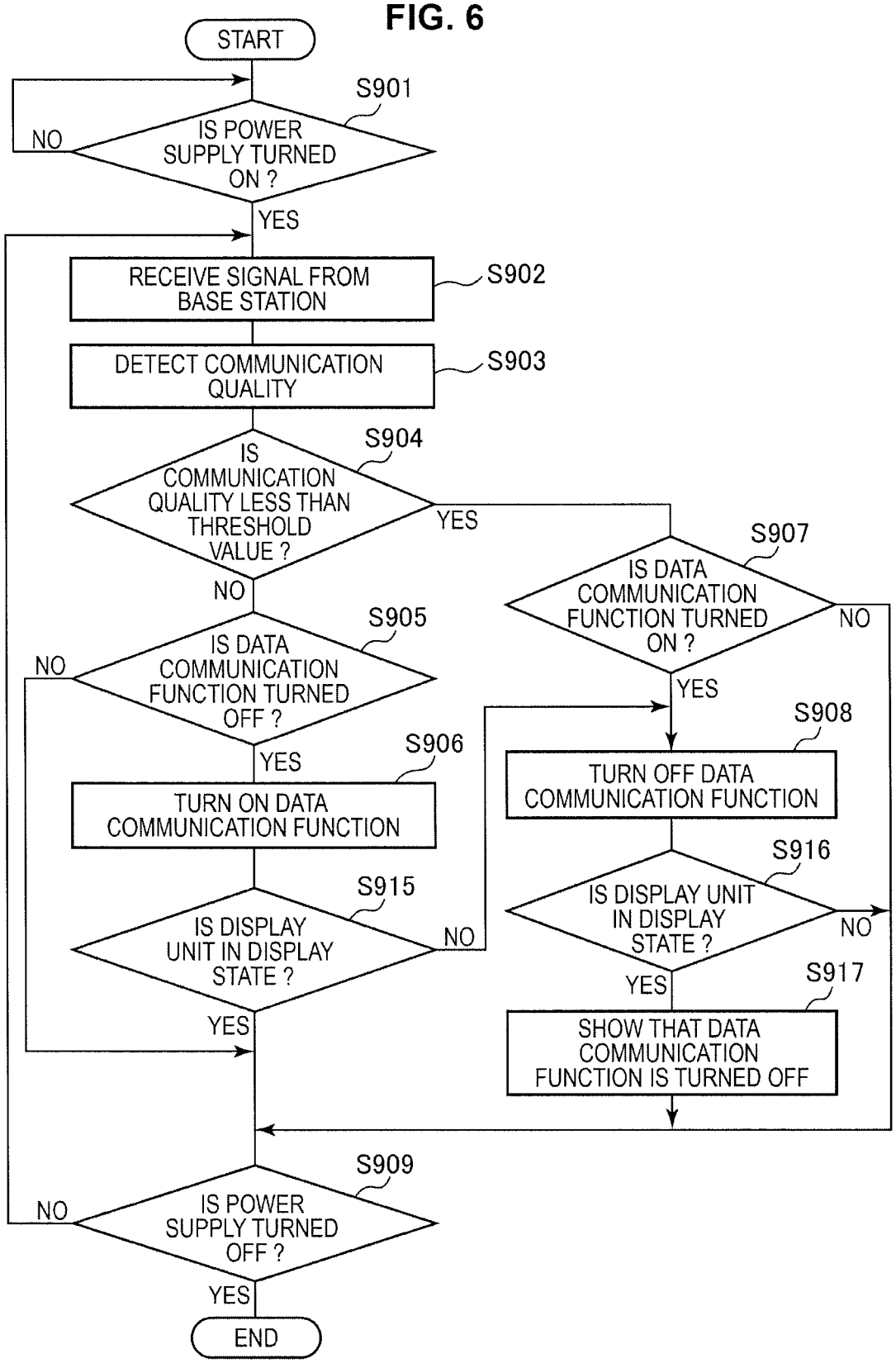
FIG. 6 is a flowchart illustrating an example of a processing sequence of data communication control processing of the wireless communication apparatus 100 according to the first embodiment of the present disclosure.

FIG. 2 is a diagram illustrating an example of a display screen that is displayed on the display unit 200 according to the first embodiment of the present disclosure. In the upper display region 201 on each display screen to be described below, an antenna bar, a time, and a remaining battery amount icon are illustrated. The other display content is partially omitted and is simply illustrated.

a of FIG. 2 illustrates a display example of the case in which information showing that the data communication function is turned off is displayed by text information. When the data communication function is turned off, as illustrated in a of FIG. 2, text information "because communication quality is bad, a data communication function is turned off" is displayed in a partial region (message display region 202) of the display screen. The display screen may be displayed continuously while the data communication function is turned off or may be displayed only during a constant period (for example, 3 to 5 minutes) after the data communication function is turned off. The display screen may be displayed under a condition where the display unit 200 enters a display state when the data communication function is turned off. In a state in which the display unit 200 does not enter the display state when the data communication function is turned off (that is, a turned-off state), the display screen may be displayed when the display unit 200 enters the display state subsequently. A control example regarding the display is illustrated in FIG. 6.

As such, the information showing that the data communication function is turned off is displayed on the display unit 200, so that the user can easily know that the data communication function of the wireless communication apparatus 100 is turned off.

b of FIG. 2 illustrates a display example of the case in which the information showing that the data communication function is turned off is displayed by text information and image information. Here, it is assumed that an application (for example, a browser) in which the data communication is necessary starts in a state in which the data communication function is turned off. In this case, because there is no data access, a display screen (error notification screen) to notify error is normally displayed. At this time, instead of the error notification screen, a display screen (for example, a display screen to calm the user psychologically) illustrated in b of FIG. 2 may be displayed. For example, a penguin to calm the user psychologically can be arranged on the upper side of a message display region 203.

These display screens are exemplary and various modifications can be made without departing from the spirit of the present disclosure.

As such, the information showing that the data communication function is turned off is displayed on the display unit 200, so that the user can easily know that the data communication function is turned off.

[Operation Example of Wireless Communication Apparatus]

Figure 3:
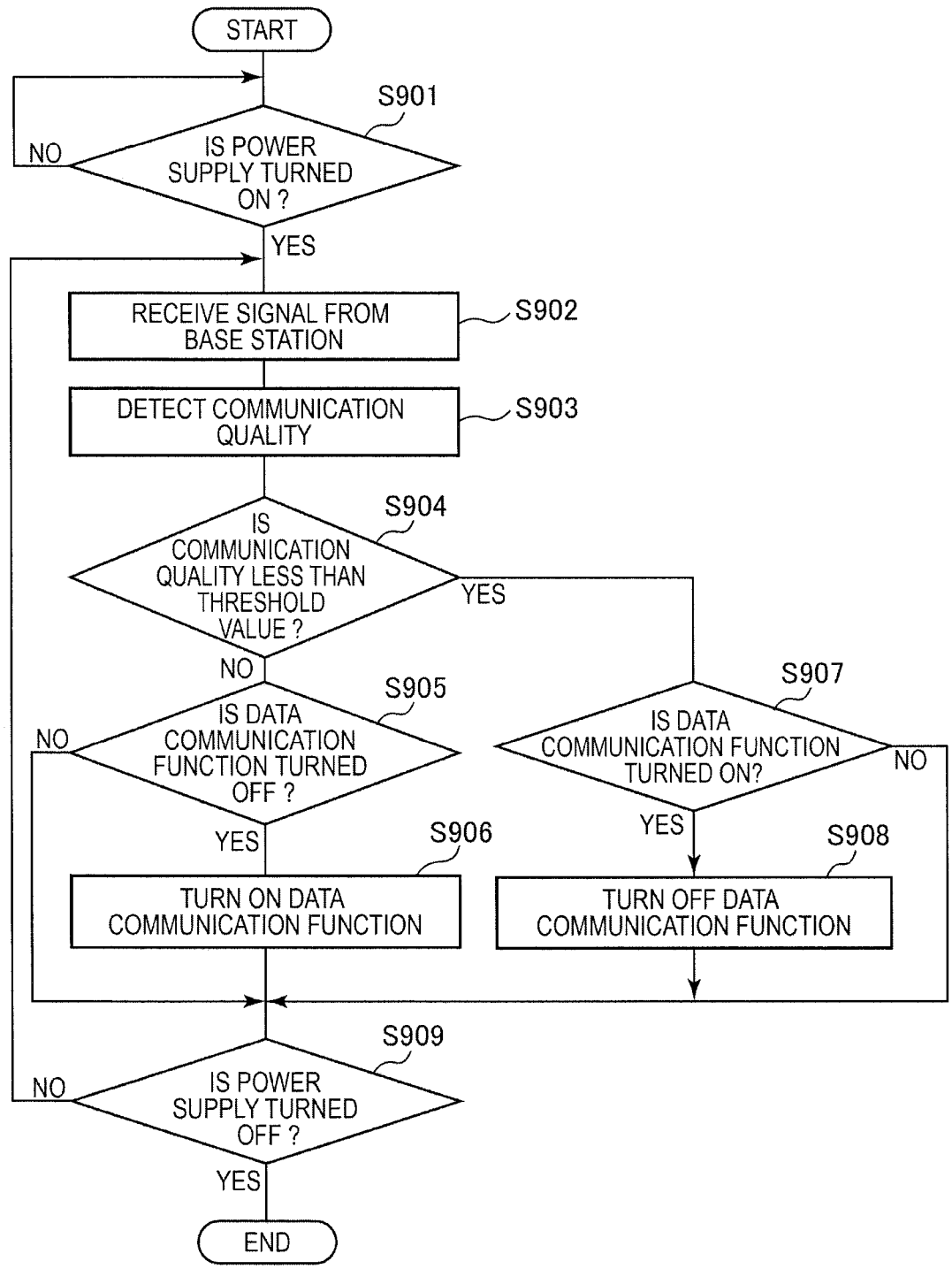
FIG. 3 is a flowchart illustrating an example of a processing sequence of data communication control processing of the wireless communication apparatus 100 according to the first embodiment of the present disclosure.

FIG. 3 is a flowchart illustrating an example of a processing sequence of the data communication control processing of the wireless communication apparatus 100 according to the first embodiment of the present disclosure.

First, a power supply of the wireless communication apparatus 100 is turned on (step S901). Next, the wireless communication unit 110 receives a signal from the base station (step S902). Next, communication quality is detected from the received signal (step S903). That is, the congestion degree detecting unit 141 detects a congestion degree of the base station, the signal strength detecting unit 142 detects the signal strength, and the signal strength-to-noise ratio detecting unit 143 detects a signal strength-to-noise ratio. The communication quality acquiring unit 150 acquires these values and supplies the values to the data communication control unit 160. Step S903 is an example of an acquiring sequence according to an embodiment of the present disclosure.

Figure 4:
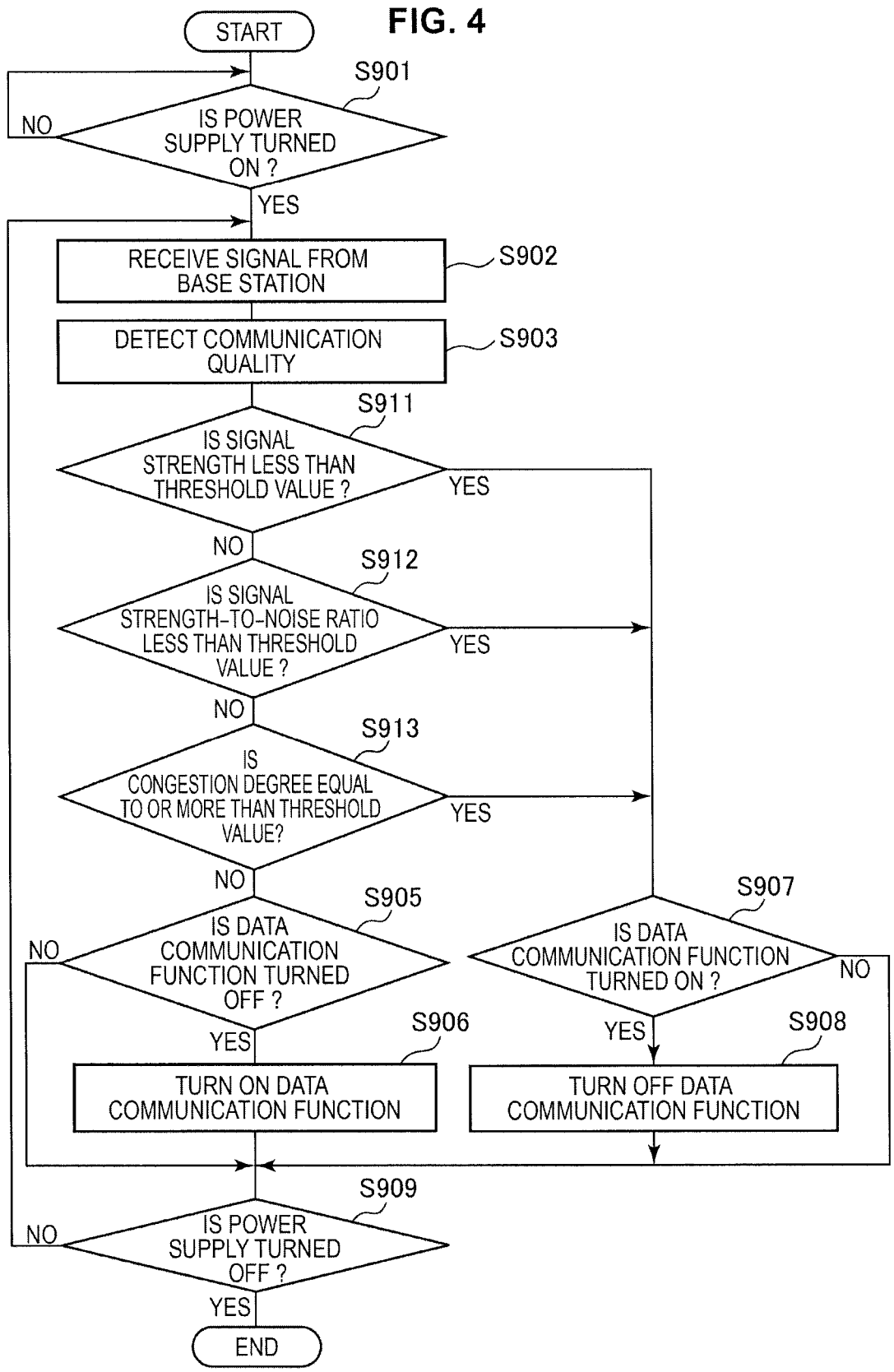
FIG. 4 is a flowchart illustrating an example of a processing sequence of data communication control processing of the wireless communication apparatus 100 according to the first embodiment of the present disclosure.

Next, the data communication control unit 160 compares the communication quality detected from the received signal with a threshold value and determines whether the detected communication quality is less than the threshold value (step S904). That is, it is determined whether the communication quality is bad on the basis of the threshold value. Here, as the communication quality becoming a comparison target, only one of the individual communication qualities (the congestion degree of the base station, the signal strength, and the signal strength-to-noise ratio) may be used. As the communication quality becoming the comparison target, a value calculated on the basis of the values of the individual communication qualities (for example, a total value of values obtained by multiplying the individual values with a constant number) may be used. The communication quality becoming the comparison target may be set by the user by a manual operation or may be set by a carrier. An example of the case in which the individual communication qualities (the congestion degree of the base station, the signal strength, and the signal strength-to-noise ratio) are used as the communication quality becoming the comparison target is illustrated in FIG. 4.

When the communication quality detected from the received signal is not less than the threshold value (step S904), the data communication control unit 160 determines whether the data communication processing unit 120 is turned off (the data communication function is turned off) (step S905). When the data communication function is not turned off (that is, when the data communication function is turned on) (step S905), the processing proceeds to step S909. Meanwhile, when the data communication function is turned off (step S905), the data communication control unit 160 performs control to turn on the data communication function (step S906).

Next, it is determined whether the power supply of the wireless communication apparatus 100 is turned off (step S909). When the power supply of the wireless communication apparatus 100 is turned off, the operation of the data communication control processing ends. Meanwhile, when the power supply of the wireless communication apparatus 100 is not turned off (step S909), the processing returns to step S902.

When the communication quality detected from the received signal is less than the threshold value (step S904), the data communication control unit 160 determines whether the data communication function is turned on (step S907). When the data communication function is not turned on (step S907), the processing proceeds to step S909. Meanwhile, when the data communication function is turned on (step S907), the data communication control unit 160 performs control to turn off the data communication function (step S908). Steps S904 to S908 are an example of a control sequence according to an embodiment of the present disclosure.

Each processing of steps S902 to S908 is executed continuously with the fixed or variable cycle. An execution cycle of each processing may be varied with respect to the case in which the data communication function is turned on and the case in which the data communication function is turned off. The execution cycle of each processing may be changed by a user operation.

Here, the threshold value that is used for comparison (step S904) with the communication quality detected from the received signal will be described. The threshold value may be a fixed value or a variable value.

For example, with respect to a time when the wireless communication apparatus 100 stays in the spot where the communication quality is deteriorated, a time in the case in which the wireless communication apparatus 100 moves is shorter than a time in the case in which the wireless communication apparatus 100 stops. For this reason, load applied to the base station in the case in which the wireless communication apparatus 100 moves is smaller than the load applied to the base station in the case in which the wireless communication apparatus 100 stops. Therefore, the threshold value can be set such that the threshold value when the wireless communication apparatus 100 moves becomes smaller than the threshold value when the wireless communication apparatus 100 stops (the frequency of turning off the data communication function decreases). Thereby, control can be performed such that the data communication function is not turned off as much as possible.

The threshold value may be varied stepwise according to a movement speed of the wireless communication apparatus 100. For example, the threshold value when the wireless communication apparatus 100 moves may be changed stepwise according to the movement speed, such that the threshold value increases when the movement speed of the wireless communication apparatus 100 is slow and decreases when the movement speed of the wireless communication apparatus 100 is fast.

The threshold value may be varied over time. For example, during a period of time such as a morning commute period of time or an evening commute period of time during which communication traffic is likely to be concentrated, setting can be performed such that the threshold value increases (the frequency of turning off the data communication function increases). Meanwhile, during a midnight period of time (for example, 1:00 to 5:00), setting can be performed such that the threshold value decreases (the frequency of turning off the data communication function decreases).

The threshold value may be varied according to a place. For example, there are places in areas such as Shinjuku and Shibuya which people are concentrated in, regardless of the period of time. When the wireless communication apparatus 100 exists in these places, setting can be performed such that the threshold value increases (the frequency of turning off the data communication function increases).

If setting is performed such that the threshold value increases (the frequency of turning off the data communication function increases), the load applied to the base station decreases. Therefore, a communication unit price of the wireless communication apparatus 100 may be varied according to the threshold value. For example, the communication unit price can be cheaply set with respect to a user who sets the large threshold value and can be expensively set with respect to a user who sets the small threshold value. The setting may become valid under a condition where the user and the carrier renew a contract monthly.

The threshold value may be set according to a contract plan of the user of the wireless communication apparatus 100. For example, with respect to a user who contracts a cheap cost plan, setting is performed such that the threshold value increases (the frequency of turning off the data communication function increases), because the user should follow a use method not applying the load to the base station. Meanwhile, with respect to a user who contracts an expensive cost plan, setting is performed such that the threshold value decreases (the frequency of turning off the data communication function decreases).

The threshold value may be set according to the remaining charging amount of the wireless communication apparatus 100. In general, communication performed in an environment where the communication quality is bad is more likely to waste consumption power. For this reason, when the remaining charging amount of the wireless communication apparatus 100 decreases, setting can be performed such that the threshold value increases (the frequency of turning off the data communication function increases), not to waste the power.

Similarly, each threshold value to be described below may be set to a fixed value or a variable value. The threshold value setting method (threshold value setting method in the case in which the threshold value is varied) described above is exemplary and various modifications can be made without departing from the sprit of the present disclosure.

FIG. 4 is a flowchart illustrating an example of a processing sequence of data communication control processing of the wireless communication apparatus 100 according to the first embodiment of the present disclosure. Because FIG. 4 is a modification example of FIG. 3, portions common to the case of FIG. 3 are denoted with the same reference numerals and explanation thereof is omitted.

The data communication control unit 160 compares the signal strength detected from the received signal with a threshold value and determines whether the detected signal strength is less than the threshold value (step S911). That is, it is determined whether the signal strength is bad on the basis of the threshold value. Here, when the threshold value with respect to the signal strength is set to a fixed value, the signal strength can be set to −95 dBm.

When the signal strength is not less than the threshold value (step S911), the data communication control unit 160 compares the signal strength-to-noise ratio detected from the received signal with a threshold value and determines whether the detected signal strength-to-noise ratio is less than the threshold value (step S912). That is, it is determined whether the signal strength-to-noise ratio is bad on the basis of the threshold value. Here, when the threshold value with respect to the signal strength-to-noise ratio (for example, the SINR) is set to a fixed value, the threshold value can be set to 0 dB.

When the signal strength-to-noise ratio is not less than the threshold value (step S912), the data communication control unit 160 compares the congestion degree detected from the received signal with the threshold value and determines whether the detected congestion degree is equal to or more than the threshold value (step S913). That is, it is determined whether the congestion degree is bad on the basis of the threshold value. Here, when the threshold value with respect to the congestion degree (for example, 0 to 1) is set to a fixed value, the threshold value can be set to 0.75.

When each communication quality is not bad on the basis of the threshold value (steps S911 to S913), the processing proceeds to step S905. When any one of the communication qualities is bad on the basis of the threshold value (steps S911 to S913), the processing proceeds to step S907.

As such, the data communication control unit 160 controls ON/OFF of the data communication functions (data communication functions other than the data communication function to which the high priority is set, among the data communication functions included in the wireless communication apparatus 100), on the basis of the acquired communication quality. For example, the data communication control unit 160 can control ON/OFF of the data communication functions other than the data communication function to which the priority higher than a reference value is set. Specifically, the data communication control unit 160 performs control to turn on the data communication function, when the acquired communication quality is good on the basis of the threshold value, and performs control to turn off the data communication function, when the acquired communication quality is bad on the basis of the threshold value. The data communication function to which the high priority is set can be set as a voice call function.

As such, in the first embodiment of the present disclosure, the data communication in an environment where the communication quality is bad is suppressed, so that the radio resources becoming wasted by stopping the communication service on the way can be decreased. Thereby, the capacity of each base station can be improved. When the user concludes a contract for a volume charging system, the cost burden on the user can be decreased.

The data communication with respect to the congested base station is suppressed, so that the radio resources becoming wasted by stopping the communication service on the way can be decreased. Thereby, the capacity of the congested base station can be improved.

The radio resources that become wasted by stopping the communication service on the way, because of the deteriorations of the communication qualities occurring due to different factors like the deterioration of the communication quality due to the decrease in the reception signal strength and the deterioration of the communication quality due to the congestion of the base station, can be decreased. Thereby, the capacity of each base station can be improved.

[Example of Case in which ON/OFF of Data Communication Function is Controlled on the Basis of Display State of Display Unit]

Figure 5:
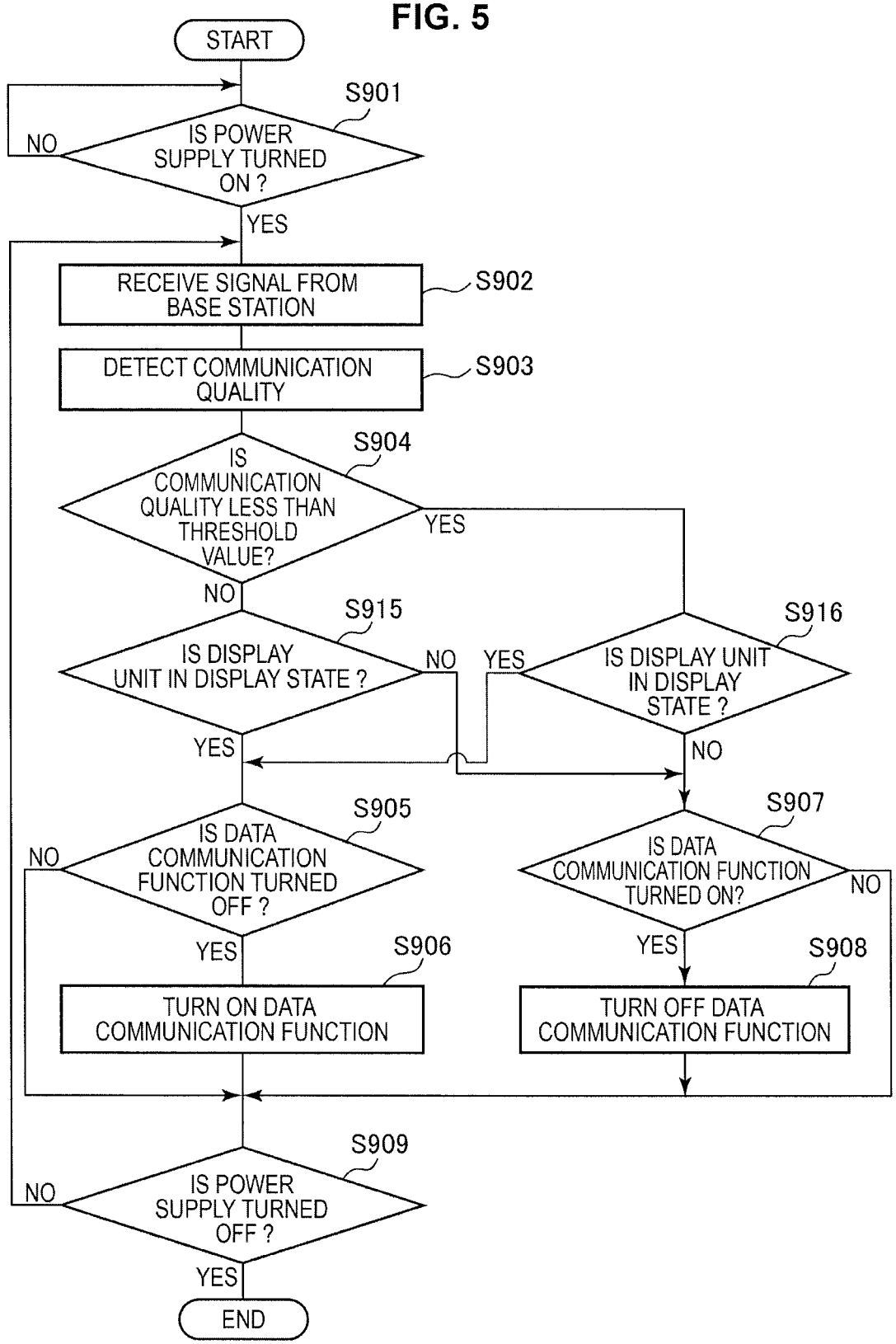
FIG. 5 is a flowchart illustrating an example of a processing sequence of data communication control processing of the wireless communication apparatus 100 according to the first embodiment of the present disclosure.

The example of the case in which ON/OFF of the data communication function is controlled on the basis of the communication quality has been described. Here, it is assumed that the portable wireless communication apparatus is often used by the user, when the display unit of the portable wireless communication apparatus enters a display state. Therefore, in this case, it is preferable not to turn off the data communication function even in an environment where the communication quality is relatively bad. FIG. 5 illustrates an example of the case in which ON/OFF of the data communication function is controlled on the basis of the display state of the display unit.

[Operation Example of Wireless Communication Apparatus]

FIG. 5 is a flowchart illustrating an example of a processing sequence of data communication control processing of the wireless communication apparatus 100 according to the first embodiment of the present disclosure. Because FIG. 5 is a modification of FIG. 3, portions common to the case of FIG. 3 are denoted with the same reference numerals and explanation thereof is omitted.

When the communication quality detected from the received signal is not less than the threshold value (step S904), the data communication control unit 160 determines whether the display unit 200 is in a display state, on the basis of the display state information from the display control unit 170 (step S915). That is, it is determined whether the display unit 200 is turned on or turned off.

When the display unit 200 is in the display state (when the display unit 200 is turned on) (step S915), the processing proceeds to step S905. When the display unit 200 is not in the display state (when the display unit 200 is turned off) (step S915), the processing proceeds to step S907. That is, even in an environment where the communication quality is relatively good (step S904), when the display unit 200 is turned off (step S915), control to turn off the data communication function is performed (steps S907 and S908).

When the communication quality detected from the received signal is less than the threshold value (step S904), the data communication control unit 160 determines whether the display unit 200 is in the display state, on the basis of the display state information from the display control unit 170 (step S916).

When the display unit 200 is in the display state (step S916), the processing proceeds to step S905. When the display unit 200 is not in the display state (step S916), the processing proceeds to step S907. That is, even in an environment where the communication quality is relatively bad (step S904), when the display unit 200 is turned on (step S916), control to turn on the data communication function is performed (steps S905 and S906).

As such, the data communication control unit 160 can control ON/OFF of the data communication function, on the basis of the display unit 200 included in the wireless communication apparatus 100 and the acquired communication quality. Specifically, when the display unit 200 is not in the display state even in the case in which the acquired communication quality is good on the basis of the threshold value, the data communication control unit 160 turns off the data communication function. Meanwhile, when the display unit 200 is in the display state even in the case in which the acquired communication quality is bad on the basis of the threshold value, the data communication control unit 160 turns on the data communication function.

As such, in a state in which the display unit 200 is turned off or the backlight of the display unit 200 is turned off, which is considered as the same situation as a period during which the user does not use the display unit 200, the data communication can be suppressed. Thereby, generation of communication that is unnecessary for the user can be suppressed.

In this example, ON/OFF of the data communication function is controlled on the basis of whether the display unit 200 is in the display state (the display unit 200 is turned on or turned off). However, instead of determining whether the display unit 200 is in the display state (steps S915 and S916), it is determined whether the user operates the wireless communication apparatus 100, so that ON/OFF of the data communication function may be controlled on the basis of a determination result.

For example, even in an environment where the communication quality is relatively good (step S904), when the user does not operate the wireless communication apparatus 100 (step S915), control to turn off the data communication function is performed (steps S907 and S908). Meanwhile, even in an environment where the communication quality is relatively bad (step S904), when the user operates the wireless communication apparatus 100 (step S916), control to turn on the data communication function is performed (steps S905 and S906).

[Example of Case in which Display Screen to Notify OFF of Data Communication Function is Displayed Only when Display Unit is in Display State]

In FIG. 2, the display example of the display screen to notify OFF of the data communication function is illustrated. As described above, a display screen to notify OFF of the data communication function may be displayed only when the display unit is in the display state. Therefore, FIG. 6 illustrates an example of the case in which the display screen to notify OFF of the data communication function is displayed only when the display unit is in the display state.

FIG. 6 is a flowchart illustrating an example of a processing sequence of the data communication control processing of the wireless communication apparatus 100 according to the first embodiment of the present disclosure. Because FIG. 6 is a modification of FIGS. 3 and 5, portions common to the cases of FIGS. 3 and 5 are denoted with the same reference numerals and explanation thereof is omitted.

After the data communication function is turned on (step S906), the data communication control unit 160 determines whether the display unit 200 is in the display state, on the basis of the display state information from the display control unit 170 (step S915).

When the display unit 200 is in the display state (step S915), the processing proceeds to step S909. When the display unit 200 is not in the display state (step S915), the processing proceeds to step S908. That is, an environment is an environment where the communication quality is relatively good. For this reason, even in the case in which the data communication function is turned on (step S906), when the display unit 200 is turned off (step S915), control to turn off the data communication function is performed (step S908).

After the data communication function is turned off (step S908), the data communication control unit 160 determines whether the display unit 200 is in the display state, on the basis of the display state information from the display control unit 170 (step S916).

When the display unit 200 is in the display state (step S916), the display control unit 170 displays information showing that the data communication function is turned off on the display unit 200, on the basis of an instruction from the data communication control unit 160 (step S917). For example, the display screens that are illustrated in a and b of FIG. 2 are displayed. Meanwhile, when the display unit 200 is not in the display state (step S916), the processing proceeds to step S909. That is, in the case in which the data communication function is turned off (step S908), only when the display unit 200 is turned on (step S916), the display of the information showing that the data communication function is turned off is performed (step S917). When the display unit 200 is turned off (step S916), the display of the information showing that the data communication function is turned off is not performed.

As such, when the data communication function is turned off, the data communication control unit 160 can notify the user of the information showing that the data communication function is turned off.

[Example of Case in which ON/OFF of Data Communication Function is Controlled on the Basis of Call State]

The example of the case in which ON/OFF of the data communication function is controlled on the basis of the communication quality and the display state has been described. Here, it is assumed that the wireless communication apparatus 100 is often used by the user during a call or immediately after the call, when the call is performed using the wireless communication apparatus 100. Therefore, in this case, it is preferable not to turn off the data communication function even in an environment where the communication quality is relatively bad. Therefore, FIG. 7 illustrates an example of the case in which ON/OFF of the data communication function is controlled on the basis of a call state.

Figure 7:
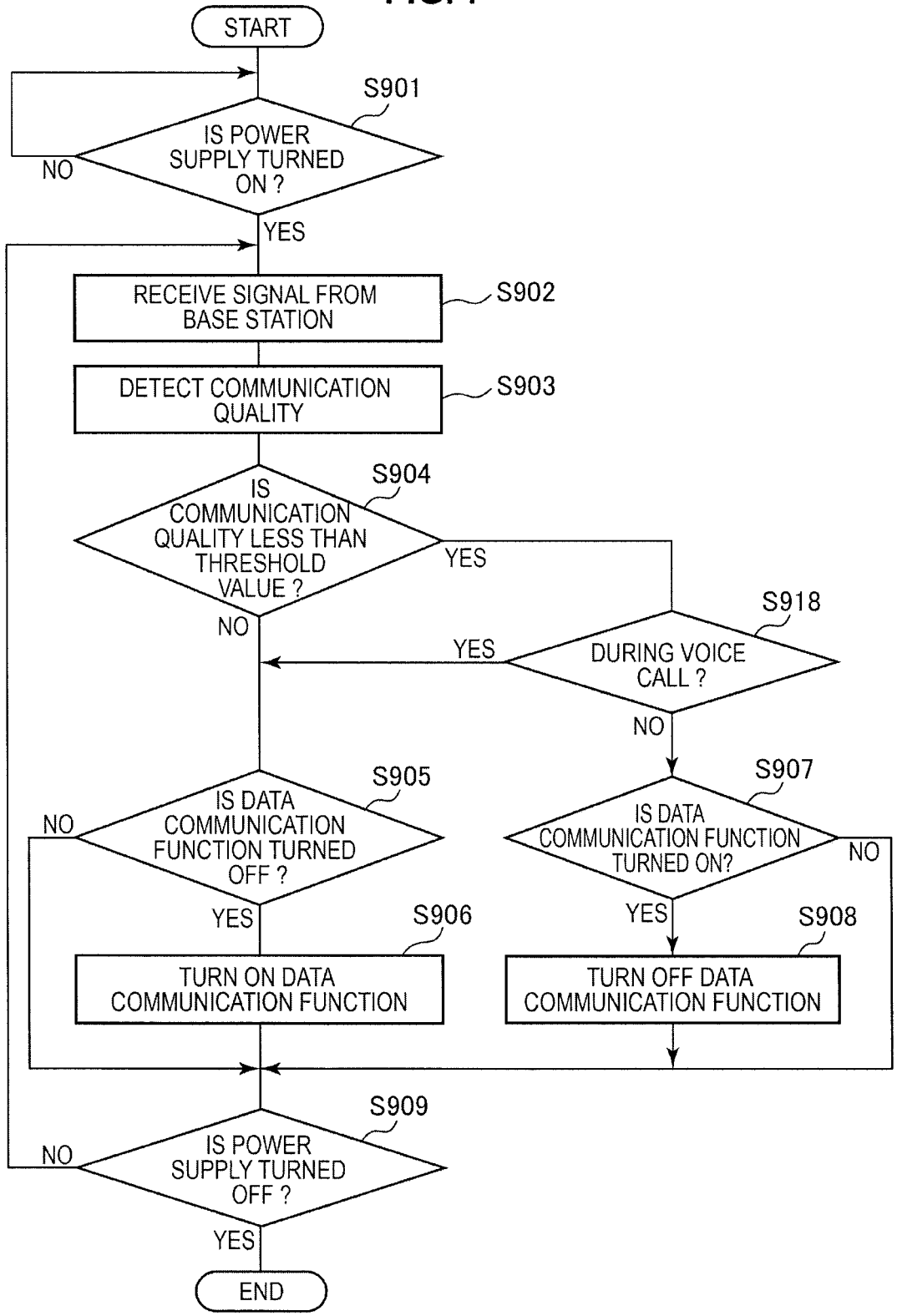
FIG. 7 is a flowchart illustrating an example of a processing sequence of data communication control processing of the wireless communication apparatus 100 according to the first embodiment of the present disclosure.

FIG. 7 is a flowchart illustrating an example of a processing sequence of the data communication control processing of the wireless communication apparatus 100 according to the first embodiment of the present disclosure. Because FIG. 7 is a modification of FIG. 3, portions common to the case of FIG. 3 are denoted with the same reference numerals and explanation thereof is omitted.

When the communication quality detected from the received signal is less than the threshold value (step S904), the data communication control unit 160 determines whether a current state is the call state, on the basis of call state information from the voice communication processing unit 130 (step S918). When the current state is the call state (step S918), the processing proceeds to step S905. Meanwhile, when the current state is not the call state (step S918), the processing proceeds to step S907.

As such, even in the case in which the acquired communication quality is bad on the basis of the threshold value, when the call using the voice call function is performed, the data communication control unit 160 may perform control to turn on the data communication function.

In this example, ON/OFF of the data communication function is controlled on the basis of a determination result on whether the current state is the call state. However, a determination result on whether the current state is a use state of a call service using best-effort packet communication, which is distinguished from voice communication provided by the voice communication processing unit 130 and enabling an emergency call, may be used. The call service is generally called an IP call service. An example using the determination result on whether the current state is the use state of the call service is described in a third embodiment of the present disclosure.

[Example of Case in which ON/OFF of Data Communication Function is Controlled on the Basis of Movement Distance]

Figure 8:
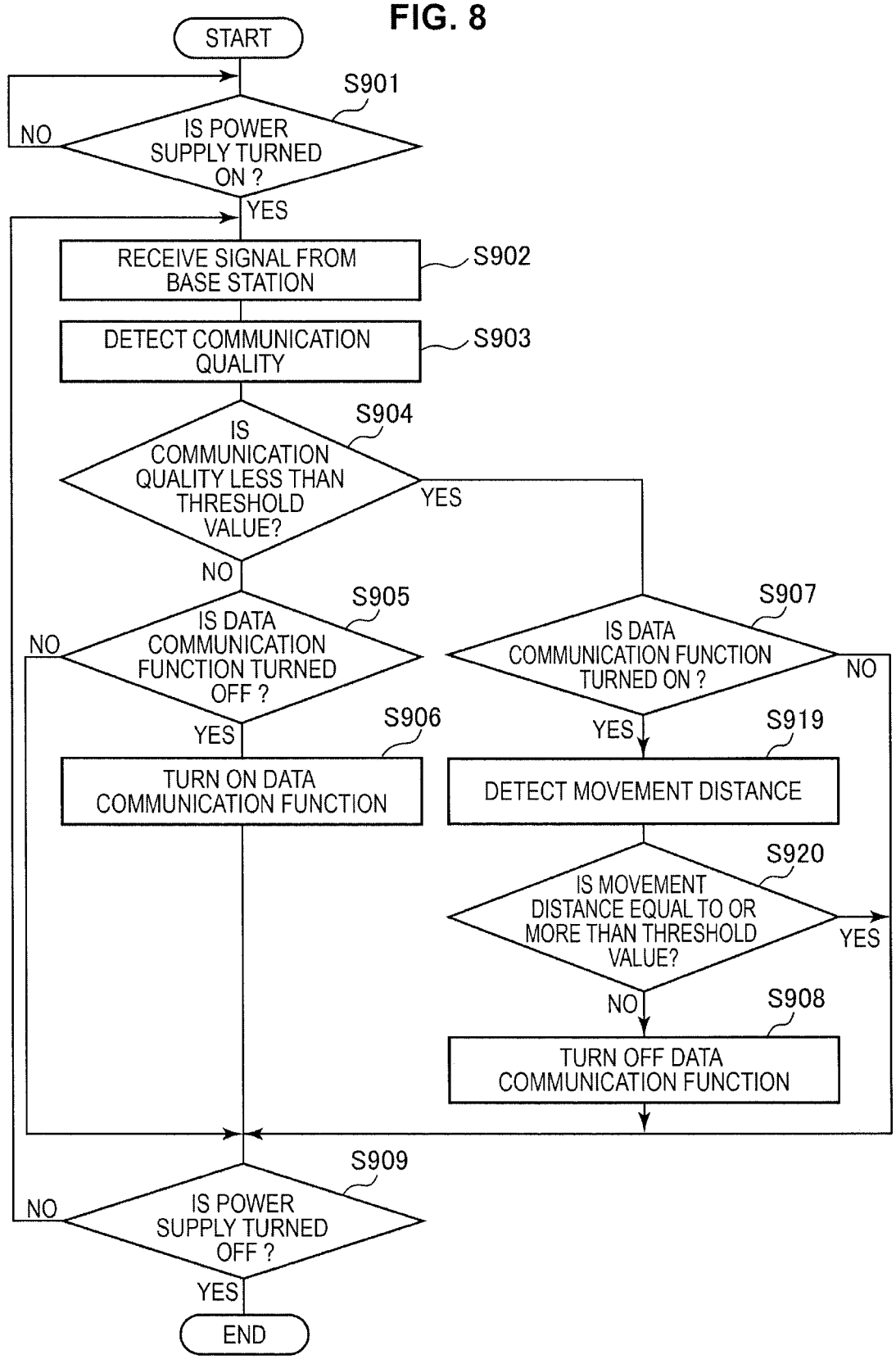
FIG. 8 is a flowchart illustrating an example of a processing sequence of data communication control processing of the wireless communication apparatus 100 according to the first embodiment of the present disclosure.

The example of the case in which ON/OFF of the data communication function is controlled on the basis of the communication quality, the display state, and the call state has been described. Here, it is assumed that the communication quality is often changed by a movement of the wireless communication apparatus 100, when the wireless communication apparatus 100 moves, even in the case in which the wireless communication apparatus 100 exists in a place where the communication quality is bad. Therefore, it is preferable not to turn off the data communication function even in an environment where the communication quality is relatively bad, when the wireless communication apparatus 100 moves. FIG. 8 illustrates an example of the case in which ON/OFF of the data communication function is controlled on the basis of the movement distance.

FIG. 8 is a flowchart illustrating an example of a processing sequence of the data communication control processing of the wireless communication apparatus 100 according to the first embodiment of the present disclosure. Because FIG. 8 is a modification of FIG. 3, portions common to the case of FIG. 3 are denoted with the same reference numerals and explanation thereof is omitted.

When the data communication function is turned on (step S907), the movement distance detecting unit 190 detects the movement distance of the wireless communication apparatus 100 (step S919). For example, the movement distance of the wireless communication apparatus 100 per unit time is calculated.

Next, the data communication control unit 160 determines whether the movement distance (for example, the movement distance per unit time) of the wireless communication apparatus 100 is equal to or more than the threshold value (step S920). When the movement distance of the wireless communication apparatus 100 is equal to or more than the threshold value (step S920), the processing proceeds to step S909. Meanwhile, when the movement distance of the wireless communication apparatus 100 is less than the threshold value (step S920), the processing proceeds to step S908.

For example, when a movement mechanism of the user is "walking", it is estimated that the movement distance per minute is less than 100 m. Therefore, 100 m can be used as the threshold value.

As such, when the movement distance (for example, the movement distance per minute) of the wireless communication apparatus 100 is equal to or more than the threshold value (for example, 100 m), it is assumed that the user possessing the wireless communication apparatus 100 moves by a movement mechanism other than the walking. For this reason, it is assumed that the wireless communication apparatus 100 moves to a place where the communication quality is good in a short time, when the wireless communication apparatus 100 exist in a place where the communication quality is relatively bad. Therefore, in the case in which the movement distance of the wireless communication apparatus 100 is equal to or more than the threshold value, the data communication function is not turned off.

Meanwhile, it is assumed that the user possessing the wireless communication apparatus 100 exists in almost the same place, when the movement distance of the wireless communication apparatus 100 is less than the threshold value. For this reason, it is assumed that the wireless communication apparatus 100 is less likely to move to a place where the communication quality is good in a short time, when the wireless communication apparatus 100 exists in a place where the communication quality is relatively bad. Therefore, in the case in which the movement distance of the wireless communication apparatus 100 is less than the threshold value, the data communication function is turned on.

As such, the data communication control unit 160 can control ON/OFF of the data communication function, on the basis of the movement distance (movement information) of the wireless communication apparatus 100 and the acquired communication quality. Specifically, when the acquired communication quality is good on the basis of the threshold value or the acquired communication quality is bad on the basis of the threshold value and the movement distance of the wireless communication apparatus 100 satisfies a predetermined condition, the data communication control unit 160 turns on the data communication function. Meanwhile, when the acquired communication quality is bad on the basis of the threshold value and the movement distance of the wireless communication apparatus 100 does not satisfy the predetermined condition, the data communication control unit 160 turns off the data communication function. Here, the predetermined condition is that the movement distance (for example, the movement distance per minute) of the wireless communication apparatus 100 is large on the basis of the threshold value (for example, 100 m).

As such, when the user stays in an environment where the communication quality is not good, the data communication is suppressed, so that generation of the communication unnecessary for the user can be suppressed.

In this example, ON/OFF of the data communication function is controlled on the basis of the movement distance of the wireless communication apparatus 100. However, ON/OFF of the data communication function may be controlled on the basis of the movement speed or the acceleration of the wireless communication apparatus 100. That is, ON/OFF of the data communication function can be controlled on the basis of the movement information of the wireless communication apparatus 100.

<2. Second Embodiment>

In the first embodiment of the present disclosure, the example of the case in which ON/OFF of the data communication function is controlled has been described. Here, an SMS (Short Message Service) is provided using a function of a CS (Circuit Switched) domain. In addition, the SMS is used as a reception notification mechanism of an e-mail with respect to the wireless communication apparatus. For this reason, particularly in the 3G, it is preferable not to turn off the SMS even in an environment where the communication quality is relatively bad, similar to the voice call.

Therefore, in a second embodiment of the present disclosure, an example of the case in which ON/OFF of the data communication functions other than the SMS is controlled in a state in which the SMS is turned on is illustrated.

[Configuration Example of Wireless Communication Apparatus]

Figure 9:
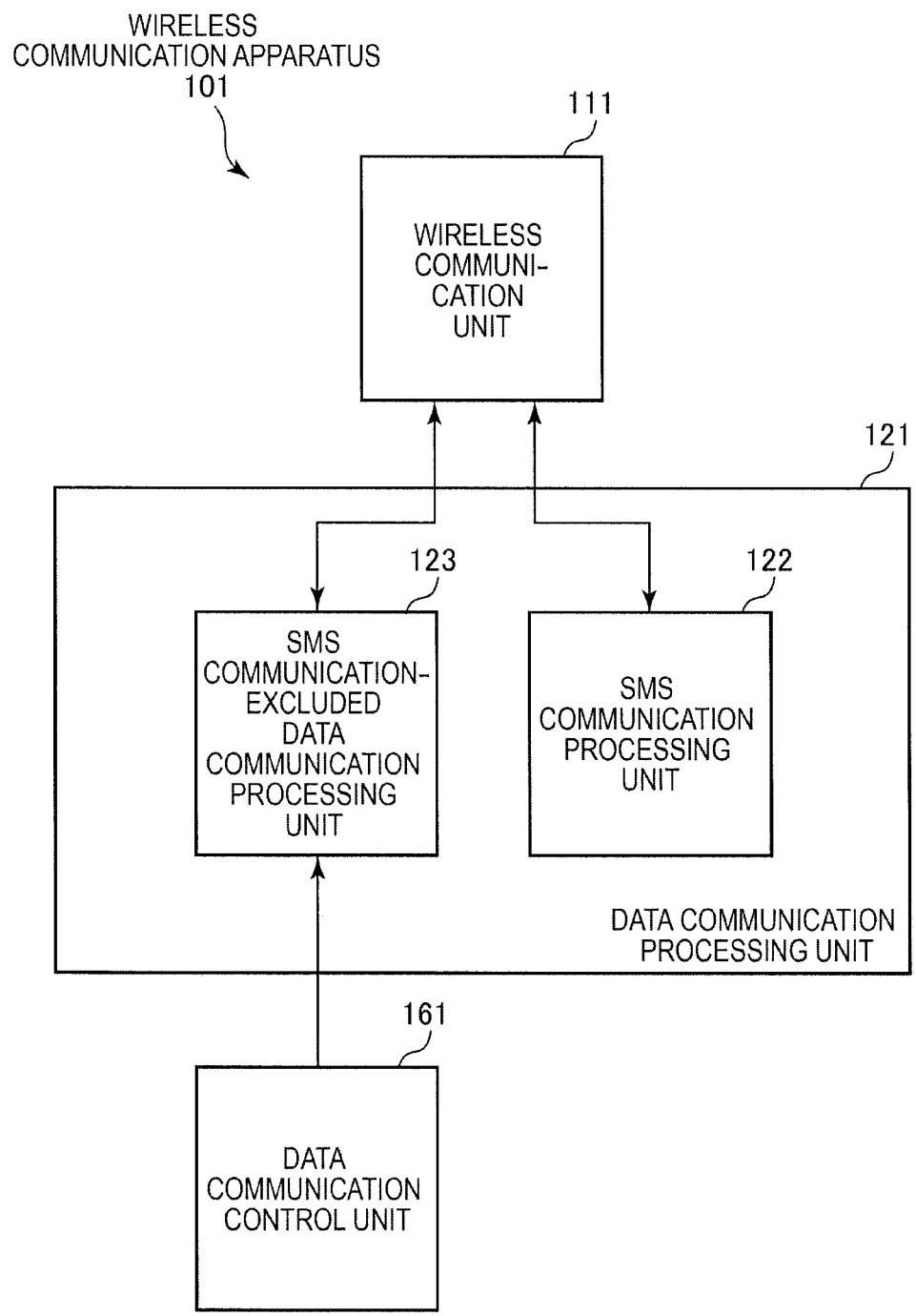
FIG. 9 is a block diagram illustrating a functional configuration example of a wireless communication apparatus 101 according to a second embodiment of the present disclosure.

FIG. 9 is a block diagram illustrating a functional configuration example of a wireless communication apparatus 101 according to the second embodiment of the present disclosure.

The wireless communication apparatus 101 includes a wireless communication unit 111, a data communication processing unit 121, and a data communication control unit 161. The wireless communication apparatus 101 is obtained by partially modifying the wireless communication apparatus 100 illustrated in FIG. 1. Specifically, the wireless communication apparatus 101 is different from the wireless communication apparatus 100 in that the wireless communication unit 111, the data communication processing unit 121, and the data communication control unit 161 are provided, instead of the wireless communication unit 110, the data communication processing unit 121, and the data communication control unit 160. For this reason, portions common to the wireless communication apparatus 100 are denoted with the same reference numerals and illustration and explanation thereof are omitted.

The data communication processing unit 121 includes an SMS communication processing unit 122 and an SMS communication-excluded data communication processing unit 123.

The SMS communication processing unit 122 executes processing regarding SMS communication through the wireless communication unit 111. The SMS communication-excluded data communication processing unit 123 executes processing regarding the data communication other than the SMS communication, through the wireless communication unit 111.

The data communication control unit 161 controls ON/OFF of the SMS communication-excluded data communication processing unit 123, on the basis of the communication quality. That is, the data communication control unit 161 performs control to turn off a data communication function other than the SMS communication, when the wireless communication apparatus 101 is in an environment where the communication quality is not good. Meanwhile, the data communication control unit 161 performs control to turn on the data communication function other than the SMS communication, when the wireless communication apparatus 101 is in an environment where the communication quality is good.

[Operation Example of Wireless Communication Apparatus]

Figure 10:
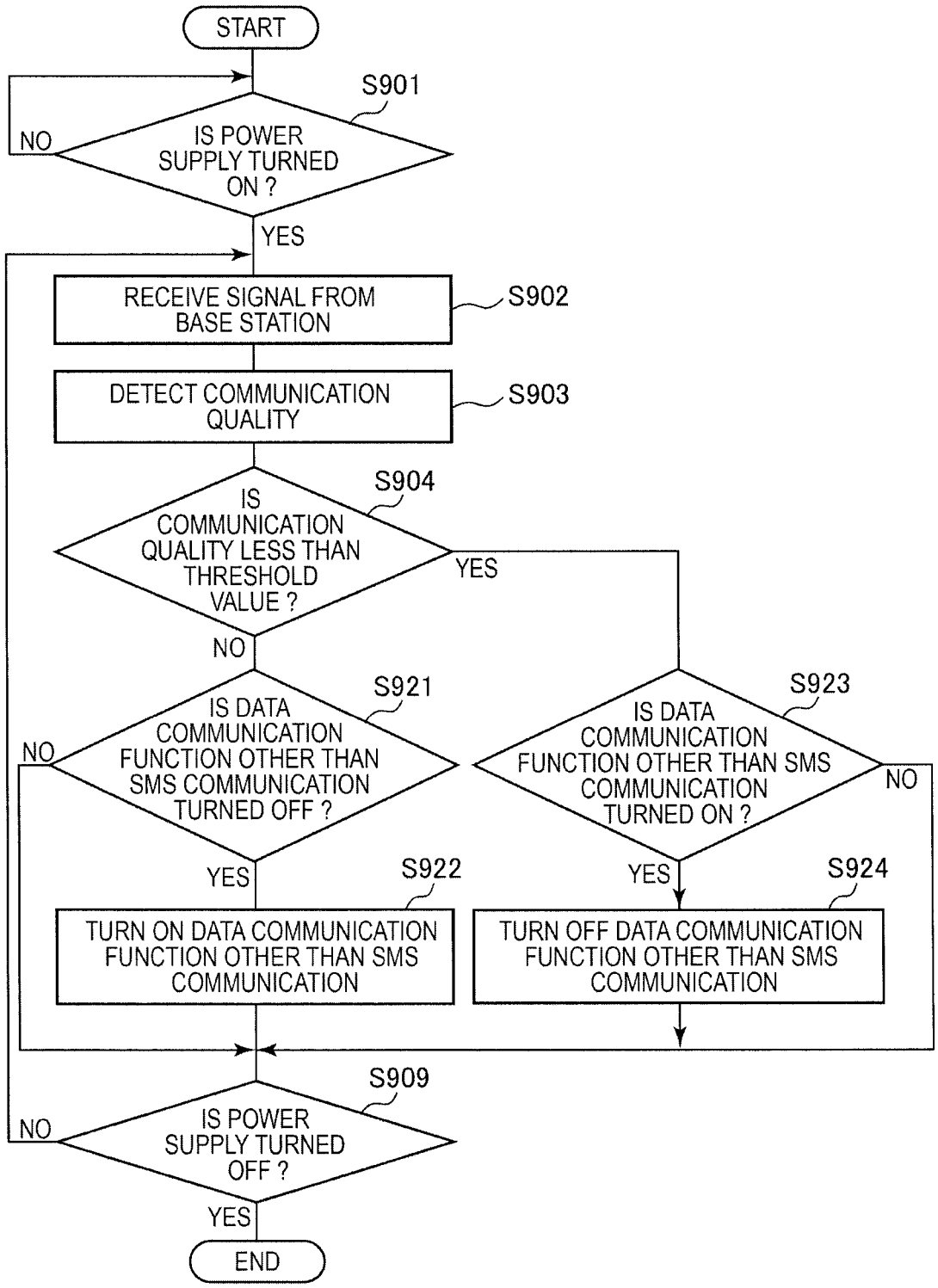
FIG. 10 is a flowchart illustrating an example of a processing sequence of data communication control processing of the wireless communication apparatus 101 according to the second embodiment of the present disclosure.

FIG. 10 is a flowchart illustrating an example of a processing sequence of data communication control processing of the wireless communication apparatus 101 according to the second embodiment of the present disclosure. Because FIG. 10 is a modification of FIG. 3, portions common to the case of FIG. 3 are denoted with the same reference numerals and explanation thereof is omitted. In this example, ON/OFF of the data communication function other than the SMS communication is controlled in a state in which the SMS communication is turned on.

When the communication quality detected from the received signal is not less than the threshold value (step S904), the data communication control unit 161 determines whether the data communication function other than the SMS communication is turned off (step S921). When the data communication function other than the SMS communication is not turned off (step S921), the processing proceeds to step S909. Meanwhile, when the data communication function other than the SMS communication is turned off (step S921), the data communication control unit 161 performs control to turn on the data communication function other than the SMS communication (step S922).

When the communication quality detected from the received signal is less than the threshold value (step S904), the data communication control unit 161 determines whether the data communication function other than the SMS communication is turned on (step S923). When the data communication function other than the SMS communication is not turned on (step S923), the processing proceeds to step S909. Meanwhile, when the data communication function other than the SMS communication is turned on (step S923), the data communication control unit 161 performs control to turn off the data communication function other than the SMS communication (step S924).

As such, the data communication functions that are included by the wireless communication apparatus 100 may include a data communication function regarding packet communication and a data communication function regarding SMS communication. In this case, the data communication control unit 161 can set a data communication function to which the high priority is set as the data communication function regarding the SMS communication and can control ON/OFF of the data communication function other than the SMS communication.

As such, only a specific communication mechanism is turned on, so that the risk of transmission delay of information with high emergency can be avoided.

<3. Third Embodiment>

In the first embodiment of the present disclosure, the example of the case in which ON/OFF of the data communication function is controlled has been described. Here, LTE and LTE-Advanced generation wireless communication based on an IP is assumed. In the LTE and LTE-Advanced generation wireless communication, the voice communication processing unit and the data communication processing unit in the wireless communication apparatus can be distinguished by a difference of QoS (Quality of Service).

For example, because a currently provided voice call service enables an emergency call, the currently provided voice call service is considered as a service that places a high value on the QoS. As a packet communication service, an existing best-effort communication service with the relatively low QoS and a communication service with the high QoS such as the voice call service provided by the carrier coexist. For this reason, the communication service with the high QoS corresponds to a communication service that is realized by the voice communication processing unit 130 illustrated in FIG. 1 and the communication service with the low QoS corresponds to a communication service that is realized by the data communication processing unit 120 illustrated in FIG. 1.

Therefore, in the third embodiment of the present disclosure, an example of the case in which ON/OFF of a data communication function to realize the communication service with the low QoS is controlled in a state in which a data communication function to realize the communication service with the high QoS is turned on is illustrated. A wireless communication apparatus according to the third embodiment of the present disclosure is obtained by partially modifying the wireless communication apparatus 100 illustrated in FIG. 1. For this reason, portions common to the wireless communication apparatus 100 are denoted with the same reference numerals and explanation thereof is omitted.

[Operation Example of Wireless Communication Apparatus]

Figure 11:
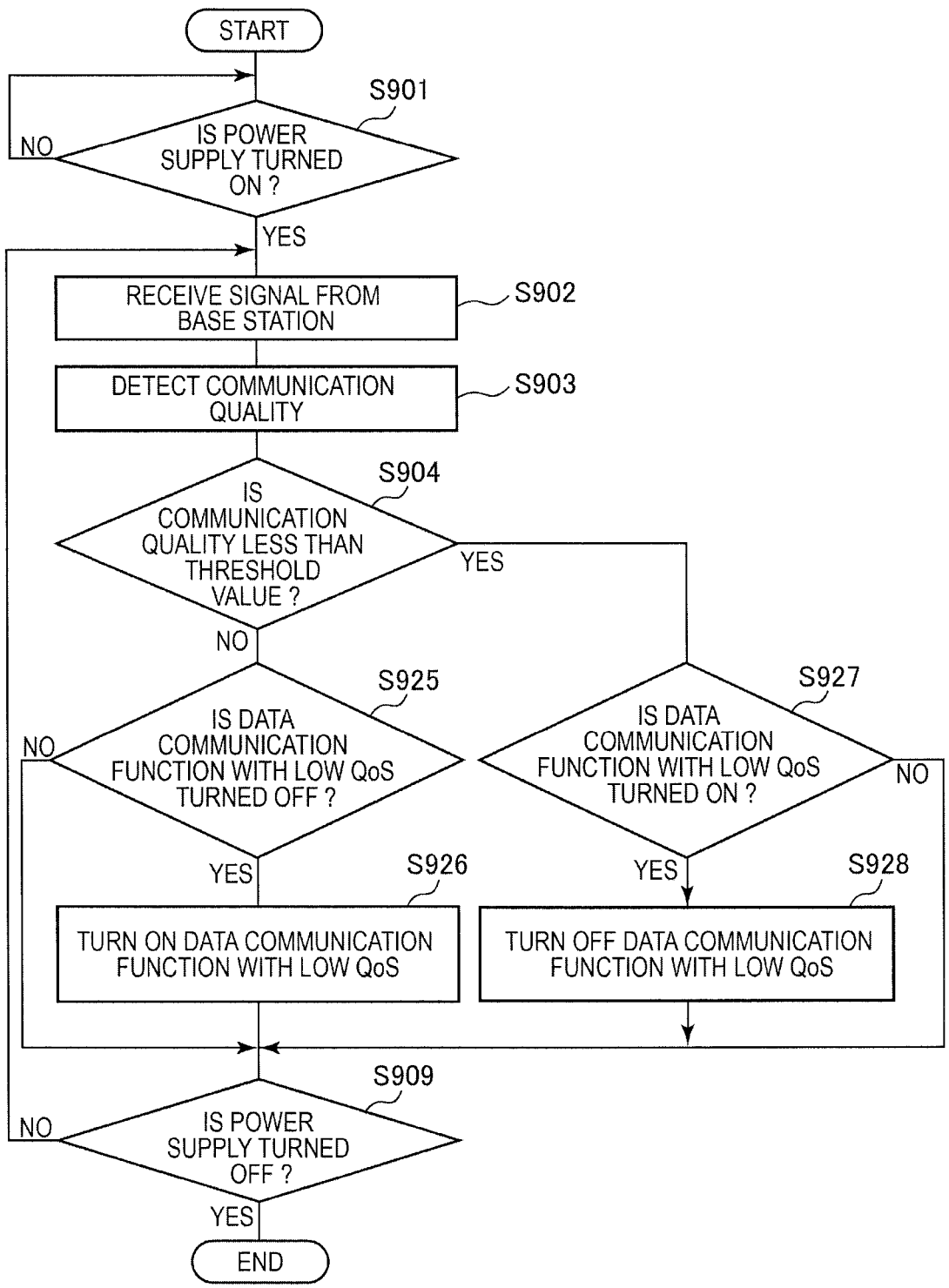
FIG. 11 is a flowchart illustrating an example of a processing sequence of data communication control processing of the wireless communication apparatus 100 according to a third embodiment of the present disclosure.

FIG. 11 is a flowchart illustrating an example of a processing sequence of data communication control processing of a wireless communication apparatus 100 according to the third embodiment of the present disclosure. Because FIG. 11 is a modification of FIG. 3, portions common to the case of FIG. 3 are denoted with the same reference numerals and explanation thereof is omitted.

When the communication quality detected from the received signal is not less than the threshold value (step S904), the data communication control unit 160 determines whether the data communication function with the low QoS is turned off (step S925). When the data communication function with the low QoS is not turned off (step S925), the processing proceeds to step S909. Meanwhile, when the data communication function with the low QoS is turned off (step S925), the data communication control unit 160 performs control to turn on the data communication function with the low QoS (step S926).

When the communication quality detected from the received signal is less than the threshold value (step S904), the data communication control unit 160 determines whether the data communication function with the low QoS is turned on (step S927). When the data communication function with the low QoS is not turned on (step S927), the processing proceeds to step S909. Meanwhile, when the data communication function with the low QoS is turned on (step S927), the data communication control unit 160 performs control to turn off the data communication function with the low QoS (step S928).

As such, the data communication function to which the high priority is set can be set as a voice call function or a data communication function regarding a voice call service to which the high priority is set. In this case, when the acquired communication quality is bad on the basis of the threshold value, the data communication control unit 160 performs control to turn on/off the other data communication functions, in a state in which the data communication function to which the high priority is set is turned on.

As such, only a specific communication mechanism is turned on, so that the risk of transmission delay of information with high emergency can be avoided.

<4. Fourth Embodiment>

In the first embodiment of the present disclosure, the example of the case in which ON/OFF of the data communication function is controlled on the basis of the communication quality has been described. Here, only a protocol (specific protocol) applying constant load or more to a network is restricted, so that wasted radio resources generated in an environment where the communication quality is not good can be decreased.

Therefore, in a fourth embodiment of the present disclosure, an example of the case in which ON/OFF of a data communication function communicated with the specific protocol is controlled in a state in which a data communication function communicated with a protocol other than the specific protocol is turned on is illustrated.

[Configuration Example of Wireless Communication Apparatus]

Figure 12:
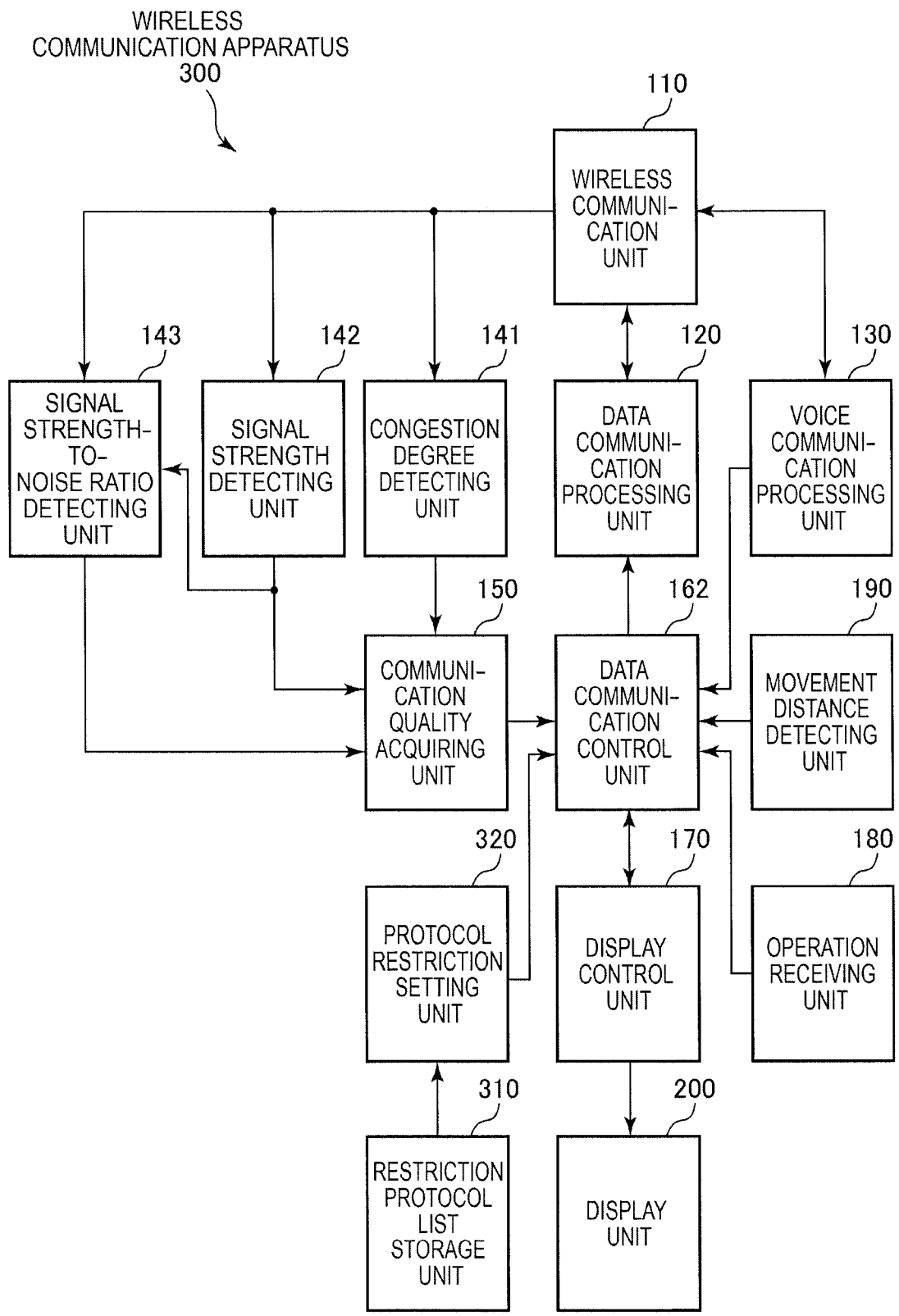
FIG. 12 is a block diagram illustrating a functional configuration example of a wireless communication apparatus 300 according to a fourth embodiment of the present disclosure.

FIG. 12 is a block diagram illustrating a functional configuration example of a wireless communication apparatus 300 according to the fourth embodiment of the present disclosure. The wireless communication apparatus 300 is obtained by partially modifying the wireless communication apparatus 100 illustrated in FIG. 1. For this reason, portions common to the wireless communication apparatus 100 are denoted with the same reference numerals and explanation thereof is omitted.

The wireless communication apparatus 300 includes a data communication control unit 162, a restriction protocol list storage unit 310, and a protocol restriction setting unit 320.

The restriction protocol list storage unit 310 stores a list (restriction protocol list) showing information regarding a protocol (specific protocol) to be turned off, when the wireless communication apparatus 300 is in an environment where the communication quality is not good. In addition, the restriction protocol list storage unit 310 supplies content of the stored restriction protocol list to the protocol restriction setting unit 320. The restriction protocol list will be described in detail with reference to FIG. 13.

Here, the restriction protocol list that is stored in the restriction protocol list storage unit 310 may be set by the user or the carrier. The restriction protocol list that is stored in the restriction protocol list storage unit 310 may be dynamically downloaded from other information processing apparatus (for example, a server) by wire or wireless and may be overwritten.

The protocol restriction setting unit 320 performs setting to control ON/OFF of the data communication function communicated with the specific protocol, using the restriction protocol list stored in the restriction protocol list storage unit 310.

The data communication control unit 162 controls ON/OFF of the data communication function communicated with the specific protocol, according to setting content set by the protocol restriction setting unit 320. For example, the data communication control unit 162 performs control to turn off the data communication function communicated with the specific protocol, when the wireless communication apparatus 300 is in an environment where the communication quality is not good. Meanwhile, the data communication control unit 162 performs control to turn on the data communication function communicated with the specific protocol, only when the wireless communication apparatus 300 is in an environment where the communication quality is good.

For example, the protocol applying the constant load or more to the network is set as the specific protocol (restriction protocol), so that wasted radio resources generated in an environment where the communication quality is not good can be decreased and the capacity can be efficiently improved. In addition, a cheap communication cost can be provided to a user who uses a scheme to turn off the data communication function communicated with the specific protocol that may apply the load to the base station, in an environment where the communication quality is not good. The user can use the scheme on the basis of the restriction protocol list stored in the restriction protocol list storage unit 310. According to a use situation (for example, a use period and the number of targeted specific protocols) of the scheme, an increase/decrease of the communication cost may be determined. Thereby, the carrier can improve the capacity and the user can receive a cheap communication service.

[Example of Restriction Protocol List]

FIG. 13 is a diagram illustrating an example of the restriction protocol list that is stored in the restriction protocol list storage unit 310 according to the fourth embodiment of the present disclosure. In FIG. 13, a relation between a protocol type 311 and a threshold value (SNR) 312 is illustrated.

As illustrated in FIG. 13, in the fourth embodiment of the present disclosure, a threshold value (threshold value (SNR) 312) is set to each protocol included in the restriction protocol list. For example, 3.0 dB is set as the threshold value to an HTTP (Hypertext Transfer Protocol) used by a web browser. In addition, 3.0 dB is set as the threshold value to an HTTPS (Hypertext Transfer Protocol over Secure Socket Layer) used by the web browser.

For example, the data communication control unit 162 performs control to turn off the data communication function communicated with the protocol in which the communication quality (SNR) becomes the threshold value (threshold value (SNR) 312) or less.

Here, each value of the threshold value (SNR) 312 is determined according to the load applied to the network. That is, the threshold value (SNR) 312 is a value that corresponds to the priority of the protocol to be turned off. For example, a relatively small threshold value is set to a protocol in which the load applied to the network is relatively small. Meanwhile, a relatively large threshold value is set to a protocol in which the load applied to the network is relatively large. That is, the high priority is set to the protocol in which the load applied to the network is relatively small and the low priority is set to the protocol in which the load applied to the network is relatively large.

For example, it is assumed that the load applied to the network is relatively small, in the HTTP and the HTTPS used by the web browser. For this reason, the relatively small threshold value is set to the HTTP and the HTTPS. That is, the high priority is set to the HTTP and the HTTPS.

A TCP (Transport Control Protocol) and a UDP (User Datagram Protocol) of a transport layer may be included in the restriction protocols. In this case, because the TCP in which retransmission is performed is a transmission method in which the load applied to the base station is relatively large, setting to preferentially turn off the TCP according to the communication quality may be performed.

The types of the protocols illustrated in FIG. 13 are not limitative but exemplary. Not applying the load to the base station according to the deterioration in the communication quality can be applied to a variety of different protocols.

The protocol restriction setting unit 320 may set only a part of the protocols illustrated in FIG. 13 as the protocols (specific protocols) to control ON/OFF of the data communication function. The setting can be performed on the basis of a user operation. The setting may be performed by the carrier.

In the example illustrated in FIG. 13, the SNR is used as the threshold value. However, other communication quality such as the SIR and the SINR may be used as the threshold value.

For example, when the communication qualities acquired by the communication quality acquiring unit 150 are classified into five steps and are used, the communication qualities of the five steps may be used as the threshold values. When the wireless communication apparatus 300 can calculate an effective communication rate (real communication rate) from the SNR, the SIR, the SINR, and the congestion degree, the effective communication rate may be set as the threshold value.

[Operation Example of Wireless Communication Apparatus]

Figure 14:
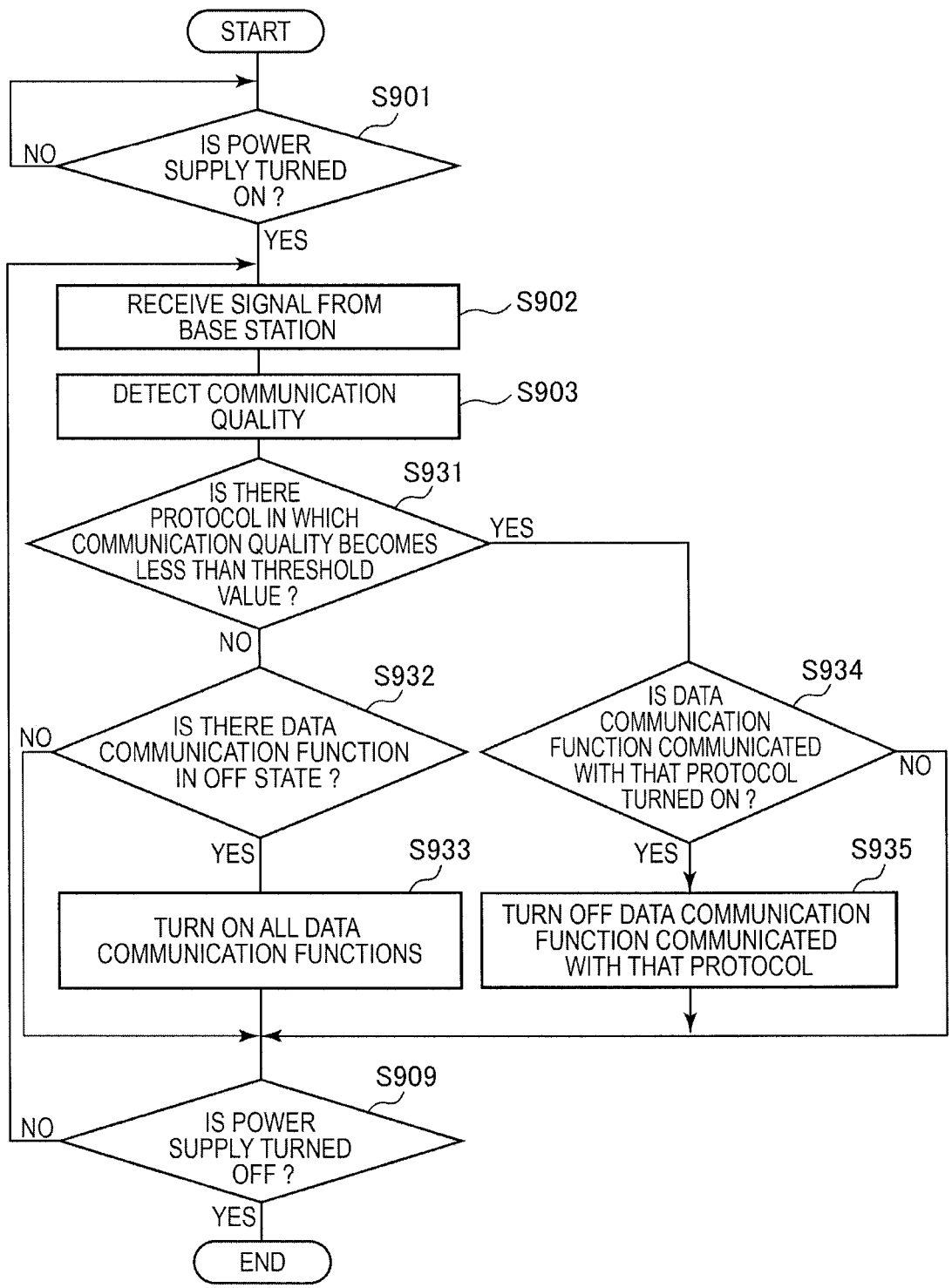
FIG. 14 is a flowchart illustrating an example of a processing sequence of data communication control processing of the wireless communication apparatus 300 according to the fourth embodiment of the present disclosure.

FIG. 14 is a flowchart illustrating an example of a processing sequence of data communication control processing of the wireless communication apparatus 300 according to the fourth embodiment of the present disclosure. Because FIG. 14 is a modification of FIG. 3, portions common to the case of FIG. 3 are denoted with the same reference numerals and explanation thereof is omitted.

The data communication control unit 162 determines whether there is a protocol in which the communication quality detected from the received signal becomes less than the threshold value (step S931). That is, it is determined whether there is a protocol in which the detected communication quality becomes less than the threshold value, among the protocols stored in the restriction protocol list storage unit 310 (step S931).

When there is no protocol in which the detected communication quality becomes less than the threshold value (step S931), the data communication control unit 162 determines whether there is a data communication function in an OFF state (step S932). When there is no data communication function in the OFF state (step S932), the processing proceeds to step S909. Meanwhile, when there is the data communication function in the OFF state (step S932), the data communication control unit 162 performs control to turn on all the data communication functions (step S933).

When there is the protocol in which the detected communication quality becomes less than the threshold value (step S931), the data communication control unit 162 determines whether the data communication function communicated with the protocol is turned on (step S934). When the data communication function communicated with the protocol is not turned on (step S934), the processing proceeds to step S909. Meanwhile, when the data communication function communicated with the protocol is turned on (step S934), the data communication control unit 162 performs control to turn off the data communication function communicated with the protocol (step S935).

As such, the data communication functions that are included by the wireless communication apparatus 300 may include data communication functions regarding a plurality of protocols. The threshold value to turn off the data communication function regarding the specific protocol is associated with the specific protocol. When the acquired communication quality is good on the basis of the threshold value associated with the specific protocol, the data communication control unit 162 turns on the data communication function regarding the specific protocol. Meanwhile, when the acquired communication quality is bad on the basis of the threshold value associated with the specific protocol, the data communication control unit 162 turns off the data communication function regarding the specific protocol.

As such, the data communication using the protocol (for example, the specific protocol in which the retransmission is performed) applying the load to the base station can be suppressed in an environment where the communication quality is deteriorated. Thereby, the radio resources that become wasted by stopping the communication service on the way can be decreased.

<Fifth Embodiment>

In the first embodiment of the present disclosure, the example of the case in which ON/OFF of the data communication function is controlled on the basis of the communication quality has been described. Here, it is assumed that there is a user who desires to use an application in which the data communication is necessary, even in an environment where the communication quality is not good. In this case, a method of turning on the data communication function only when a specific application starts or turning on the data communication function by a user operation is considered.

Therefore, in the fifth embodiment of the present disclosure, an example of the case in which ON/OFF of the data communication function is controlled when the application starts or an operation is input from the user is illustrated.

[Configuration Example of Wireless Communication Apparatus]

Figure 15:
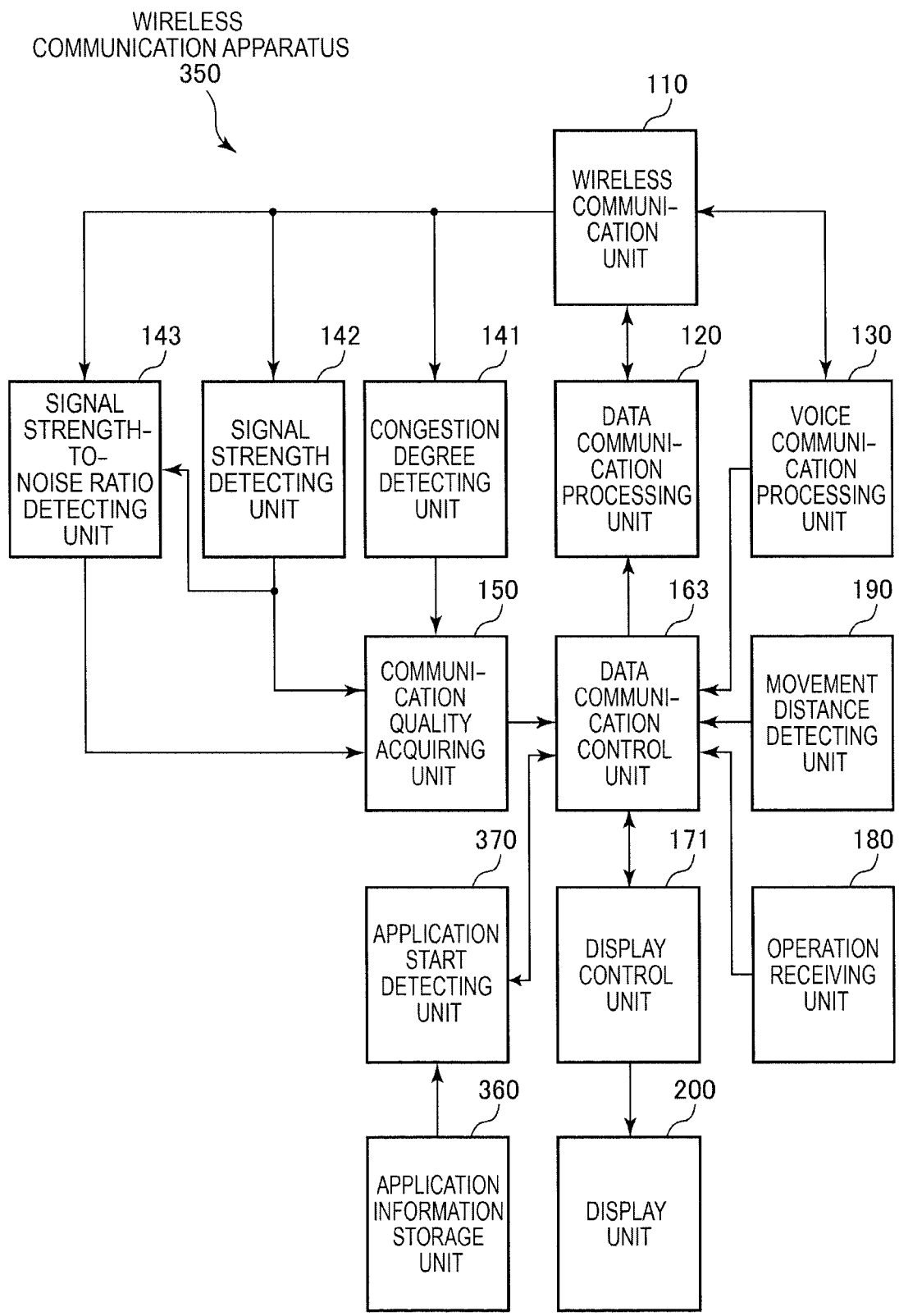
FIG. 15 is a block diagram illustrating a functional configuration example of a wireless communication apparatus 350 according to a fifth embodiment of the present disclosure.

FIG. 15 is a block diagram illustrating a functional configuration example of a wireless communication apparatus 350 according to the fifth embodiment of the present disclosure. The wireless communication apparatus 350 is obtained by partially modifying the wireless communication apparatus 100 illustrated in FIG. 1. For this reason, portions common to the wireless communication apparatus 100 are denoted with the same reference numerals and explanation thereof is omitted.

The wireless communication apparatus 350 includes a data communication control unit 163, a display control unit 171, an application information storage unit 360, and an application start detecting unit 370.

The application information storage unit 360 associates application information including information (for example, an application name) to identify an application and information regarding data communication and stores the information. In addition, the application information storage unit 360 supplies the stored application information to the application start detecting unit 370. Storage content of the application information storage unit 360 will be described in detail with reference to FIG. 16.

The application start detecting unit 370 detects a start of an application in which the data communication is necessary, on the basis of the application information stored in the application information storage unit 360. When the start of the application in which the data communication is necessary is detected, the application start detecting unit 370 notifies the data communication control unit 163 of information showing that the start of the application is detected. For example, the application start detecting unit 370 can detect the start of the application, using a method notified by an OS (Operating System) or the application. The application start detecting unit 370 may analyze a log output by the OS or the application and detect the start of the application.

[Example of Storage Content of Application Information Storage Unit]

FIG. 16 is a diagram illustrating an example of storage content of the application information storage unit 360 according to the fifth embodiment of the present disclosure. a of FIG. 16 illustrates the case in which content of automatically ON 363 is in an initial state and b of FIG. 16 illustrates the case in which the content of the automatically ON 363 is changed by a user operation.

In the application information storage unit 360, application identification information 361, data communication presence or absence 362, and the automatically ON 363 are associated with each other and are stored.

The application identification information 361 is identification information to identify an application. In FIG. 16, in order to facilitate the description, application names are simplified and illustrated in the application identification information 361.

The data communication presence or absence 362 is information that shows whether an application is an application in which the data communication is necessary. FIG. 16 illustrates an example of the case in which "presence" is stored with respect to an application in which the data communication is necessary and "absence" is stored with respect to an application in which the data communication is not necessary.

The automatically ON 363 is information that shows whether the data communication function is automatically turned on when the application in which the data communication is necessary starts. This information may be preset or may be set manually by the user on a setting screen, as illustrated in FIG. 17. FIG. 16 illustrates an example of the case in which "Yes" is stored when setting to automatically turn on the data communication function is given and "No" is stored when setting not to automatically turn on the data communication function is given. As such, information showing whether the data communication regarding the application is automatically executed is associated with the application that performs the data communication.

[Display Example of Setting Screen]

FIG. 17 is a diagram illustrating a display example of a setting screen (application option setting screen 210) that is displayed on the display unit 200 according to the fifth embodiment of the present disclosure. The application option setting screen 210 is a display screen that is used when storage content (automatically ON 363) of the application information storage unit 360 is changed.

a of FIG. 17 illustrates a display example in the case in which the content of the automatically ON 363 is in the initial state (in the case of a state illustrated in a of FIG. 16). b of FIG. 17 illustrates a display example in the case in which the content of the automatically ON 363 is set by the user operation (in the case of a state illustrated in b of FIG. 16).

On the application option setting screen 210, each item corresponding to the storage content of the application information storage unit 360 illustrated in FIG. 16 is displayed. For example, on the application option setting screen 210, an "application name" corresponding to the application identification information 361 and "automatically ON" to change the content of the automatically ON 363 are displayed. In a display region of the "automatically ON", "O (radio button)" is displayed with respect to an application in which the data communication presence or absence 362 is "presence" and "-" is displayed with respect to an application in which the data communication presence or absence 362 is "absence". On the application option setting screen 210, the change is enabled with respect to only the application in which the data communication presence or absence 362 is "presence".

For example, when the application in which the data communication is necessary starts and setting to automatically turn on the data communication function is performed, a check mark (black circle) is attached to the radio button. If a pressing operation of an OK button 211 is performed, content is determined and is stored in the application information storage unit 360. For example, the automatically ON 363 changes from "No" to "Yes" in the application information storage unit 360. When a pressing operation of a return button 212 is performed, an immediately previous screen is displayed.

As such, the applications in which the data communication is necessary can be classified into the application to automatically turn on the data communication function and the application not to automatically turn on the data communication function. When the start of the application in which the data communication is necessary is detected by the application start detecting unit 370, the data communication control unit 163 controls ON/OFF of the data communication function, according to the classification.

For example, the case in which the start of the application in which the data communication is necessary is detected by the application start detecting unit 370 in a state in which the data communication function is turned off is assumed. In this case, when the start detected application is the application to automatically turn on the data communication function (when the automatically ON 363 is "Yes"), the data communication control unit 163 performs control to turn on the data communication function. Meanwhile, when the start detected application is the application not to automatically turn on the data communication function (when the automatically ON 363 is "No"), the data communication control unit 163 does not turn on the data communication function. However, in this case, the application start detecting unit 370 notifies the display control unit 171 of information showing that the start detected application is the application not to automatically turn on the data communication function (the automatically ON 363 is "No"). For this reason, the display control unit 171 displays a display screen to allow the user to confirm whether the data communication function is turned on, on the display unit 200. This display example is illustrated in b of FIG. 18.

For example, when the start of the application in which the data communication is necessary is detected by the application start detecting unit 370 in a state in which the data communication function is turned on, special display is not performed and a normal application output is displayed on the display unit 200.

When the start of the application in which the data communication is not necessary is detected by the application start detecting unit 370, special display is not performed and a normal application output is displayed on the display unit 200.

[Example of the Case in which Data Communication Function is Turned on by User Operation]

FIG. 18 is a diagram illustrating an example of a display screen that is displayed on the display unit 200 according to the fifth embodiment of the present disclosure.

a of FIG. 18 illustrates a display example of the case in which a message display region 221 and a data communication function turning-on button 222 are displayed. In the message display region 221, messages showing that the data communication function is turned off and that the data communication function can be turned on by pressing the data communication function turning-on button 222 are displayed.

The data communication function turning-on button 222 is a button that is pressed when the data communication function is turned on. That is, if the data communication function turning-on button 222 is pressed by the user, the data communication control unit 163 performs control to turn on the data communication processing unit 120.

As such, when it is necessary for the user to execute an application due to the inevitable situation in an environment where the communication quality is not good or the user should execute the application, the user can turn on the data communication function intentionally.

b of FIG. 18 illustrates a display example of a display screen that is displayed when the application in which the data communication is necessary starts in a state in which the data communication function is turned off. On the display screen that is illustrated in b of FIG. 18, a message display region 225 and a data communication execution button 226 are displayed.

In the message display region 225, messages showing that the data communication function is turned off and that the data communication can be executed by pressing the data communication execution button 226 are displayed.

The data communication execution button 226 is a button that is pressed when the data communication function is turned on and the started application is automatically read again. That is, if the data communication execution button 226 is pressed by the user, the data communication control unit 163 performs control to turn on the data communication processing unit 120. In addition, the started application is automatically read again and the application is executed.

As such, pressing of the data communication execution button 226 becomes an operation to confirm whether the data communication is executed by starting the application in which the data communication becomes necessary, in an environment where the communication quality is deteriorated.

When the application classified into the application in which the data communication function is automatically turned on starts in a state in which the data communication function is turned off in an environment where the communication quality is not good, the data communication function is controlled to be automatically turned on. Thereby, the application with the data communication can be easily used.

The display screens that are illustrated in a and b of FIG. 18 are erased by a certain user operation (for example, an operation of a return button) or after a predetermined time passes.

When the display unit 200 is configured using a touch panel, pressing operations of the data communication function turning-on button 222 and the data communication execution button 226 are performed. However, other operation members may be used. For example, a pressing operation of each button may be performed by a certain key input using a keyboard. This display is exemplary and various modifications can be made without departing from of the present disclosure.

[Operation Example of Wireless Communication Apparatus]

Figure 19:
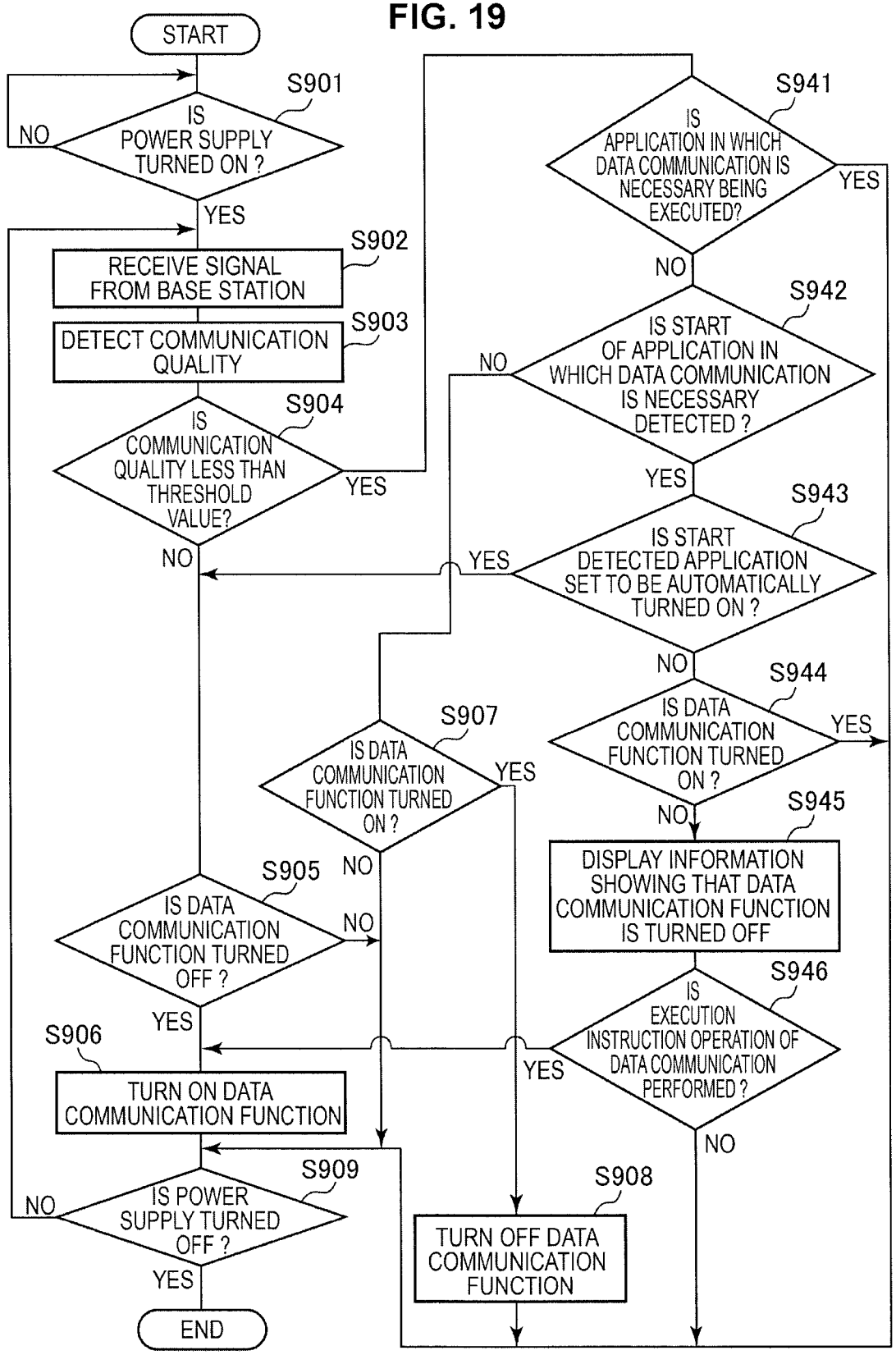
FIG. 19 is a flowchart illustrating an example of a processing sequence of data communication control processing of the wireless communication apparatus 350 according to the fifth embodiment of the present disclosure.

FIG. 19 is a flowchart illustrating an example of a processing sequence of data communication control processing of the wireless communication apparatus 350 according to the fifth embodiment of the present disclosure. Because FIG. 19 is a modification of FIG. 3, portions common to the case of FIG. 3 are denoted with the same reference numerals and explanation thereof is omitted.

When the communication quality detected from the received signal is less than the threshold value (step S904), the data communication control unit 163 determines whether the application in which the data communication is necessary is being executed (step S941). When the application in which the data communication is necessary is being executed (step S941), the processing proceeds to step S909.

When the application in which the data communication is necessary is not being executed (step S941), the data communication control unit 163 determines whether the start of the application in which the data communication is necessary is detected by the application start detecting unit 370 (step S942). When the start of the application in which the data communication is necessary is not detected (step S942), the processing proceeds to step S907.

When the start of the application in which the data communication is necessary is detected (step S942), the data communication control unit 163 determines whether the start detected application is set to be automatically turned on (step S943). When the start detected application is set to be automatically turned on (step S943), the processing proceeds to step S905.

When the start detected application is not set to be automatically turned on (step S943), the data communication control unit 163 determines whether the data communication function is turned on (step S944). When the data communication function is turned on (step S944), the processing proceeds to step S909.

When the data communication function is turned off (step S944), the display control unit 171 displays information showing that the data communication function is turned off, on the display unit 200, on the basis of the instruction from the data communication control unit 163 (step S945). For example, the display screens that are illustrated in a and b of FIG. 18 are displayed.

Next, the data communication control unit 163 determines whether an execution instruction operation of the data communication is performed (step S946). For example, when the display screen illustrated in a of FIG. 18 is displayed on the display unit 200 (step S945), it is determined whether the data communication function turning-on button 222 is pressed (step S946).

When the execution instruction operation of the data communication is performed (step S946), the processing proceeds to step S906. Meanwhile, when the execution instruction operation of the data communication is not performed (for example, when the execution instruction operation of the data communication is not performed even after the predetermined time passes) (step S946), the processing proceeds to step S909.

As such, the data communication control unit 163 can notify the user of information showing that the data communication function is turned off, at timing when the start of the application in which the data communication is necessary is detected. When the start of the application is detected, the acquired communication quality is bad on the basis of the threshold value, and the information showing that the data communication is automatically executed is associated with the application, the data communication control unit 163 turns on the data communication function. Meanwhile, when the acquired communication quality is bad on the basis of the threshold value and the information showing that the data communication is not automatically executed is associated with the application, the data communication control unit 163 turns off the data communication function.

As such, in the fifth embodiment of the present disclosure, even when the application in which the data communication is necessary erroneously starts, not an error display screen, a user-friendly display screen can be provided.

In an environment where the communication quality is bad, the application in which the data communication function may be turned off and the application n which the data communication function is not turned off can be classified. Therefore, convenience of the user can be improved.

Because the user can turn on the data communication function even in an environment where the communication quality is bad, use with flexibility is enabled.

<6. Sixth Embodiment>

In the first embodiment of the present disclosure, the example of the case in which ON/OFF of the data communication function is controlled on the basis of the communication quality has been described. Here, ON/OFF of the data communication function is controlled on the basis of the past data communication amount, so that wasted radio resources can be decreased.

Therefore, in a sixth embodiment of the present disclosure, an example of the case in which ON/OFF of the data communication function is controlled on the basis of the past data communication amount is illustrated.

[Configuration Example of Wireless Communication Apparatus]

Figure 20:
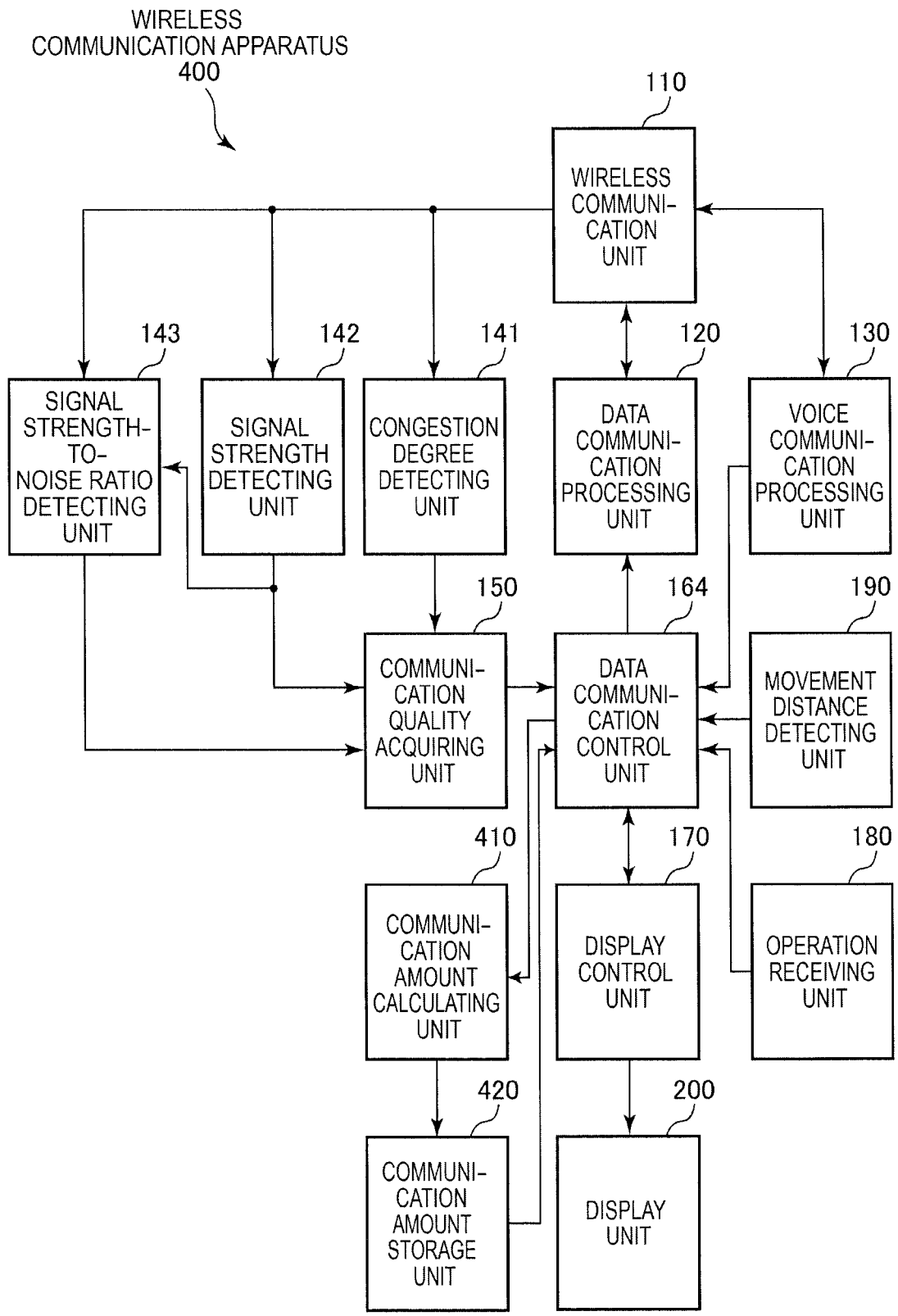
FIG. 20 is a block diagram illustrating a functional configuration example of a wireless communication apparatus 400 according to a sixth embodiment of the present disclosure.

FIG. 20 is a block diagram illustrating a functional configuration example of a wireless communication apparatus 400 according to the sixth embodiment of the present disclosure. The wireless communication apparatus 400 is obtained by partially modifying the wireless communication apparatus 100 illustrated in FIG. 1. For this reason, portions common to the wireless communication apparatus 100 are denoted with the same reference numerals and explanation thereof is omitted.

The wireless communication apparatus 400 includes a data communication control unit 164, a communication amount calculating unit 410, and a communication amount storage unit 420.

The communication amount calculating unit 410 calculates a communication amount for each connection destination and stores the calculated communication amount in the communication amount storage unit 420 for each connection destination. For example, when the application in which the data communication is necessary starts, the communication amount calculating unit 410 calculates a communication amount that is generated in a connection state with a connection destination to use the application. Here, the communication amount may be calculated for every uplink and downlink.

The communication amount storage unit 420 stores a communication amount of each connection access calculated by the communication amount calculating unit 410 as statistical information, for each connection destination (or each application). The communication amount storage unit 420 supplies the stored communication amount (statistical information) for each connection destination to the data communication control unit 164. The statistical information that is stored in the communication amount storage unit 420 will be described in detail with reference to FIG. 21. The communication amount storage unit 420 is an example of a storage unit according to an embodiment of the present disclosure.

The data communication control unit 164 controls ON/OFF of the data communication processing unit 164, on the basis of the communication quality acquired by the communication quality acquiring unit 150 and the communication amount (statistical information) for each connection destination (or each application) stored in the communication amount storage unit 420.

[Example of Storage Content of Communication Amount Storage Unit]

FIG. 21 is a diagram illustrating an example of storage content of the communication amount storage unit 420 according to the sixth embodiment of the present disclosure. a of FIG. 21 illustrates an example of the case in which the communication amount for each application is stored as the statistical information. b of FIG. 21 illustrates an example of the case in which the communication amount for each connection destination (for example, a URL (Uniform Resource Locator) and an IP address of the connection destination) is stored as the statistical information.

In the communication amount storage unit 420 illustrated in a of FIG. 21, application identification information 421 and an average communication amount 422 are associated with each other and are stored.

The application identification information 421 is identification information to identify the application. The application identification information 421 corresponds to the application identification information 361 illustrated in FIG. 16.

The average communication amount 422 is an average value of the communication amounts with respect to the application in which the data communication is necessary. For example, when one connection is performed with respect to the application in which the data communication is necessary, the communication amount regarding the connection is associated with the application and is recorded in the average communication amount 422. When a plurality of connections are performed with respect to the application in which the data communication is necessary, a value (average value) that is obtained by dividing a total value of the communication amounts regarding the plurality of connections by the number of connections is associated with the application and is recorded in the average communication amount 422.

In the communication amount storage unit 420 illustrated in b of FIG. 21, a URL and IP address 426 and an average communication amount 427 are associated with each other and are stored.

The URL and IP address 426 is information that shows a connection destination of the data communication.

The average communication amount 427 is an average value of the communication amounts with the connection destination of the data communication. A method of calculating the average communication amount is the same as the method of calculating the average communication amount illustrated in a of FIG. 21.

FIG. 21 illustrates an example of the case in which an average value of the total values of the communication amounts is stored as the statistical information, when the plurality of connections are performed. However, information regarding dispersion may be stored as the statistical information. In the communication amount storage unit 420, the communication amounts may be classified into an uplink and a downlink for each connection destination and may be stored, instead of the method of classifying the communication amounts for each connection destination and storing the communication amounts.

[Operation Example of Wireless Communication Apparatus]

Figure 22:
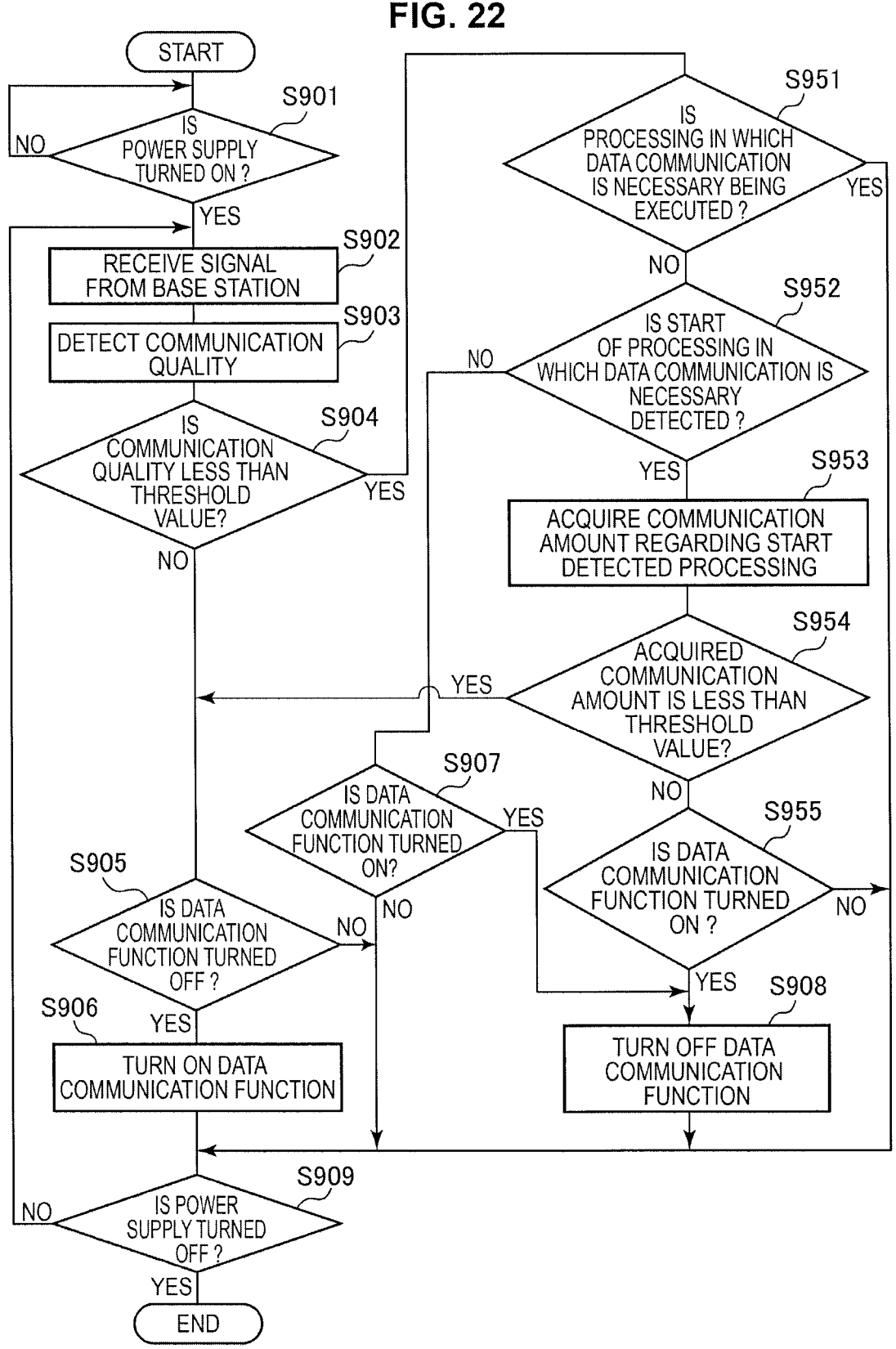
FIG. 22 is a flowchart illustrating an example of a processing sequence of data communication control processing of the wireless communication apparatus 400 according to the sixth embodiment of the present disclosure.

FIG. 22 is a flowchart illustrating an example of a processing sequence of data communication control processing of the wireless communication apparatus 400 according to the sixth embodiment of the present disclosure. Because FIG. 22 is a modification of FIG. 3, portions common to the case of FIG. 3 are denoted with the same reference numerals and explanation thereof is omitted.

When the communication quality detected from the received signal is less than the threshold value (step S904), the data communication control unit 164 determines whether the processing in which the data communication is necessary is being executed (step S951). When the processing in which the data communication is necessary is being executed (step S951), the processing proceeds to step S909.

When the processing in which the data communication is necessary is being executed, the communication amount calculating unit 410 calculates the communication amount of the data communication regarding the processing and stores the calculated communication amount in the communication amount storage unit 420 for each connection destination (or each application).

When the processing in which the data communication is necessary is not being executed (step S951), the data communication control unit 164 determines whether the start of the processing in which the data communication is necessary is detected (step S952). When the start of the processing in which the data communication is necessary is not detected (step S952), the processing proceeds to step S907.

When the start of the processing in which the data communication is necessary is detected (step S952), the data communication control unit 164 acquires the communication amount regarding the start detected processing from the communication amount storage unit 420 (step S953). For example, the communication amount that is associated with each connection destination (or each application) connected when the start detected processing is executed and is stored is acquired (step S953).

Next, the data communication control unit 164 determines whether the acquired communication amount is less than the threshold value (step S954). When the acquired communication amount is less than the threshold value (step S954), the processing proceeds to step S905. Meanwhile, when the acquired communication amount is not less than the threshold value (step S954), the data communication control unit 164 determines whether the data communication function is turned on (step S955). When the data communication function is turned on (step S955), the processing proceeds to step S908. Meanwhile, when the data communication function is turned off (step S955), the processing proceeds to step S909.

As such, the data communication control unit 164 can control ON/OFF of the data communication function, on the basis of the acquired communication amount (statistical information) and the acquired communication quality. Specifically, when the execution of the data communication is instructed, the acquired communication quality is bad on the basis of the threshold value, and the statistical information regarding the data communication satisfies the predetermined condition, the data communication control unit 164 turns on the data communication function. Meanwhile, when the acquired communication quality is bad on the basis of the threshold value and the statistical information regarding the data communication does not satisfy the predetermined condition, the data communication control unit 164 turns off the data communication function. Here, the predetermined condition is that the statistical information shows a small value on the basis of the threshold value.

As such, control can be performed such that the data communication function is turned off when the wireless communication apparatus is connected to the connection destination with the large data communication amount in an environment where the communication quality is bad and the data communication function is turned on when the wireless communication apparatus is connected to the connection destination with the small data communication amount in an environment where the communication quality is bad. That is, control to turn off the data communication function with respect to only the application with the large communication amount in an environment where the communication quality is bad is enabled.

<7. Seventh Embodiment>

In the first embodiment of the present disclosure, the example of the case in which ON/OFF of the data communication function is controlled on the basis of the communication quality has been described. Here, a protocol configuration of the LTE includes at least a C-plane (Content plane) and a U-plane (User plane). In the C-plane and the U-plane, communication paths are the same. However, the C-plane and the U-plane correspond to lower layers to be logically separated. For example, in the C-plane, various control signals are exchanged between a core network including the base station and the wireless communication apparatus. In the U-plane, user data is handled. For this reason, in the C-plane, it is preferable to turn on the data communication function at all times, as long as the data communication function is not out of service.

Therefore, in a seventh embodiment of the present disclosure, an example of the case in which ON/OFF of the data communication function in the U-plane is controlled on the basis of the communication quality, in a state in which the C-plane is turned on, is illustrated.

[Configuration Example of Communication System]

Figure 23:
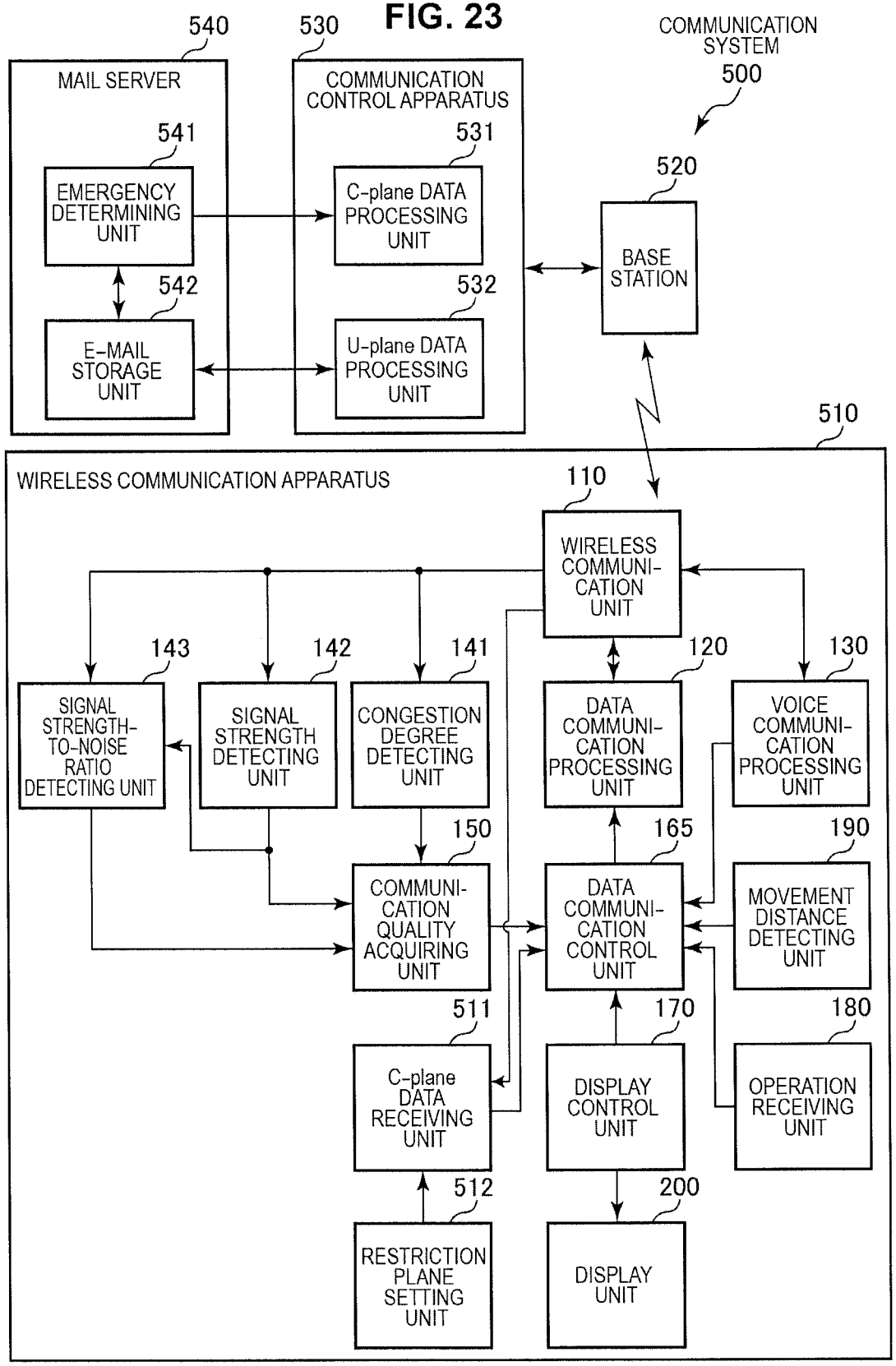
FIG. 23 is a block diagram illustrating a functional configuration example of a communication system 500 according to a seventh embodiment of the present disclosure.

FIG. 23 is a block diagram illustrating a functional configuration example of a communication system 500 according to the seventh embodiment of the present disclosure.

The communication system 500 includes a wireless communication apparatus 510, a base station 520, a communication control apparatus 530, and a mail server 540. The wireless communication apparatus 510 is obtained by partially modifying the wireless communication apparatus 100 illustrated in FIG. 1. For this reason, portions common to the wireless communication apparatus 100 are denoted with the same reference numerals and explanation thereof is omitted.

The base station 520 is a base station that is operated by the carrier. That is, the base station 520 is a moving object communication base station (NodeB or eNodeB) that connects the wireless communication apparatus holding contract authentication information regarding the carrier and the communication control apparatus 530 operated by the carrier through a wireless line.

FIG. 23 illustrates only one carrier (carrier who operates the base station 520 and the communication control apparatus 530) to facilitate the description. The present disclosure can be applied to the case in which there are two or more carriers. FIG. 23 illustrates only the base station 520 as the base station operated by the carrier to facilitate the description. However, the present disclosure can be applied to the case in which there are two or more base stations operated by the carrier.

The communication control apparatus 530 is a communication control apparatus managed by the carrier who provides a wireless connection service and performs authentication control of the wireless communication apparatus connected through the base station 520. The communication control apparatus 530 connects the authenticated wireless communication apparatus to the mail server 540. The communication control apparatus 530 and the mail server 540 are connected to a public line network (public line network such as a telephone network or the Internet). However, in FIG. 23, illustration and explanation of the public line network are omitted to facilitate the description.

The communication control apparatus 530 includes a C-plane data processing unit 531 and a U-plane data processing unit 532. The C-plane data processing unit 531 executes processing regarding the data communication in the C-plane. The U-plane data processing unit 532 executes processing regarding the data communication in the U-plane.

The mail server 540 is an information processing apparatus to execute each processing regarding management and transmission of the e-mail and includes an emergency determining unit 541 and an e-mail storage unit 542.

The emergency determining unit 541 determines whether the e-mail stored in the e-mail storage unit 542 is an e-mail with high emergency and transmits a determination result to the wireless communication apparatus 510 through the C-plane data processing unit 531 of the communication control apparatus 530.

The e-mail storage unit 542 stores an e-mail that becomes a transmission target. The stored e-mail is transmitted to the wireless communication apparatus 510 through the U-plane data processing unit 532.

The wireless communication apparatus 510 includes a data communication control unit 165, a C-plane data receiving unit 511, and a restriction plane setting unit 512.

The restriction plane setting unit 512 sets a plane to be restricted and supplies setting content to the C-plane data receiving unit 511. For example, when the U-plane is set as the plane to be restricted by the restriction plane setting unit 512, the data communication control unit 165 performs control to turn on/off the data communication function in the U-plane, on the basis of the communication quality.

The C-plane data receiving unit 511 determines whether transmission/reception of data using the U-plane is necessary, with respect to the information supplied from the wireless communication unit 110, and supplies a determination result to the data communication control unit 165. For example, when it is determined by the C-plane data receiving unit 511 that the transmission/reception of data using the U-plane is necessary, with respect to the information supplied from the wireless communication unit 110, a determination result is supplied to the data communication control unit 165. In this case, the data communication control unit 165 performs control to turn on the data communication function other than the C-plane.

For example, the case in which the wireless communication apparatus 510 receives a determination result showing that any one of the e-mails stored in the e-mail storage unit 542 of the mail server 540 is determined as the e-mail with the high emergency by the emergency determining unit 541, through the C-plane, is assumed. In this case, the C-plane data receiving unit 511 acquires the determination result and supplies the acquired determination result to the data communication control unit 165. In this case, the data communication control unit 165 turns on the data communication function other than the C-plane. Thereby, the e-mail with the high emergency can be received.

The example illustrated in FIG. 23 (the example of the e-mail) is exemplary and the present disclosure can be applied to information other than the e-mail as information received through the data communication function other than the C-plane. For example, the present disclosure can be applied to image information or information necessary for switching a USIM or an SIM (Subscriber Identity Module).

[Operation Example of Wireless Communication Apparatus]

Figure 24:
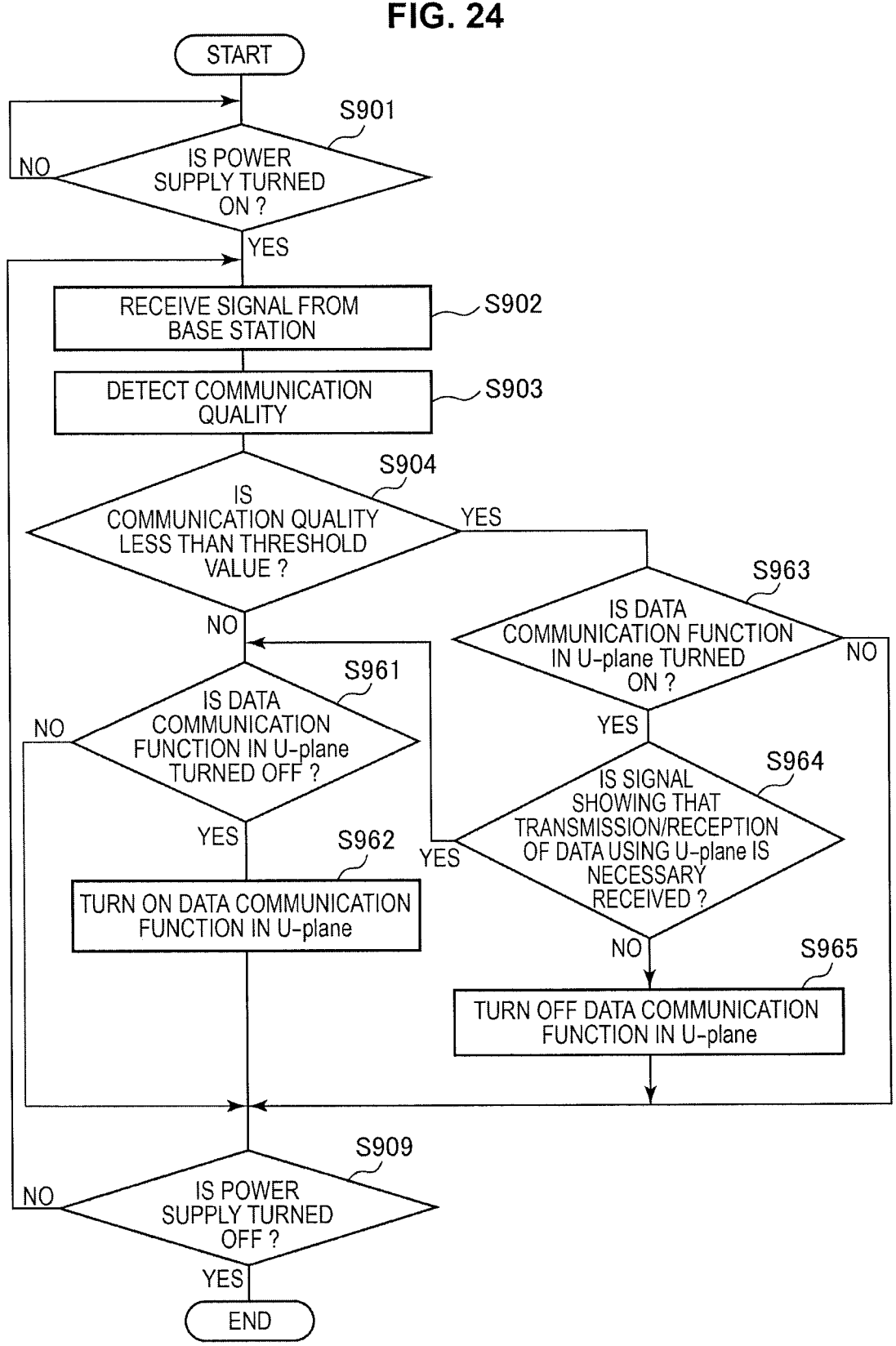
FIG. 24 is a flowchart illustrating an example of a processing sequence of data communication control processing of the wireless communication apparatus 510 according to the seventh embodiment of the present disclosure.

FIG. 24 is a flowchart illustrating an example of a processing sequence of data communication control processing of the wireless communication apparatus 510 according to the seventh embodiment of the present disclosure. Because FIG. 24 is a modification of FIG. 3, portions common to the case of FIG. 3 are denoted with the same reference numerals and explanation thereof is omitted.

When the communication quality detected from the received signal is not less than the threshold value (step S904), the data communication control unit 165 determines whether the data communication function in the U-plane is turned off (step S961). When the data communication function in the U-plane is not turned off (step S961), the processing proceeds to step S909. Meanwhile, when the data communication function in the U-plane is turned off (step S961), the data communication control unit 165 performs control to turn on the data communication function in the U-plane (step S962).

When the communication quality detected from the received signal is less than the threshold value (step S904), the data communication control unit 165 determines whether the data communication function in the U-plane is turned on (step S963). When the data communication function in the U-plane is not turned on (step S963), the processing proceeds to step S909. Meanwhile, when the data communication function in the U-plane is turned on (step S963), the C-plane data receiving unit 511 determines whether a signal showing that transmission/reception of the data using the U-plane is necessary is received (step S964). When the signal showing that transmission/reception of the data using the U-plane is necessary is received (step S964), the processing proceeds to step S961. Meanwhile, when the signal showing that transmission/reception of the data using the U-plane is necessary is not received (step S964), the data communication control unit 165 performs control to turn off the data communication function in the U-plane (step S965).

As such, in an environment where the communication quality is deteriorated, only control information having a relatively small capacity size is exchanged between the core network and the wireless communication apparatus 510. Thereby, action to stop the communication service on the way, which generates wasted radio resources, can be suppressed.

The reception of the information with the high emergency or the deterioration of the communication quality due to the concentration of the traffic is notified to the wireless communication apparatus 510 through the control information, so that the data communication can be minimized in an environment where the communication quality is deteriorated. In addition, the risk of transmission delay of information with high emergency can be avoided.

[Example of Case in which ON/OFF of Data Communication Function Other than C-Plane is Controlled by Core Network Side]

The example of the case in which the wireless communication apparatus 510 performs control to turn off the data communication function other than the C-plane on the basis of the communication quality has been described. However, a core network side may control ON/OFF of the data communication function other than the C-plane. For example, the wireless communication apparatus 510 may perform control to turn off the data communication function other than the C-plane, on the basis of a signal from the core network side received by the wireless communication apparatus 510 through the C-plane.

For example, the case in which the local traffic concentration is detected at the core network side is assumed. In this case, a control signal to perform control to turn off the data communication function other than the C-plane can be transmitted from the core network side to any wireless communication apparatus included in a local area.

[Configuration Example of Communication System]

Figure 25:
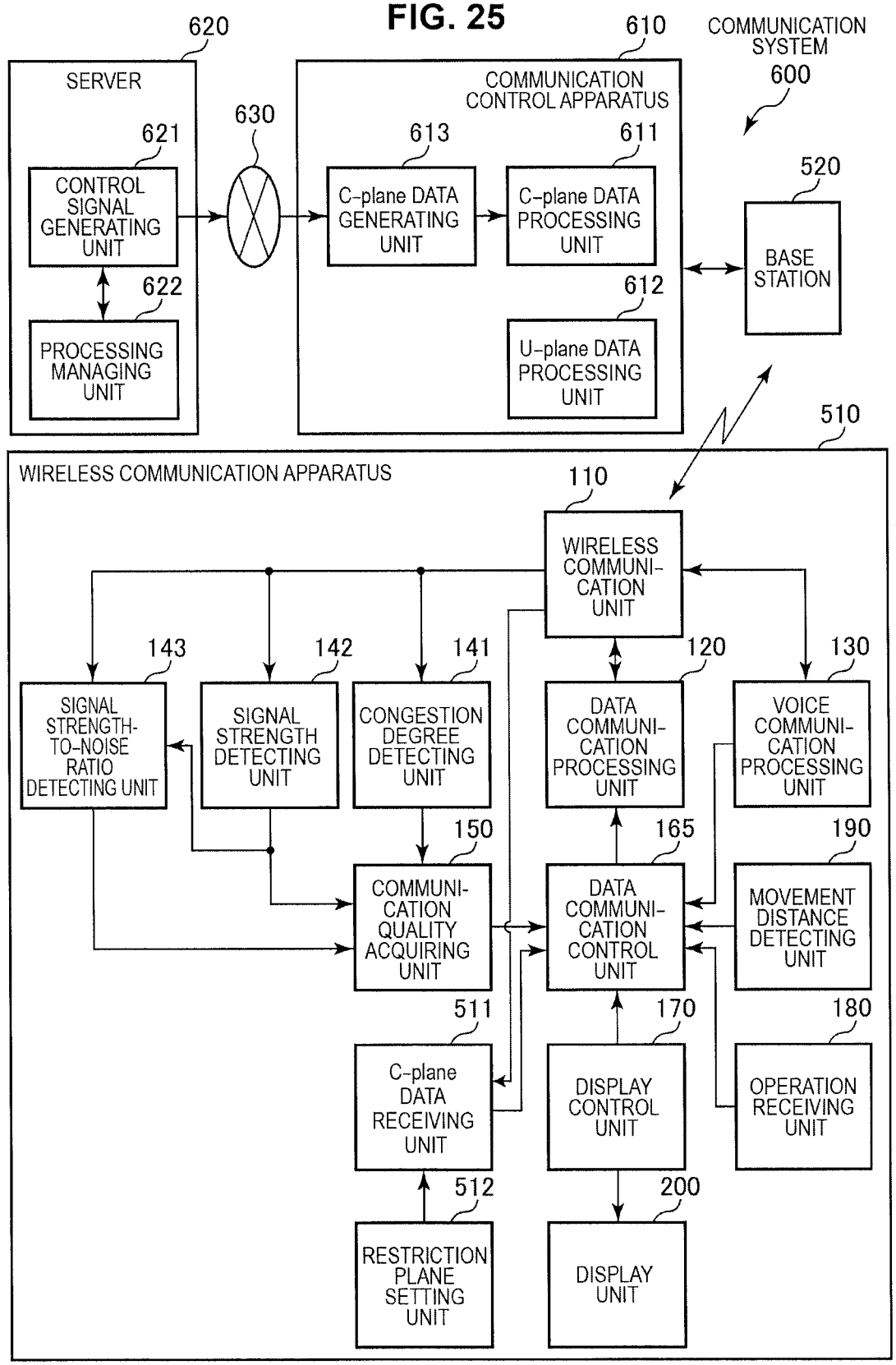
FIG. 25 is a block diagram illustrating a functional configuration example of a communication system 600 according to the seventh embodiment of the present disclosure.

FIG. 25 is a block diagram illustrating a functional configuration example of a communication system 600 according to the seventh embodiment of the present disclosure. The communication system 600 is obtained by partially modifying the communication system 500 illustrated in FIG. 23. For this reason, portions common to the communication system 500 are denoted with the same reference numerals and explanation thereof is omitted.

The communication system 600 includes a wireless communication apparatus 510, a base station 520, a communication control apparatus 610, a server 620, and a network 630.

The communication control apparatus 610 is a communication control apparatus managed by the carrier providing a wireless connection service and performs authentication control of the wireless communication apparatus connected through the base station 520. The communication control apparatus 610 connects the authenticated wireless communication apparatus to the server 620 through the network 630.

The communication control apparatus 610 includes a C-plane data processing unit 611, a U-plane data processing unit 612, and a C-plane data generating unit 613. The C-plane data processing unit 611 and the U-plane data processing unit 612 correspond to the C-plane data processing unit 531 and the U-plane data processing unit 532 illustrated in FIG. 23.

The server 620 is an information processing apparatus to execute each processing regarding the wireless communication apparatus 510 and includes a control signal generating unit 621 and a processing managing unit 622. The server 620 may be arranged in the core network and may be managed and operated by the carrier. Alternatively, the server 620 may be arranged outside the core network and may be managed and operated by a business operator other than the carrier.

The processing managing unit 622 manages each processing that is executed by the wireless communication apparatus 510. When the processing executed by the wireless communication apparatus 510 is detected, the processing managing unit 622 notifies the control signal generating unit 621 of information showing that the processing is detected.

The control signal generating unit 621 generates a control signal to turn on the data communication function other than the C-plane in the wireless communication apparatus 510. The control signal generating unit 621 outputs the generated control signal to the communication control apparatus 610 (C-plane data generating unit 613) through the network 630.

For example, when the processing managing unit 622 detects execution of USIM switching processing of the wireless communication apparatus 510, the control signal generating unit 621 generates a control signal to turn on the data communication function other than the C-plane in the wireless communication apparatus 510.

The C-plane data generating unit 613 converts the control signal output from the control signal generating unit 621 into a control signal of a format enabling communication on the C-plane and outputs the converted control signal to the C-plane data processing unit 611. As a method of converting the format, a method of describing the format in a message body of an SIP (Session Initiation Protocol) message exchanged by the C-plane in a text form can be used. As the method of converting the format, a method of preparing individual SIP messages and replacing a message with a corresponding SIP message may be used. The method of converting the format is not limited to the examples described above and other methods may be used as the method of converting the format.

The network 630 is a public line network (core network) such as a telephone network or the Internet. The network 630 and the communication control apparatus 610 are connected through a gateway (not illustrated in the drawings).

Here, the case in which the C-plane data receiving unit 511 receives the control signal (control signal to turn on the data communication function other than the C-plane) output from the communication control apparatus 530 is assumed. In this case, the data communication control unit 165 performs control according to the received control signal. For example, when the data communication function other than the C-plane is turned on, the data communication control unit 165 maintains an ON state. Meanwhile, when the data communication function other than the C-plane is turned off, the data communication control unit 165 performs control to turn on the data communication function.

Here, the case in which the processing managing unit 622 of the server 620 instructs any wireless communication apparatus (including the wireless communication apparatus 510) to execute any processing (for example, acquisition processing of the communication quality of an area where each wireless communication apparatus exists) is assumed. In this case, the control signal generating unit 621 generates a control signal to execute the processing and outputs the generated control signal to the communication control apparatus 610 (C-plane data generating unit 613) through the network 630. Next, the C-plane data generating unit 613 converts the control signal output from the control signal generating unit 621 into a control signal of a format enabling communication on the C-plane and outputs the converted control signal to the C-plane data processing unit 611. Next, the C-plane data processing unit 611 transmits the converted control signal to each wireless communication apparatus.

Each wireless communication apparatus that has received the control signal performs control according to the received control signal. For example, when the data communication function other than the C-plane is turned off, each wireless communication apparatus performs control to turn on the data communication function. Each wireless communication apparatus transmits data including the acquired communication quality to the server 620 through the U-plane.

When control to turn on the data communication function is performed in the wireless communication apparatus 510, authentication and approval processing may be executed between the wireless communication apparatus 510 and the server 620 through the C-plane. In this case, the control to turn on the data communication function becomes control to permit the data communication function other than the C-plane and the risk to make the wireless communication apparatus 510 execute unidentified processing can be avoided.

Any processing includes processing for starting an application (or an application installed) incorporated in the wireless communication apparatus 510 in advance and performing the data communication through the U-plane between the application and the server 620.

The wireless communication apparatus 510 may return a control signal to reject execution of processing requested from the server 620 to the server 620, without performing control to turn on the data communication function, in an environment where the communication quality is bad.

For example, when a cloud server executes distributed processing using a client (wireless communication apparatus), the client existing in an environment where the communication quality is bad becomes an entity that applies the load to the network. Therefore, in order to construct a cloud system not applying the load to the network, execution of the processing requested from the cloud server is rejected in an environment where the communication quality is bad, so that the processing can be executed by only the client existing in an environment where the communication quality is good.

[Communication Example]

Figure 26:
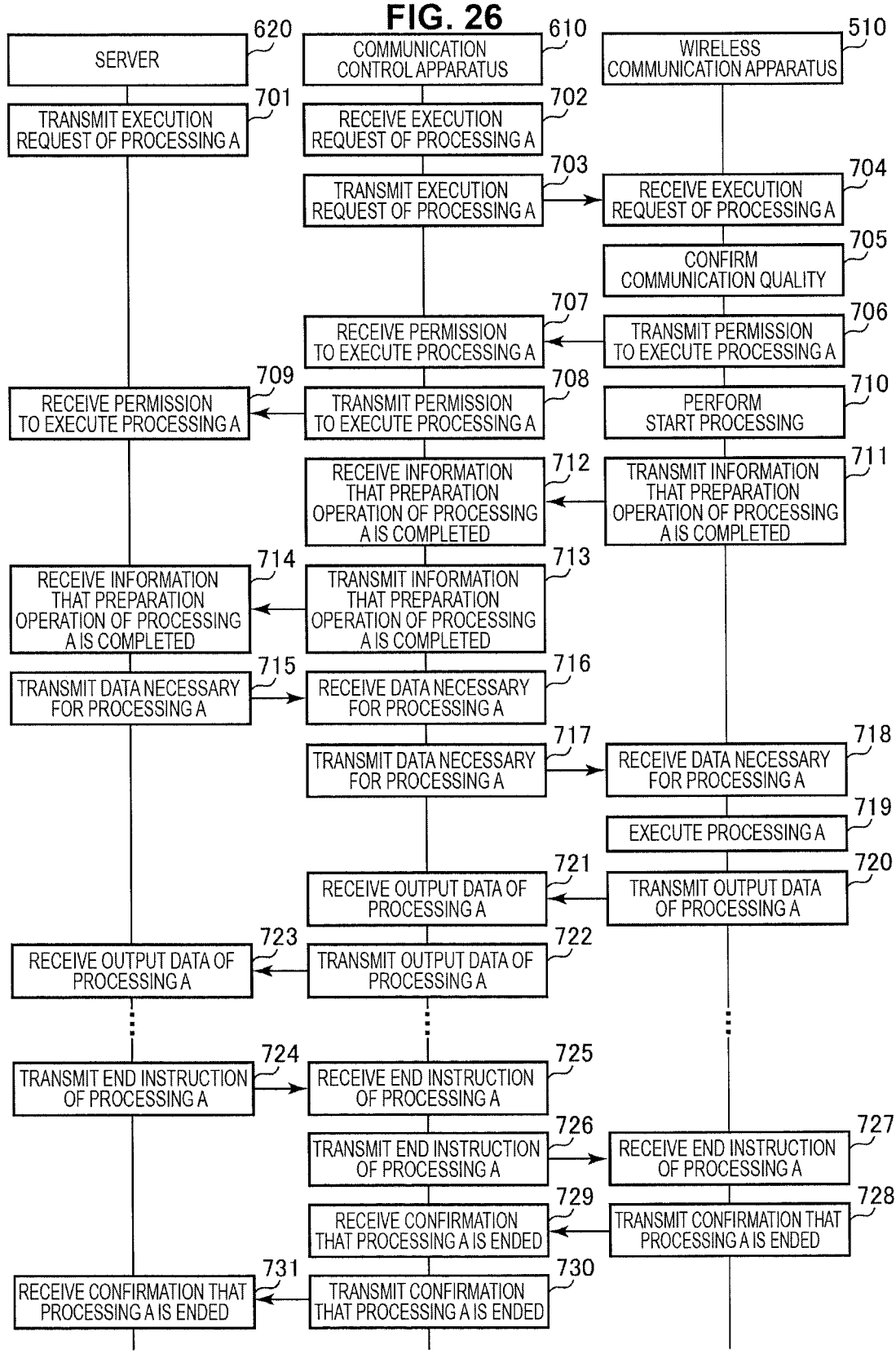
FIG. 26 is a sequence chart illustrating an example of communication processing between apparatuses constituting the communication system 600 according to the seventh embodiment of the present disclosure.

FIG. 26 is a sequence chart illustrating an example of communication processing between apparatuses constituting the communication system 600 according to the seventh embodiment of the present disclosure. FIG. 26 illustrates an example of the case in which the server 620 requests the wireless communication apparatus 510 to execute predetermined processing (processing A). In FIG. 26, illustration of the base station 520 and the server 620 is omitted to facilitate the description.

First, the server 620 transmits an execution request message of the processing A to the wireless communication apparatus 510 through the communication control apparatus 610 (701 to 704). If the execution request message of the processing A is received, the wireless communication apparatus 510 confirms the communication quality in a current area (705).

For example, the wireless communication apparatus 510 compares the communication quality acquired in the current area with the threshold value and determines whether the communication quality is less than the threshold value. When the communication quality is equal to or more than the threshold value (705), the wireless communication apparatus 510 transmits a message to permit the execution of the processing A to the server 620 through the communication control apparatus 610 (706 to 709). Meanwhile, when the communication quality is less than the threshold value (705), the wireless communication apparatus 510 transmits a message to reject the execution of the processing A to the server 620 through the communication control apparatus 610. The message is transmitted and the operation ends.

After the message to permit the execution of the processing A is transmitted to the server 620 (706), the wireless communication apparatus 510 starts an application necessary for the processing A and performs a preparation operation necessary for the execution of the processing A (710). If the preparation operation is completed (710), the wireless communication apparatus 510 transmits a message showing that the preparation operation of the processing A is completed to the server 620 through the communication control apparatus 610 (711 to 714).

After the server 620 receives the message showing that the preparation operation is completed from the wireless communication apparatus 510 (714), the server 620 transmits data necessary for the execution of the processing A to the wireless communication apparatus 510 through the communication control apparatus 610 (715 to 718).

If the wireless communication apparatus 510 receives the data necessary for the execution of the processing A (718), the wireless communication apparatus 510 starts the execution of the processing A (719). The wireless communication apparatus 510 transmits an output result obtained by executing the processing A to the server 620 through the communication control apparatus 610 (720 to 723). Hereinafter, the processing necessary for the processing A is repeated until an end instruction of the processing A is transmitted from the server 620 to the wireless communication apparatus 510 (715 to 723).

When the server 620 ends the processing necessary for the processing A, the server 620 transmits a message showing the end instruction of the processing A to the wireless communication apparatus 510 through the communication control apparatus 610 (724 to 727). If the wireless communication apparatus 510 receives the message showing the end instruction of the processing A, the wireless communication apparatus 510 ends the execution of the processing A and transmits a message showing that the wireless communication apparatus 510 understands the end of the execution of the processing A to the server 620 through the communication control apparatus 610 (728 to 731).

[Operation Example of Wireless Communication Apparatus]

Figure 27:
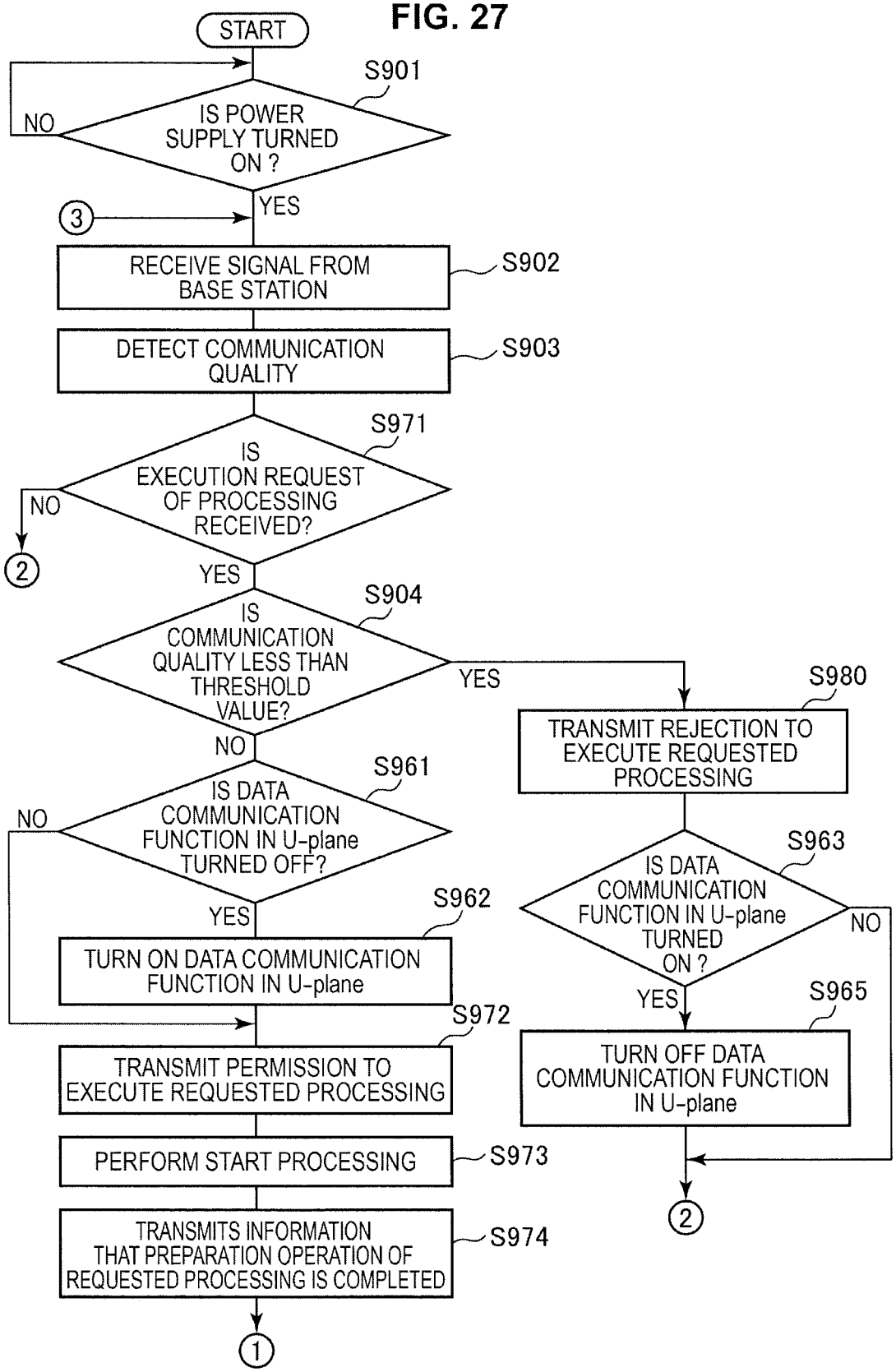
FIG. 27 is a flowchart illustrating an example of a processing sequence of data communication control processing of the wireless communication apparatus 510 according to the seventh embodiment of the present disclosure.

FIGS. 27 and 28 are flowcharts illustrating an example of a processing sequence of the data communication control processing of the wireless communication apparatus 510 according to the seventh embodiment of the present disclosure. Because FIGS. 27 and 28 are a modification of FIG. 24, portions common to the case of FIG. 24 are denoted with the same reference numerals and explanation thereof is omitted.

After the communication quality is acquired (step S903), the data communication control unit 165 determines whether the execution request message of the predetermined processing is received from the server 620 (step S971). When the execution request message of the predetermined processing is not received (step S971), the processing proceeds to step S909.

When the execution request message of the predetermined processing is received (step S971), the data communication control unit 165 confirms the communication quality in the current area (step S904). That is, it is determined whether the acquired communication quality is less than the threshold value (step S904). When the communication quality is equal to or more than the threshold value (step S904), the data communication control unit 165 determines whether the data communication function in the U-plane is turned off (step S961). When the data communication function in the U-plane is not turned off (step S961), the processing proceeds to step S927. Meanwhile, when the data communication function in the U-plane is turned off (step S961), the data communication control unit 165 performs control to turn on the data communication function in the U-plane (step S962).

Next, the data communication processing unit 120 transmits the message to permit the execution of the requested processing to the server 620 through the communication control apparatus 610 (step S972). Next, the application necessary for the requested processing starts and the preparation operation necessary for the execution of the requested processing is performed (step S973). Next, the data communication processing unit 120 transmits the message showing that the preparation operation necessary for the execution of the requested processing is completed to the server 620 through the communication control apparatus 610 (step S974).

Next, it is determined whether the data necessary for the execution of the requested processing is received (step S975). When the data necessary for the execution of the requested processing is not received, the processing proceeds to step S978. Meanwhile, when the data necessary for the execution of the requested processing is received (step S975), the requested processing is executed (step S976). Next, the data communication processing unit 120 transmits the output result obtained by executing the requested processing to the server 620 through the communication control apparatus 610 (step S977).

Next, it is determined whether the end instruction of the requested processing is transmitted from the server 620 to the wireless communication apparatus 510 (step S978). When the end instruction of the requested processing is not transmitted, the processing returns to step S975. Meanwhile, when the end instruction of the requested processing is transmitted (step S978), the execution of the requested processing ends and the message showing that the end of the execution of the requested processing has been confirmed is transmitted to the server 620 through the communication control apparatus 610 (step S979).

When the communication quality is less than the threshold value (step S904), the data communication processing unit 120 transmits the message to reject the execution of the processing to the server 620 through the communication control apparatus 610 (step S980).

In this example, the communication quality is confirmed (step S904), after it is determined whether the execution request of the predetermined processing is received (step S971). However, after the communication quality is confirmed and ON/OFF control of the data communication function in the U-plane is performed, it may be determined whether the execution request of the predetermined processing is received.

As such, a protocol hierarchy of the data communication regarding the data communication function included by the wireless communication apparatus 510 includes at least the C-plane and the U-plane. The data communication function that becomes an ON/OFF control target can be set as a data communication function regarding data communication of the protocol hierarchy other than the C-plane. In this case, the data communication control unit 165 can control ON/OFF of the data communication of the protocol hierarchy other than the C-plane, on the basis of the control data received through the C-plane and the acquired communication quality.

The mail server 540 and the server 620 can transmit the control signal showing that the data communication using the U-plane is necessary to the wireless communication apparatus 510 through the C-plane. In this case, the data communication control unit 165 of the wireless communication apparatus 510 can control ON/OFF of the data communication of the protocol hierarchy other than the C-plane, on the basis of the control data received through the C-plane and the acquired communication quality. That is, the information processing apparatuses (for example, the mail server 540 and the server 620) other than the wireless communication apparatus 510 can control ON/OFF of the data communication function in the wireless communication apparatus 510. In addition, the case in which the mail server 540 and the server 620 determine that synchronization processing of various databases is necessary between the wireless communication apparatus 510 and the mail server 540 and the server 620 is assumed. In this case, the mail server 540 and the server 620 can transmit the control signal showing that the data communication using the U-plane is necessary to the wireless communication apparatus 510 through the C-plane. The wireless communication apparatus 510 may determine execution, reservation, or rejection of the synchronization processing, according to the communication quality in the current area.

For example, the information processing apparatuses (for example, the mail server 540 and the server 620) other than the wireless communication apparatus 510 may acquire the communication quality of the wireless communication at the location where the wireless communication apparatus 510 exists. In addition, the information processing apparatuses other than the wireless communication apparatus 510 may control ON/OFF of the data communication functions other than the data communication function to which the high priority is set, among the data communication functions included by the wireless communication apparatus 510, on the basis of the acquired communication quality. The mail server 540 and the server 620 are an example of an information processing apparatus according to an embodiment of the present disclosure.

Here, various wireless systems are maintained as the wireless communication systems. The services that are used by the user are various from services having a small capacity to services having a large capacity. In the placement of the base station, because a cell edge has the low reception signal strength or is affected by interference from other cells, the communication quality is not generally good in the cell edge. In addition, the case in which the users are locally concentrated during a certain period of time, the congestion is generated in the specific base station, and the communication quality is deteriorated is assumed. In an environment where the communication quality is deteriorated, even though the user requests for the communication service, the user may not receive a service with expected quality.

For example, a wireless communication apparatus that exists in an environment where noise components (or interference components from peripheral cells) affect the reception signal strength like the cell edge is assumed. The base station transmits a signal having a low encoding rate (that is, a signal obtained by performing error correction strongly) according to a modulation method with a small information bit number per symbol to the wireless communication apparatus, by link adaptation.

Recently, sizes of data exchanged by smart phones increase. As such when the data is received at a low transmission rate, a long time is necessary when the data is demodulated at the application side. In this case, because it is difficult to know difficulty of connection at the user side, it is supposed that the user may often stop the communication on the way. At this time, the data downloaded in the past becomes wasted and valuable resources are wastefully consumed. As such, it is supposed that the user may often think that the communication is disabled and terminate the application in the middle of the reception. If this situation is frequently generated, a large amount of radio resources may be wasted.

Recently, with the spread of smart phones, the traffic rapidly increases and communication services of many carriers become hard to be connected. For this reason, it is important to prevent valuable radio resources from being wastefully used.

In a method using a volume charging system, data downloaded halfway may be targeted for charging and the cost burden on the user may increase.

Therefore, according to the embodiments of the present disclosure, the data communication of the wireless communication apparatus that may generate the wasted radio resources is automatically stopped, so that the wasted radio resources can be suppressed from being generated. The radio resources that may be wasted can be distributed to other wireless communication apparatuses in an environment where the communication quality is good. Thereby, the capacity of each base station can be improved. With respect to the voice call function (or the data communication function regarding the voice call service to which the high priority is set), it is important to enable an emergency call to be transmitted and received. For this reason, the voice call function is turned on as long as the user does not perform setting to turn off the voice call function. With respect to data communication functions regarding other call services to which the high priority is set, the data communication functions can be turned on as long as the user does not perform setting to turn off the data communication functions.

As such, ON/OFF of the data communication function is appropriately controlled according to the communication quality in the area where the wireless communication apparatus exists, so that the radio resources which may be wasted can be decreased and the capacity can be increased. That is, wireless communication resources can be efficiently used.

In the embodiments of the present disclosure, the integrally configured information processing apparatus (for example, the mail server 540 and the server 620) has been described as the example. However, the embodiments of the present disclosure can be applied to an information processing system that configures the individual units included in the information processing apparatus using a plurality of apparatuses. For example, an information processing system (for example, cloud computing) that exists on a network can be assumed.

The embodiments of the present disclosure can be applied to a portable wireless communication apparatus other than a mobile phone and a smart phone or a fixed wireless communication apparatus (for example, a wireless communication apparatus to collect data of a vending machine). The portable wireless communication apparatus is an electronic apparatus (for example, a game machine, a home appliance, a music reproducing apparatus, and a video processing apparatus) that includes the wireless communication function. For example, the fixed wireless communication apparatus can be set such that the data communication function is turned on, only when the communication quality is good. Thereby, even when the fixed wireless communication apparatus exists at the cell edge, the wireless communication resources or the consumption power can be effectively used.

In the embodiments of the present disclosure, the example of the case in which the message showing that the data communication function is turned off is displayed on the display unit 200 has been described. However, the message showing that the data communication function is turned off may be output from a sound output unit (for example, a speaker) of the wireless communication apparatus. For example, a sound message showing "because the communication quality is bad, the data communication function is turned off" can be output, whenever the data communication function is turned off. In an electronic apparatus (for example, an external sound output apparatus and an external display apparatus) that is connected to the wireless communication apparatus, the message may be output. In this case, the message is transmitted from the wireless communication apparatus to the electronic apparatus and the message is output from the electronic apparatus.

It should be understood by those skilled in the art that various modifications, combinations, sub-combinations and alterations may occur depending on design requirements and other factors insofar as they are within the scope of the appended claims or the equivalents thereof.

The processing sequences that are described in the embodiments described above may be handled as a method having a series of sequences or may be handled as a program for causing a computer to execute the series of sequences and recording media storing the program. As the recording media, a hard disk, a CD (Compact Disc), an MD (Mini-Disc), and a DVD (Digital Versatile Disk) can be used. In addition, a memory card and a Blu-ray disc (registered trademark) can be used.

Additionally, the present technology may also be configured as below.

(1) An information processing apparatus including:

an acquiring unit that acquires communication quality of wireless communication at a location where a wireless communication apparatus exists; and a control unit that controls ON/OFF of another data communication function other than a data communication function to which a high priority is set, among data communication functions included by the wireless communication apparatus, based on the acquired communication quality.

(2) The information processing apparatus according to (1),
wherein the data communication function to which the high priority is set is a voice call function or a data communication function regarding a voice call service to which the high priority is set, and
wherein when the acquired communication quality is low based on a threshold value, the control unit performs control to turn off the other data communication function in a state in which the data communication function to which the high priority is set is turned on.

(3) The information processing apparatus according to (1) or (2),
wherein, when the acquired communication quality is high based on a threshold value, the control unit performs control to turn on the other data communication function, and when the acquired communication quality is low based on the threshold value, the control unit performs control to turn off the other data communication function.

(4) The information processing apparatus according to (3),
wherein, when a call using a voice call function is performed even though the acquired communication quality is low based on the threshold value, the control unit performs control to turn on the other data communication function.

(5) The information processing apparatus according to (3) or (4),
wherein the control unit controls ON/OFF of the other data communication function, based on a display unit included in the wireless communication apparatus and the acquired communication quality.

(6) The information processing apparatus according to (5),
wherein, when the display unit is not in a display state even though the acquired communication quality is high based on a threshold value, the control unit performs control to turn off the other data communication function, and when the display unit is in the display state even though the acquired communication quality is low based on the threshold value, the control unit performs control to turn on the other data communication function.

(7) The information processing apparatus according to any one of (1) to (6), further including:
a movement information acquiring unit that acquires movement information regarding a movement of the wireless communication apparatus,
wherein the control unit controls ON/OFF of the other data communication function, based on the acquired movement information and the acquired communication quality.

(8) The information processing apparatus according to (7),
wherein, when the acquired communication quality is high based on a threshold value or when the acquired communication quality is low based on the threshold value and the acquired movement information satisfies a predetermined condition, the control unit performs control to turn on the other data communication function, and when the acquired communication quality is low based on the threshold value and the acquired movement information does not satisfy the predetermined condition, the control unit performs control to turn off the other data communication function.

(9) The information processing apparatus according to (1),
wherein the data communication functions that are included by the wireless communication apparatus include a data communication function regarding packet communication and a data communication function regarding SMS communication, and
wherein the data communication function to which the high priority is set is the data communication function regarding the SMS communication.

(10) The information processing apparatus according to (1),
wherein the data communication functions that are included by the wireless communication apparatus include data communication functions regarding a plurality of protocols, and
wherein the other data communication function is a data communication function regarding a specific protocol.

(11) The information processing apparatus according to (10),
wherein a threshold value to turn off the data communication functions regarding the specific protocol is associated with the specific protocol, and
wherein when the acquired communication quality is high based on the threshold value associated with the specific protocol, the control unit performs control to turn on the other data communication function, and when the acquired communication quality is low based on the threshold value associated with the specific protocol, the control unit performs control to turn off the other data communication function.

(12) The information processing apparatus according to any one of (1) to (11), further including:
an application start detecting unit that detects a start of an application performing data communication,
wherein the control unit notifies a user of information showing that the other data communication function is turned off, at timing when the start of the application is detected.

(13) The information processing apparatus according to (12),
wherein information showing whether the data communication regarding the application is automatically executed is associated with the application performing the data communication, and
wherein in a case in which the start of the application performing the data communication is detected, when the acquired communication quality is high based on a threshold value or when the acquired communication quality is low based on the threshold value and information showing that the data communication is automatically executed is associated with the application, the control unit performs control to turn on the other data communication function and when the acquired communication quality is low based on the threshold value and information showing that the data communication is not automatically executed is associated with the application, the control unit performs control to turn off the other data communication function.

(14) The information processing apparatus according to any one of (1) to (13), further including:
a storage unit that stores, as statistical information, a communication amount when data communication using the data communication functions is performed,
wherein the control unit controls ON/OFF of the other data communication function, based on the statistical information and the acquired communication quality.

(15) The information processing apparatus according to (14),
wherein, in the case in which execution of the data communication is instructed, when the acquired communication quality is high based on the threshold value or when the acquired communication quality is low based on the threshold value and the statistical information regarding the data communication satisfies a predetermined condition, the control unit performs control to turn on the other data communication function and when the acquired communication quality is low based on the threshold value and the statistical information regarding the data communication does not satisfy the predetermined condition, the control unit performs control to turn off the other data communication function.

(16) The information processing apparatus according to (1), wherein a protocol hierarchy of data communication regarding the data communication functions included by the wireless communication apparatus includes at least a Control plane and a User plane, wherein the other data communication function is a data communication function regarding the data communication of the protocol hierarchy other than the Control plane, and wherein the control unit controls ON/OFF of the data communication of the protocol hierarchy other than the Control plane, based on control data received through the Control plane and the acquired communication quality.

(17) The information processing apparatus according to any one of (1) to (16), wherein, when the other data communication function is turned off, the control unit notifies a user of information showing that the other data communication function is turned off.

(18) A communication system including:

an information processing apparatus that transmits a control signal, which shows that data communication using a User plane in data communication of a protocol hierarchy including at least a Control plane and the User plane is necessary, to a wireless communication apparatus through the Control plane; and a wireless communication apparatus that includes an acquiring unit to acquire communication quality of wireless communication at a location where the wireless communication apparatus exists and a control unit to control ON/OFF of the data communication of a protocol hierarchy other than the Control plane, based on control data received through the Control plane and the acquired communication quality.

(19) An information processing method including:

acquiring communication quality of wireless communication at a location where a wireless communication apparatus exists; and controlling ON/OFF of another data communication function other than a data communication function to which a high priority is set, among data communication functions included by the wireless communication apparatus, based on the acquired communication quality.

(20) A program for causing a computer to execute:

acquiring communication quality of wireless communication at a location where a wireless communication apparatus exists; and controlling ON/OFF of another data communication function other than a data communication function to which a high priority is set, among data communication functions included by the wireless communication apparatus, based on the acquired communication quality.

The present disclosure contains subject matter related to that disclosed in Japanese Priority Patent Application JP 2012-225583 filed in the Japan Patent Office on Oct. 11, 2012, the entire content of which is hereby incorporated by reference.

What is claimed is:

1. An information processing apparatus, comprising:
one or more processors configured to:
acquire communication quality information from a wireless communication apparatus;
detect, based on the acquired communication quality information, a congestion degree of wireless communication at a location where the wireless communication apparatus exists,
wherein the congestion degree is based on a ratio of a count of radio resources allocated to the wireless communication apparatus and a count of radio resources associated with a base station,
the wireless communication apparatus is connected to the base station, and
the wireless communication apparatus comprises a display unit;
determine a first state of a first data communication function of a plurality of data communication functions of the wireless communication apparatus,
wherein the first state is one of an ON state or an OFF state;
execute a second data communication function of the plurality of data communication functions,
wherein the second data communication function has a highest priority among the plurality of data communication functions;
control the first state of the first data communication function, based on:
a display state of the display unit, wherein the display state is one of an ON display state or an OFF display state;
the execution of the second data communication function;
the one of the ON state or the OFF state; and
the congestion degree; and
control the display unit, based on the controlled first state of the first data communication function, to display a message that indicates the controlled first state of the first data communication function, wherein the message includes text information and image information.

2. The information processing apparatus according to claim 1,
wherein the second data communication function is one of a voice call function related to a voice call service or a data communication function related to the voice call service, and
the one or more processors are further configured to turn off the first data communication function, based on determining whether:
the first state is the ON state; and
the congestion degree is higher than a threshold value.

3. The information processing apparatus according to claim 1, wherein the one or more processors are further configured to:
turn on the first data communication function, based on determining that the congestion degree is lower than a threshold value, and
turn off the first data communication function, based on determining that the congestion degree is higher than the threshold value.

4. The information processing apparatus according to claim 1, wherein the one or more processors are further configured to one of
turn off the first data communication function, based on determining whether:
the display state of the display unit is the OFF display state; and
the congestion degree is lower than a threshold value, or
turn on the first data communication function, based on determining whether:

the display state of the display unit is in the ON display state; and the congestion degree is higher than the threshold value.

5. The information processing apparatus according to claim 1, wherein the one or more processors are further configured to:
acquire movement information corresponding to a movement of the wireless communication apparatus; and
one of turn on the first data communication function, based on determining whether:
the congestion degree is higher than a threshold value; and
the acquired movement information satisfies a condition, or
turn off the first data communication function, based on determining whether:
the congestion degree is higher than the threshold value; and
the acquired movement information does not satisfy the condition.

6. The information processing apparatus according to claim 1, wherein the second data communication function is associated with SMS communication.

7. The information processing apparatus according to claim 1, wherein the first data communication function is a specific protocol based communication function.

8. The information processing apparatus according to claim 7,
wherein a threshold value is associated with the specific protocol, and
the one or more processors are further configured to one of
turn on the first data communication function, based on determining whether the congestion degree is lower than the threshold value associated with the specific protocol,
or
turn off the first data communication function, based on determining whether the congestion degree is higher than the threshold value associated with the specific protocol.

9. The information processing apparatus according to claim 1, wherein the one or more processors are further configured to:
detect a start of an application for data communication, and generate notification information which shows that the first data communication function is in the OFF state,
wherein the notification information is generated based on the detection of the start of the application.

10. The information processing apparatus according to claim 9, wherein the one or more processors are further configured to:
determine first information that indicates an execution mode of the start of the application; and one of
turn on the first data communication function, based on one of
the detection of the start of the application, and whether the congestion degree is lower than a threshold value, or
determining whether the congestion degree is higher than the threshold value and the first information indicates that the execution mode is an automatic mode,
or
turn off the first data communication function, based on determining whether:
the congestion degree is higher than the threshold value; and the first information indicates that the execution mode is other than the automatic mode.

11. The information processing apparatus according to claim 1, wherein the one or more processors are further configured to:
store, as statistical information, an amount of data communication,
wherein the amount of data communication is associated with execution of the plurality of data communication functions; and
control the first state of the first data communication function, based on the statistical information.

12. The information processing apparatus according to claim 11, wherein the one or more processors are further configured to one of
turn on the first data communication function, based on one of
determining whether the congestion degree is lower than a threshold value, or
determining whether the congestion degree is higher than the threshold value and the statistical information satisfies a condition, or
turn off the first data communication function, based on determining whether:
the congestion degree is higher than the threshold value; and
the statistical information does not satisfy the condition.

13. The information processing apparatus according to claim 1,
wherein a protocol hierarchy of data communication corresponding to each of the plurality of data communication functions is classified into at least one of a Control plane or a User plane, and the one or more processors are further configured to:
receive control data via the Control plane of the first data communication function; and
control a state of a third data communication function of the plurality of data communication functions, based on the control data and the congestion degree.

14. The information processing apparatus according to claim 1,
wherein the one or more processors are further configured to generate notification information that indicates that the first state is the OFF state.

15. A communication system, comprising:
a wireless communication apparatus comprising one or more processors; and
an information processing apparatus configured to transmit control data to the wireless communication apparatus via a Control plane, wherein the control data indicates a necessity of a User plane for a data communication in a protocol hierarchy, the protocol hierarchy includes at least one of the Control plane or the User plane, and the one or more processors are configured to:
receive the control data;
acquire communication quality information from the wireless communication apparatus;
detect, based on the acquired communication quality information, a congestion degree of wireless communication at a location where the wireless communication apparatus exists, wherein the congestion degree is based on a ratio of a count of radio resources allocated to the wireless communication apparatus and a count of radio resources associated with a base station, the wireless communication apparatus is connected to the base station, and
the wireless communication apparatus comprises a display unit;
determine a state of a first data communication function of a plurality of data communication functions of the wireless communication apparatus, wherein the state is one of an ON state or an OFF state;
execute a second data communication function of the plurality of data communication functions, wherein the second data communication function has a highest priority among the plurality of data communication functions;
control the state of the first data communication function, based on:
the execution of the second data communication function;
the control data;
the one of the ON state or the OFF state; and
the congestion degree; and
control the display unit, based on the controlled state of the first data communication function, to display a message that indicates the controlled state of the first data communication function, wherein the message includes text information and image information.

16. An information processing method, comprising:
acquiring communication quality information from a wireless communication apparatus;
detecting, based on the acquired communication quality information, a congestion degree of wireless communication at a location where the wireless communication apparatus exists, wherein the congestion degree is based on a ratio of a count of radio resources allocated to the wireless communication apparatus and a count of radio resources associated with a base station, the wireless communication apparatus is connected to the base station, and the wireless communication apparatus comprises a display unit;
determining a state of a first data communication function of a plurality of data communication functions of the wireless communication apparatus, wherein the state is one of an ON state or an OFF state;
executing a second data communication function of the plurality of data communication functions, wherein the second data communication function has a highest priority among the plurality of data communication functions;
controlling the state of the first data communication function, based on:
a display state of the display unit, wherein the display state is one of an ON display state or an OFF display state;
the execution of the second data communication function;
the congestion degree; and
the one of the ON state or the OFF state; and
controlling the display unit, based on the controlled state of the first data communication function, to display a message that indicates the controlled state of the first data communication function, wherein the message includes text information and image information.

17. A non-transitory computer-readable medium having stored thereon computer-executable instructions which, when executed by a computer, cause the computer to execute operations, the operations comprising:
acquiring communication quality information from a wireless communication apparatus;
detect, based on the acquired communication quality information, a congestion degree of wireless communication at a location where the wireless communication apparatus exists, wherein the congestion degree is based on a ratio of a count of radio resources allocated to the wireless communication apparatus and a count of radio resources associated with a base station, the wireless communication apparatus is connected to the base station, and the wireless communication apparatus comprises a display unit;
determining a state of a first data communication function of a plurality of data communication functions of the wireless communication apparatus, wherein the state is one of an ON state or an OFF state;
executing a second data communication function of the plurality of data communication functions, wherein the second data communication function has a highest priority among the plurality of data communication functions;
controlling the state of the first data communication function, based on:
a display state of the display unit, wherein the display state is one of an ON display state or an OFF display state;
the execution of the second data communication function;
the congestion degree; and
the one of the ON state or the OFF state; and
controlling the display unit, based on the controlled state of the first data communication function, to display a message that indicates the controlled state of the first data communication function, wherein the message includes text information and image information.

* * * * *